US011435877B2

(12) United States Patent
Anzures et al.

(10) Patent No.: US 11,435,877 B2
(45) Date of Patent: *Sep. 6, 2022

(54) USER INTERFACE FOR MULTI-USER COMMUNICATION SESSION

(71) Applicant: Apple Inc., Cupertino, CA (US)

(72) Inventors: Freddy Allen Anzures, San Francisco, CA (US); Nicholas V. King, San Jose, CA (US); Stephen O. Lemay, Palo Alto, CA (US); Hoan Pham, San Jose, CA (US); Giancarlo Yerkes, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/121,610

(22) Filed: Dec. 14, 2020

(65) Prior Publication Data

US 2021/0096703 A1 Apr. 1, 2021

Related U.S. Application Data

(63) Continuation of application No. 16/790,619, filed on Feb. 13, 2020, now Pat. No. 10,866,703, which is a (Continued)

(51) Int. Cl.
*H04N 7/15* (2006.01)
*G06F 3/0482* (2013.01)
(Continued)

(52) U.S. Cl.
CPC .......... *G06F 3/0482* (2013.01); *G06F 3/0488* (2013.01); *H04L 51/04* (2013.01);
(Continued)

(58) Field of Classification Search
CPC .. G06F 3/0482; G06F 3/0488; H04M 1/7243; H04M 1/72439; H04M 1/27475;
(Continued)

(56) References Cited

U.S. PATENT DOCUMENTS 5,617,526 A 4/1997 Oran et al.
6,728,784 B1 4/2004 Mattaway
(Continued)

FOREIGN PATENT DOCUMENTS

CN 1689327 A 10/2005
CN 1890996 A 1/2007
(Continued)

OTHER PUBLICATIONS

Applicant-Initiated Interview Summary received for U.S. Appl. No. 16/528,941, dated Nov. 10, 2020, 2 pages.
(Continued)

*Primary Examiner* — Melur Ramakrishnaiah
(74) *Attorney, Agent, or Firm* — Dentons US LLP

(57) ABSTRACT

The present disclosure generally relates to user interfaces for multi-user communication sessions. In some examples, a device initiates a live stream in a communication session. In some examples, a device transitions between streaming live audio and live video. In some examples, a device enables synchronizing media playback during a live stream. In some examples, a device displays synchronized media playback and plays a reaction from a first participant of the communication session.

24 Claims, 51 Drawing Sheets

Related U.S. Application Data continuation of application No. 16/511,578, filed on Jul. 15, 2019, now Pat. No. 10,599,297, which is a continuation of application No. 16/035,422, filed on Jul. 13, 2018, now Pat. No. 10,372,298.

(60) Provisional application No. 62/566,181, filed on Sep. 29, 2017.

(51) Int. Cl.

| | | |
|---|---|---|
| H04N 7/14 | (2006.01) | |
| H04L 51/04 | (2022.01) | |
| H04L 51/10 | (2022.01) | |
| H04M 1/7243 | (2021.01) | |
| G06F 3/0488 | (2022.01) | |
| H04M 1/27475 | (2020.01) | |
| H04M 1/27457 | (2020.01) | |
| H04M 1/72433 | (2021.01) | |
| H04M 1/72439 | (2021.01) | |

(52) U.S. Cl.
CPC .......... *H04L 51/10* (2013.01); *H04M 1/7243* (2021.01); *H04N 7/147* (2013.01); *H04N 7/15* (2013.01); *H04M 1/27457* (2020.01); *H04M 1/27475* (2020.01); *H04M 1/72433* (2021.01); *H04M 1/72439* (2021.01); *H04M 2250/62* (2013.01)

(58) Field of Classification Search
CPC ..... H04M 2250/62; H04N 7/147; H04N 7/15; H04N 7/14; H04N 21/4307; H04L 51/10; H04L 51/04; H04L 29/06414
USPC ............................................ 348/14.01–14.16
See application file for complete search history.

(56) References Cited

U.S. PATENT DOCUMENTS

| | | |
|---|---|---|
| 6,731,308 B1 | 5/2004 | Tang et al. |
| 7,185,054 B1 | 2/2007 | Ludwig et al. |
| 7,571,014 B1 | 8/2009 | Lambourne et al. |
| 8,169,463 B2 | 5/2012 | Enstad et al. |
| 8,914,752 B1 | 12/2014 | Spiegel |
| 9,185,062 B1 | 11/2015 | Yang et al. |
| 9,635,314 B2 | 4/2017 | Barkley et al. |
| 9,800,951 B1 | 10/2017 | Carlson et al. |
| 9,819,877 B1 | 11/2017 | Faulkner et al. |
| 10,284,812 B1 | 5/2019 | Van Os et al. |
| 10,353,532 B1 | 7/2019 | Holz et al. |
| 10,362,272 B1 | 7/2019 | Van Os et al. |
| 10,389,977 B1 | 8/2019 | Van Os et al. |
| 10,410,426 B2 | 9/2019 | Kamini et al. |
| 10,523,625 B1 | 12/2019 | Allen et al. |
| 10,523,976 B2 | 12/2019 | Hemmati et al. |
| 10,645,294 B1 | 5/2020 | Manzari et al. |
| 10,909,586 B2 | 2/2021 | Avedissian et al. |
| 10,924,446 B1 | 2/2021 | Paul |
| 10,963,145 B1 | 3/2021 | Voss et al. |
| 10,972,655 B1 | 4/2021 | Ostap et al. |
| 11,079,913 B1 | 8/2021 | Kim et al. |
| 11,212,449 B1 | 12/2021 | Manzari et al. |
| 11,258,619 B2 | 2/2022 | Libin |
| 2001/0030597 A1 | 10/2001 | Inoue et al. |
| 2002/0101446 A1 | 8/2002 | Tang et al. |
| 2003/0112938 A1 | 6/2003 | Kanakubo et al. |
| 2003/0225836 A1 | 12/2003 | Lee et al. |
| 2004/0003040 A1 | 1/2004 | Beavers et al. |
| 2004/0239763 A1 | 12/2004 | Notea et al. |
| 2005/0015286 A1 | 1/2005 | Rudnik et al. |
| 2005/0099492 A1 | 5/2005 | Orr |
| 2005/0124365 A1 | 6/2005 | Balasuriya et al. |
| 2005/0144247 A1 | 6/2005 | Christensen et al. |
| 2006/0002315 A1 | 1/2006 | Theurer et al. |
| 2006/0002523 A1 | 1/2006 | Bettis et al. |
| 2006/0098634 A1 | 5/2006 | Umemoto et al. |
| 2006/0158730 A1 | 7/2006 | Kira |
| 2007/0004389 A1 | 1/2007 | Wallace et al. |
| 2008/0122796 A1 | 5/2008 | Jobs et al. |
| 2008/0313278 A1 | 12/2008 | Hochberg |
| 2009/0117936 A1 | 5/2009 | Maeng |
| 2009/0164587 A1 | 6/2009 | Gavita et al. |
| 2009/0249244 A1 | 10/2009 | Robinson et al. |
| 2009/0256780 A1 | 10/2009 | Small et al. |
| 2009/0262206 A1 | 10/2009 | Park |
| 2009/0309897 A1 | 12/2009 | Morita et al. |
| 2010/0011065 A1 | 1/2010 | Scherpa et al. |
| 2010/0039498 A1 | 2/2010 | Liu et al. |
| 2010/0085416 A1 | 4/2010 | Hegde et al. |
| 2010/0097438 A1 | 4/2010 | Ujii |
| 2010/0121636 A1 | 5/2010 | Burke et al. |
| 2010/0162171 A1 | 6/2010 | Felt et al. |
| 2010/0169435 A1 | 7/2010 | Osullivan et al. |
| 2010/0251119 A1 | 9/2010 | Geppert et al. |
| 2010/0318928 A1 | 12/2010 | Neuman et al. |
| 2011/0115875 A1* | 5/2011 | Sadwick ................... H04N 7/15 348/14.08 |
| 2011/0126148 A1 | 5/2011 | Krishnaraj et al. |
| 2011/0161836 A1 | 6/2011 | Mu et al. |
| 2011/0193995 A1 | 8/2011 | Goh et al. |
| 2011/0252146 A1 | 10/2011 | Santamaria et al. |
| 2011/0296163 A1 | 12/2011 | Abernethy et al. |
| 2012/0002001 A1 | 1/2012 | Prentice |
| 2012/0019610 A1 | 1/2012 | Hornyak et al. |
| 2012/0054278 A1 | 3/2012 | Taleb et al. |
| 2012/0092436 A1 | 4/2012 | Pahud et al. |
| 2012/0114108 A1 | 5/2012 | Katis et al. |
| 2012/0173383 A1 | 7/2012 | Badawiyeh et al. |
| 2012/0185355 A1 | 7/2012 | Kilroy |
| 2012/0188394 A1 | 7/2012 | Park et al. |
| 2012/0293605 A1 | 11/2012 | Seferian et al. |
| 2012/0296972 A1 | 11/2012 | Backer |
| 2012/0304079 A1 | 11/2012 | Rideout et al. |
| 2012/0320141 A1 | 12/2012 | Bowen et al. |
| 2013/0055113 A1 | 2/2013 | Chazin et al. |
| 2013/0088413 A1 | 4/2013 | Raffle et al. |
| 2013/0132865 A1 | 5/2013 | Li |
| 2013/0162781 A1 | 6/2013 | Hubner et al. |
| 2013/0169742 A1 | 7/2013 | Wu et al. |
| 2013/0216206 A1 | 8/2013 | Dubin et al. |
| 2013/0219276 A1 | 8/2013 | Shan |
| 2013/0225140 A1 | 8/2013 | Greisson |
| 2013/0282180 A1 | 10/2013 | Layton |
| 2013/0328770 A1 | 12/2013 | Parham |
| 2014/0018053 A1 | 1/2014 | Cho et al. |
| 2014/0026074 A1 | 1/2014 | Cortes et al. |
| 2014/0105372 A1 | 4/2014 | Nowack et al. |
| 2014/0108084 A1 | 4/2014 | Bargetzi et al. |
| 2014/0108568 A1 | 4/2014 | Lee |
| 2014/0201126 A1 | 7/2014 | Zadeh et al. |
| 2014/0215356 A1 | 7/2014 | Brander et al. |
| 2014/0215404 A1 | 7/2014 | Kong et al. |
| 2014/0218371 A1 | 8/2014 | Du et al. |
| 2014/0218461 A1 | 8/2014 | Deland |
| 2014/0229835 A1 | 8/2014 | Ravine |
| 2014/0247368 A1 | 9/2014 | Chinn |
| 2014/0331149 A1 | 11/2014 | Labey |
| 2014/0349754 A1 | 11/2014 | Kaneoka et al. |
| 2014/0354759 A1 | 12/2014 | Cranfill et al. |
| 2014/0368719 A1 | 12/2014 | Kaneko et al. |
| 2014/0373081 A1* | 12/2014 | Dodson ................... H04N 21/24 725/97 |
| 2014/0375747 A1 | 12/2014 | Martinez et al. |
| 2015/0033149 A1 | 1/2015 | Kuchoor |
| 2015/0058413 A1 | 2/2015 | Ge |
| 2015/0067541 A1* | 3/2015 | Owens ................... G06F 3/0481 715/753 |
| 2015/0078680 A1 | 3/2015 | Shakib et al. |
| 2015/0095804 A1 | 4/2015 | Grossman et al. |
| 2015/0106720 A1* | 4/2015 | Backer ............. H04N 21/25891 715/719 |
| 2015/0116353 A1 | 4/2015 | Miura et al. |
| 2015/0177914 A1 | 6/2015 | Coyner et al. |

(56) References Cited

U.S. PATENT DOCUMENTS

| | | |
|---|---|---|
| 2015/0256796 A1 | 9/2015 | Ma |
| 2015/0288868 A1 | 10/2015 | Slavin et al. |
| 2015/0296077 A1 | 10/2015 | Wakeyama et al. |
| 2015/0301338 A1 | 10/2015 | Van Heugten |
| 2015/0304366 A1 | 10/2015 | Bader-natal et al. |
| 2015/0319006 A1 | 11/2015 | Plummer et al. |
| 2015/0350143 A1 | 12/2015 | Lemay et al. |
| 2015/0350533 A1 | 12/2015 | Harris et al. |
| 2016/0014059 A1 | 1/2016 | Rathod |
| 2016/0014477 A1 | 1/2016 | Siders |
| 2016/0057173 A1 | 2/2016 | Singman et al. |
| 2016/0065832 A1 | 3/2016 | Kim et al. |
| 2016/0072861 A1 | 3/2016 | Woolsey et al. |
| 2016/0073185 A1 | 3/2016 | Kannappan et al. |
| 2016/0099901 A1 | 4/2016 | Allen et al. |
| 2016/0099987 A1 | 4/2016 | Shamma |
| 2016/0127636 A1 | 5/2016 | Ito et al. |
| 2016/0139785 A1 | 5/2016 | Griffin et al. |
| 2016/0180259 A1 | 6/2016 | Marianko et al. |
| 2016/0212374 A1 | 7/2016 | Usbergo et al. |
| 2016/0227095 A1 | 8/2016 | Yoshizawa et al. |
| 2016/0231902 A1 | 8/2016 | Sirpal et al. |
| 2016/0259528 A1 | 9/2016 | Foss et al. |
| 2016/0277903 A1 | 9/2016 | Poosala et al. |
| 2016/0306422 A1 | 10/2016 | Parham et al. |
| 2016/0306504 A1 | 10/2016 | Brunsch et al. |
| 2016/0308920 A1 | 10/2016 | Brunsch et al. |
| 2016/0335041 A1 | 11/2016 | Wachter et al. |
| 2016/0364106 A1 | 12/2016 | Koum et al. |
| 2016/0380780 A1* | 12/2016 | Stephenson ......... H04L 65/1089 709/219 |
| 2017/0006162 A1 | 1/2017 | Bargetzi et al. |
| 2017/0024100 A1 | 1/2017 | Pieper et al. |
| 2017/0031557 A1 | 2/2017 | Xiangli et al. |
| 2017/0048817 A1 | 2/2017 | Yang et al. |
| 2017/0083189 A1 | 3/2017 | Yang et al. |
| 2017/0094019 A1 | 3/2017 | Ahmed et al. |
| 2017/0097621 A1 | 4/2017 | Ackmann et al. |
| 2017/0111587 A1 | 4/2017 | Herbst et al. |
| 2017/0230585 A1 | 8/2017 | Nash et al. |
| 2017/0280494 A1 | 9/2017 | Jung et al. |
| 2017/0309174 A1 | 10/2017 | Gonzales et al. |
| 2017/0324784 A1 | 11/2017 | Taine et al. |
| 2017/0357382 A1 | 12/2017 | Miura et al. |
| 2017/0357425 A1 | 12/2017 | Smith et al. |
| 2017/0357434 A1 | 12/2017 | Coffman et al. |
| 2017/0359191 A1 | 12/2017 | Smith et al. |
| 2017/0359285 A1 | 12/2017 | Weinig et al. |
| 2017/0373868 A1 | 12/2017 | Deets, Jr. |
| 2018/0047200 A1 | 2/2018 | O'hara et al. |
| 2018/0061158 A1 | 3/2018 | Greene |
| 2018/0070144 A1 | 3/2018 | Tang et al. |
| 2018/0081522 A1 | 3/2018 | Greenberg et al. |
| 2018/0091732 A1 | 3/2018 | Wilson et al. |
| 2018/0095616 A1 | 4/2018 | Valdivia et al. |
| 2018/0101297 A1 | 4/2018 | Yang et al. |
| 2018/0123986 A1 | 5/2018 | Faulkner et al. |
| 2018/0124359 A1 | 5/2018 | Faulkner |
| 2018/0139374 A1 | 5/2018 | Yu |
| 2018/0157455 A1 | 6/2018 | Troy et al. |
| 2018/0199164 A1 | 7/2018 | Bargetzi et al. |
| 2018/0204111 A1 | 7/2018 | Zadeh et al. |
| 2018/0205797 A1 | 7/2018 | Faulkner |
| 2018/0227341 A1 | 8/2018 | Rizzi |
| 2018/0228003 A1 | 8/2018 | O'driscoll et al. |
| 2018/0249047 A1 | 8/2018 | Mariatt |
| 2018/0295079 A1 | 10/2018 | Longo |
| 2018/0309801 A1 | 10/2018 | Rathod |
| 2018/0332559 A1 | 11/2018 | Gudivada et al. |
| 2018/0341448 A1 | 11/2018 | Behzadi et al. |
| 2018/0348764 A1 | 12/2018 | Zhang et al. |
| 2018/0364665 A1 | 12/2018 | Clymer et al. |
| 2018/0367484 A1* | 12/2018 | Rodriguez ............ H04L 67/36 |
| 2018/0375676 A1 | 12/2018 | Bader-Natal et al. |
| 2019/0025943 A1 | 1/2019 | Jobs et al. |
| 2019/0028419 A1 | 1/2019 | Sullivan |
| 2019/0068670 A1* | 2/2019 | Adam ................... H04L 65/403 |
| 2019/0102049 A1 | 4/2019 | Anzures et al. |
| 2019/0102145 A1 | 4/2019 | Wilberding et al. |
| 2019/0124021 A1 | 4/2019 | Demattei |
| 2019/0138951 A1 | 5/2019 | Brownhill et al. |
| 2019/0199993 A1 | 6/2019 | Babu et al. |
| 2019/0205861 A1 | 7/2019 | Bace |
| 2019/0228495 A1 | 7/2019 | Tremblay et al. |
| 2019/0236142 A1 | 8/2019 | Balakrishnan et al. |
| 2019/0303861 A1 | 10/2019 | Mathias et al. |
| 2019/0339825 A1 | 11/2019 | Anzures et al. |
| 2019/0342507 A1 | 11/2019 | Dye et al. |
| 2019/0342519 A1 | 11/2019 | Van Os et al. |
| 2019/0347181 A1 | 11/2019 | Cranfill et al. |
| 2019/0361575 A1 | 11/2019 | Ni et al. |
| 2019/0361694 A1 | 11/2019 | Gordon et al. |
| 2019/0362555 A1 | 11/2019 | Chen et al. |
| 2019/0370805 A1 | 12/2019 | Van Os et al. |
| 2020/0055515 A1 | 2/2020 | Herman et al. |
| 2020/0106952 A1 | 4/2020 | Missig et al. |
| 2020/0106965 A1 | 4/2020 | Malia et al. |
| 2020/0135191 A1 | 4/2020 | Nourbakhsh |
| 2020/0143593 A1 | 5/2020 | Rudman et al. |
| 2020/0152186 A1 | 5/2020 | Koh et al. |
| 2020/0183548 A1 | 6/2020 | Anzures et al. |
| 2020/0186378 A1 | 6/2020 | Six et al. |
| 2020/0195887 A1 | 6/2020 | Van Os et al. |
| 2020/0274726 A1 | 8/2020 | Setteboun et al. |
| 2020/0279279 A1 | 9/2020 | Chaudhuri |
| 2020/0296329 A1 | 9/2020 | Tang et al. |
| 2020/0302913 A1 | 9/2020 | Marcinkiewicz |
| 2020/0385116 A1 | 12/2020 | Sabripour et al. |
| 2020/0395012 A1 | 12/2020 | Kim et al. |
| 2020/0400957 A1 | 12/2020 | Van Heugten |
| 2021/0043189 A1 | 2/2021 | Pyun |
| 2021/0064317 A1 | 3/2021 | Juenger et al. |
| 2021/0065134 A1 | 3/2021 | Chhabra et al. |
| 2021/0097768 A1 | 4/2021 | Malia et al. |
| 2021/0099829 A1 | 4/2021 | Soto et al. |
| 2021/0136129 A1 | 5/2021 | Ponnusamy et al. |
| 2021/0144336 A1 | 5/2021 | Van Os et al. |
| 2021/0152503 A1 | 5/2021 | Rodriguez et al. |
| 2021/0158622 A1 | 5/2021 | Leelaphattarakij et al. |
| 2021/0158830 A1 | 5/2021 | Boehlke |
| 2021/0176204 A1 | 6/2021 | Geppert et al. |
| 2021/0195084 A1 | 6/2021 | Olajos et al. |
| 2021/0217106 A1 | 7/2021 | Hauser et al. |
| 2021/0265032 A1 | 8/2021 | Burgess et al. |
| 2021/0266274 A1 | 8/2021 | Liu et al. |
| 2021/0349680 A1 | 11/2021 | Kim et al. |
| 2021/0352172 A1 | 11/2021 | Kim et al. |
| 2021/0409359 A1 | 12/2021 | Eirinberg et al. |
| 2022/0004356 A1 | 1/2022 | Kim et al. |
| 2022/0006946 A1 | 1/2022 | Missig et al. |
| 2022/0046222 A1 | 2/2022 | Meier |
| 2022/0050578 A1 | 2/2022 | Waldman et al. |

FOREIGN PATENT DOCUMENTS

| | | |
|---|---|---|
| CN | 101075173 A | 11/2007 |
| CN | 101431564 A | 5/2009 |
| CN | 101853132 A | 10/2010 |
| CN | 101854247 A | 10/2010 |
| CN | 101917529 A | 12/2010 |
| CN | 102572369 A | 7/2012 |
| CN | 102651731 A | 8/2012 |
| CN | 103039064 A | 4/2013 |
| CN | 103222247 A | 7/2013 |
| CN | 103384235 A | 11/2013 |
| CN | 103442774 A | 12/2013 |
| CN | 103458215 A | 12/2013 |
| CN | 103649985 A | 3/2014 |
| CN | 103748610 A | 4/2014 |
| CN | 104010158 A | 8/2014 |
| CN | 104427288 A | 3/2015 |
| CN | 104469143 A | 3/2015 |
| CN | 104602133 A | 5/2015 |
| CN | 104980578 A | 10/2015 |

(56) References Cited

FOREIGN PATENT DOCUMENTS

| | | |
|---|---|---|
| CN | 105094957 A | 11/2015 |
| CN | 105141498 A | 12/2015 |
| CN | 105204846 A | 12/2015 |
| CN | 105264473 A | 1/2016 |
| CN | 105389173 A | 3/2016 |
| CN | 105554429 A | 5/2016 |
| CN | 106210855 A | 12/2016 |
| CN | 106471793 A | 3/2017 |
| CN | 107066523 A | 8/2017 |
| CN | 107533417 A | 1/2018 |
| CN | 107534656 A | 1/2018 |
| CN | 107704177 A | 2/2018 |
| CN | 107728876 A | 2/2018 |
| CN | 107992248 A | 5/2018 |
| EP | 2056568 A1 | 5/2009 |
| EP | 2237536 A1 | 10/2010 |
| EP | 3038427 A1 | 6/2016 |
| EP | 2761582 B1 | 3/2017 |
| JP | 2005-94696 A | 4/2005 |
| JP | 2007-150921 A | 6/2007 |
| JP | 2014-71835 A | 4/2014 |
| JP | 2014-87126 A | 5/2014 |
| JP | 2015-11507 A | 1/2015 |
| JP | 2015-170234 A | 9/2015 |
| JP | 2016-1446 A | 1/2016 |
| JP | 2016-174282 A | 9/2016 |
| JP | 2017-228843 A | 12/2017 |
| JP | 2018-7158 A | 1/2018 |
| JP | 2018-56719 A | 4/2018 |
| WO | 2004/032507 A1 | 4/2004 |
| WO | 2005/060501 A2 | 7/2005 |
| WO | 2011/146605 A1 | 11/2011 |
| WO | 2011/146839 A1 | 11/2011 |
| WO | 2011/161145 A1 | 12/2011 |
| WO | 2012/037170 A1 | 3/2012 |
| WO | 2014/058937 A1 | 4/2014 |
| WO | 2016/168154 A1 | 10/2016 |
| WO | 2021/112983 A1 | 6/2021 |

OTHER PUBLICATIONS

Certificate of Examination received for Australian Patent Application No. 2020101324, dated Sep. 7, 2020, 2 pages.

Corrected Notice of Allowance received for U.S. Appl. No. 16/799,481, dated Oct. 27, 2020, 3 pages.

Examiner Initiated-Interview Summary received for U.S. Appl. No. 16/528,941, dated Dec. 1, 2020, 2 pages.

International Preliminary Report on Patentability received for PCT Patent Application No. PCT/US2019/031202, dated Nov. 19, 2020, 13 pages.

Non-Final Office Action received for U.S. Appl. No. 16/528,941, dated Dec. 7, 2020, 15 pages.

Notice of Acceptance received for Australian Patent Application No. 2019266225, dated Dec. 23, 2020, 3 pages.

Notice of Allowance received for Chinese Patent Application No. 201880056514.5, dated Jan. 11, 2021, 2 pages (1 page of English Translation and 1 page of Official Copy).

Notice of Allowance received for Chinese Patent Application No. 201910400180.5, dated Nov. 5, 2020, 2 pages (1 page of English Translation and 1 page of Official Copy).

Notice of Allowance received for U.S. Appl. No. 16/799,481, dated Sep. 8, 2020, 6 pages.

Office Action received for Australian Patent Application No. 2019266225, dated Nov. 23, 2020, 4 pages.

Office Action received for Chinese Patent Application No. 201910704856.X, dated Dec. 9, 2020, 23 pages (13 pages of English Translation and 10 pages of Official Copy).

Office Action received for European Patent Application No. 18779093.6, dated Dec. 11, 2020, 4 pages.

Office Action received for European Patent Application No. 19729395.4, dated Sep. 29, 2020, 10 pages.

Office Action received for Korean Patent Application No. 10-2020-7032110, dated Dec. 15, 2020, 6 pages (2 pages of English Translation and 4 pages of Official Copy).

Extended European Search Report received for European Patent Application No. 20205496.1, dated Mar. 11, 2021, 11 pages.

Notice of Acceptance received for Australian Patent Application No. 2021200789, dated Feb. 26, 2021, 3 pages.

Notice of Allowance received for Korean Patent Application No. 10-2020-7032110, dated Mar. 8, 2021, 4 pages (1 page of English Translation and 3 pages of Official Copy).

Summons to Attend Oral Proceedings received for European Patent Application No. 19729395.4, mailed on Mar. 11, 2021, 7 pages.

Summons to Attend Oral Proceedings received for European Patent Application No. 19729395.4, mailed on Mar. 19, 2021, 9 pages.

Applicant Initiated Interview Summary received for U.S. Appl. No. 16/790,619, dated Jul. 28, 2020, 3 pages.

Applicant-Initiated Interview Summary received for U.S. Appl. No. 16/528,941, dated Jun. 19, 2020, 3 pages.

Applicant-Initiated Interview Summary received for U.S. Appl. No. 16/799,481, dated Jul. 24, 2020, 3 pages.

Certificate of Examination received for Australian Patent Application No. 2019100499, dated Aug. 15, 2019, 2 pages.

Certificate of Examination received for Australian Patent Application No. 2019101062, dated Jun. 2, 2020, 2 pages.

Corrected Notice of Allowance received for U.S. Appl. No. 16/109,552, dated Jun. 13, 2019, 2 pages.

Corrected Notice of Allowance received for U.S. Appl. No. 16/144,572, dated Mar. 21, 2019, 3 pages.

Corrected Notice of Allowance received for U.S. Appl. No. 16/147,432, dated Jan. 18, 2019, 3 pages.

Corrected Notice of Allowance received for U.S. Appl. No. 16/147,432, dated Jul. 16, 2019, 3 pages.

Corrected Notice of Allowance received for U.S. Appl. No. 16/511,578, dated Feb. 13, 2020, 3 pages.

Corrected Notice of Allowance received for U.S. Appl. No. 16/790,619, dated Oct. 13, 2020, 3 pages.

Corrected Search Report and Opinion received for Danish Patent Application No. PA201870364, dated Sep. 5, 2018, 13 pages.

Decision to Grant received for Danish Patent Application No. PA201870362, dated May 15, 2020, 2 pages.

Extended European Search Report received for European Patent Application No. 20166552.8, dated Jun. 12, 2020, 9 pages.

Final Office Action received for U.S. Appl. No. 16/528,941, dated Jul. 13, 2020, 15 pages.

Intention to Grant received for Danish Patent Application No. PA201870362, dated Feb. 14, 2020, 2 pages.

International Preliminary Report on Patentability received for PCT Patent Application No. PCT/US2018/048151, dated Apr. 9, 2020, 14 pages.

International Search Report and Written Opinion received for PCT Patent Application No. PCT/US2018/048151, dated Jan. 10, 2019, 23 pages.

International Search Report and Written Opinion received for PCT Patent Application No. PCT/US2019/031202, dated Oct. 4, 2019, 19 pages.

Invitation to Pay Additional Fees received for PCT Patent Application No. PCT/US2018/048151, dated Nov. 6, 2018, 18 pages.

Invitation to Pay Additional Fees received for PCT Patent Application No. PCT/US2019/031202, dated Aug. 8, 2019, 12 pages.

Non-Final Office Action received for U.S. Appl. No. 16/035,422, dated Nov. 30, 2018, 13 Pages.

Non-Final Office Action received for U.S. Appl. No. 16/109,552, dated Oct. 17, 2018, 16 pages.

Non-Final Office Action received for U.S. Appl. No. 16/144,572, dated Nov. 30, 2018, 8 pages.

Non-Final Office Action received for U.S. Appl. No. 16/383,403, dated Aug. 23, 2019, 10 pages.

Non-Final Office Action received for U.S. Appl. No. 16/528,941, dated Jan. 30, 2020, 14 pages.

Non-Final Office Action received for U.S. Appl. No. 16/790,619, dated May 4, 2020, 13 pages.

Non-Final Office Action received for U.S. Appl. No. 16/799,481, dated May 1, 2020, 13 pages.

(56) References Cited

OTHER PUBLICATIONS

Notice of Allowance received for Japanese Patent Application No. 2018-183504, dated Sep. 27, 2019, 4 pages.
Notice of Allowance received for U.S. Appl. No. 16/035,422, dated Apr. 10, 2019, 6 pages.
Notice of Allowance received for U.S. Appl. No. 16/109,552, dated Mar. 13, 2019, 25 pages.
Notice of Allowance received for U.S. Appl. No. 16/109,552, dated May 13, 2019, 2 pages.
Notice of Allowance received for U.S. Appl. No. 16/144,572, dated Feb. 28, 2019, 7 pages.
Notice of Allowance received for U.S. Appl. No. 16/147,432, dated Dec. 18, 2018, 13 pages.
Notice of Allowance received for U.S. Appl. No. 16/147,432, dated May 20, 2019, 6 pages.
Notice of Allowance received for U.S. Appl. No. 16/383,403, dated Jan. 10, 2020, 11 pages.
Notice of Allowance received for U.S. Appl. No. 16/511,578, dated Nov. 18, 2019, 12 pages.
Notice of Allowance received for U.S. Appl. No. 16/790,619, dated Sep. 8, 2020, 6 pages.
Office Action received for Australian Patent Application No. 2019100499, dated Jun. 28, 2019., 4 pages.
Office Action received for Australian Patent Application No. 2019101062, dated Apr. 22, 2020, 2 pages.
Office Action received for Australian Patent Application No. 2019101062, dated Dec. 5, 2019, 3 pages.
Office Action received for Chinese Patent Application No. 201880056514.5, dated Sep. 2, 2020, 7 pages.
Office Action received for Chinese Patent Application No. 201910400180.5, dated Jun. 1, 2020, 11 pages.
Office Action received for Chinese Patent Application No. 201910704856.X, dated May 27, 2020, 26 pages.
Office Action received for Danish Patent Application No. PA201870362, dated Aug. 22, 2019, 4 pages.
Office Action received for Danish Patent Application No. PA201870362, dated Dec. 18, 2018, 2 pages.
Office Action received for Danish Patent Application No. PA201870363, dated Mar. 26, 2019, 3 pages.
Office Action received for Danish Patent Application No. PA201870364, dated Jan. 28, 2019, 8 pages.
Office Action received for Danish Patent Application No. PA201870364, dated Jun. 11, 2019, 11 pages.
Office Action received for European Patent Application No. 19729395.4, dated Jul. 15, 2020, 4 pages.
Search Report and Opinion received for Danish Patent Application No. PA201870362, dated Sep. 7, 2018, 9 pages.
Search Report and Opinion received for Danish Patent Application No. PA201870363, dated Sep. 11, 2018, 12 pages.
Search Report and Opinion received for Danish Patent Application No. PA201870364, dated Sep. 4, 2018, 12 pages.
Office Action received for European Patent Application No. 20166552.8, dated Mar. 24, 2021, 8 pages.
Office Action received for Chinese Patent Application No. 202010126661.4, dated Feb. 3, 2021, 16 pages (9 pages of English Translation and 7 pages of Official Copy).
Office Action received for Japanese Patent Application No. 2019-194597, dated Jan. 18, 2021, 10 pages (5 pages of English Translation and 5 pages of Official Copy).
Office Action received for Chinese Patent Application No. 201910704856.X, dated Apr. 6, 2021, 13 pages (7 pages of English Translation and 6 pages of Official Copy).
Office Action received for Chinese Patent Application No. 202011243876.0, dated Apr. 6, 2021, 11 pages (5 pages of English Translation and 6 pages of Official Copy).
Applicant-Initiated Interview Summary received for U.S. Appl. No. 17/026,818, dated Dec. 15, 2020, 7 pages.
Applicant-Initiated Interview Summary received for U.S. Appl. No. 17/026,818, dated Mar. 8, 2021, 4 pages.
Final Office Action received for U.S. Appl. No. 17/026,818, dated Jan. 29, 2021, 21 pages.
Intention to Grant received for European Patent Application No. 19729395.4, dated Jul. 23, 2021, 10 pages.
Non-Final Office Action received for U.S. Appl. No. 17/026,818, dated Nov. 25, 2020, 20 pages.
Non-Final Office Action received for U.S. Appl. No. 17/223,794, dated Jun. 16, 2021, 32 pages.
Notice of Allowance received for U.S. Appl. No. 16/528,941, dated Aug. 10, 2021, 5 pages.
Notice of Allowance received for U.S. Appl. No. 17/026,818, dated May 13, 2021, 10 pages.
Office Action received for Indian Patent Application No. 201814036860, dated Jul. 29, 2021, 8 pages.
Search Report and Opinion received for Danish Patent Application No. PA202070617, dated Dec. 23, 2020, 8 pages.
International Search Report and Written Opinion received for PCT Patent Application No. PCT/US2021/031760, dated Sep. 16, 2021, 18 pages.
Office Action received for Danish Patent Application No. PA202070617, dated Sep. 24, 2021, 4 pages.
Minutes of the Oral Proceedings received for European Patent Application No. 19729395.4, mailed on Jul. 21, 2021, 6 pages.
Non-Final Office Action received for U.S. Appl. No. 17/157,166, dated Jul. 9, 2021, 12 pages.
Androidcentral, "How do I respond to group messages from notification bar?", Available online at: https://forums.androidcentral.com/ask-question/952030-how-do-i-respond-group-messages-notification-bar.html, Mar. 25, 2019, 3 pages.
Result of Consultation received for European Patent Application No. 19729395.4, dated Jun. 22, 2021, 3 pages.
Result of Consultation received for European Patent Application No. 19729395.4, dated Jun. 23, 2021, 3 pages.
Rossignol Joe, "iOS 10 Concept Simplifies Lock Screen With Collapsed Notifications", Available online at: https://www.macrumors.com/2016/06/16/ios-10-collapsed-notifications-concept/, Jun. 16, 2016, 10 pages.
Applicant-Initiated Interview Summary received for U.S. Appl. No. 17/223,794, dated Sep. 7, 2021, 3 pages.
Notice of Allowance received for Chinese Patent Application No. 202011243876.0, dated Sep. 8, 2021, 4 pages (1 page of English Translation and 3 pages of Official Copy).
Office Action received for Australian Patent Application No. 2020239711, dated Sep. 13, 2021, 5 pages.
Senicar et al., "User-Centred Design and Development of an Intelligent Light Switch for Sensor Systems", Technical Gazette, vol. 26, No. 2, available online at: https://hrcak.srce.hr/file/320403, 2019, pp. 339-345.
Notice of Allowance received for U.S. Appl. No. 16/528,941, dated May 19, 2021, 5 pages.
Intention to Grant received for Danish Patent Application No. PA202070617, dated Nov. 15, 2021, 2 pages.
Notice of Allowance received for U.S. Appl. No. 17/157,166, dated Nov. 16, 2021, 6 pages.
Office Action received for European Patent Application No. 20205496.1, dated Nov. 10, 2021, 5 pages.
Office Action received for European Patent Application No. 18779093.6, dated Mar. 17, 2022, 4 pages.
Office Action received for Chinese Patent Application No. 202110328602.X, dated Mar. 24, 2022, 6 pages (3 pages of English Translation and 3 pages of Official Copy).
Office Action received for Chinese Patent Application No. 202110328597.2, dated Apr. 15, 2022, 18 pages (9 pages of English Translation and 9 pages of Official Copy).
101917529, CN, A, Cited by Chinese Patent Office in an Office Action for related Patent Application No. 202110328597.2 dated Apr. 15, 2022.
104469143, CN, A, Cited by Chinese Patent Office in an Office Action for related Patent Application No. 202110328597.2 dated Apr. 15, 2022.
106210855, CN, A, Cited by Chinese Patent Office in an Office Action for related Patent Application No. 202110328597.2 dated Apr. 15, 2022.

(56) References Cited

OTHER PUBLICATIONS

Abdulezer et al., "Skype For Dummies", Available Online at: https://ixn.es/Skype%20For%20Dummies.pdf, 2007, 361 pages.
Applicant-Initiated Interview Summary received for U.S. Appl. No. 17/476,404, dated Mar. 18, 2022, 2 pages.
Corrected Notice of Allowance received for U.S. Appl. No. 17/157,166, dated Apr. 13, 2022, 4 pages.
Corrected Notice of Allowance received for U.S. Appl. No. 17/157,166, dated Apr. 25, 2022, 4 pages.
Corrected Notice of Allowance received for U.S. Appl. No. 17/157,166, dated Dec. 9, 2021, 4 pages.
Corrected Notice of Allowance received for U.S. Appl. No. 17/157,166, dated Dec. 15, 2021, 4 pages.
Corrected Notice of Allowance received for U.S. Appl. No. 17/157,166, dated Jan. 5, 2022, 4 pages.
Decision to Grant received for European Patent Application No. 19729395.4, dated Dec. 9, 2021, 2 pages.
Examiner-Initiated Interview Summary received for U.S. Appl. No. 17/027,373, dated Mar. 31, 2022, 4 pages.
Final Office Action received for U.S. Appl. No. 17/476,404, dated May 5, 2022, 30 pages.
"HuddleCamHD SimplTrack2 Auto Tracking Camera Installation & Operation Manual", Available Online at: https://huddlecamhd.com/wp-content/uploads/2021/01/SimplTrack2-User-Manual-v1_2-6-20.pdf, Jun. 2020, 41 pages.
Non Final Office Action received for U.S. Appl. No. 17/476,404, dated Feb. 8, 2022, 26 pages.
Non-Final Office Action received for U.S. Appl. No. 17/027,373, dated Feb. 2, 2022, 17 pages.
Notice of Acceptance received for Australian Patent Application No. 2020239711, dated Dec. 16, 2021, 3 pages.
Notice of Acceptance received for Australian Patent Application No. 2021203903, dated May 25, 2022, 3 pages.
Notice of Allowance received for Japanese Patent Application No. 2019-194597, dated Nov. 19, 2021, 4 pages (1 page of English Translation and 3 pages of Official Copy).
Notice of Allowance received for U.S. Appl. No. 17/027,373, dated Jun. 3, 2022, 8 pages.
Notice of Allowance received for U.S. Appl. No. 17/157,166, dated Mar. 30, 2022, 6 pages.
Office Action received for Australian Patent Application No. 2021203903, dated Feb. 24, 2022, 3 pages.
Office Action received for Chinese Patent Application No. 201910400179.2, dated Dec. 27, 2021, 32 pages (13 pages of English Translation and 19 pages of Official Copy).
Office Action received for Chinese Patent Application No. 202010126661.4, dated Mar. 4, 2022, 13 pages (8 pages of English Translation and 5 pages of Official Copy).
Office Action received for Chinese Patent Application No. 202110327012.5, dated Apr. 29, 2022, 17 pages (10 pages of English Translation and 7 pages of Official Copy).
Office Action received for Indian Patent Application No. 202014041529, dated Dec. 6, 2021, 6 pages.
Office Action received for Japanese Patent Application No. 2020-159840, dated Dec. 10, 2021, 13 pages (7 pages of English Translation and 6 pages of Official Copy).
Office Action received for Japanese Patent Application No. 2020-159840, dated Mar. 28, 2022, 6 pages (3 pages of English Translation and 3 pages of Official Copy).
Applicant-Initiated Interview Summary received for U.S. Appl. No. 17/483,564, dated Mar. 14, 2022, 2 pages.
Applicant-Initiated Interview Summary received for U.S. Appl. No. 17/483,679, dated Apr. 29, 2022, 2 pages.
Applicant-Initiated Interview Summary received for U.S. Appl. No. 17/484,899, dated Apr. 27, 2022, 5 pages.
Corrected Notice of Allowance received for U.S. Appl. No. 17/483,582, dated Feb. 15, 2022, 2 pages.
Final Office Action received for U.S. Appl. No. 17/483,564, dated Apr. 18, 2022, 23 pages.
Final Office Action received for U.S. Appl. No. 17/483,679, dated May 24, 2022, 21 pages.
Final Office Action received for U.S. Appl. No. 17/484,899, dated May 12, 2022, 29 pages.
Non-Final Office Action received for U.S. Appl. No. 17/483,549, dated Jan. 11, 2022, 5 pages.
Non-Final Office Action received for U.S. Appl. No. 17/483,564, dated Jan. 6, 2022, 23 pages.
Non-Final Office Action received for U.S. Appl. No. 17/483,679, dated Feb. 1, 2022, 19 pages.
Non-Final Office Action received for U.S. Appl. No. 17/484,899, dated Jan. 24, 2022, 24 pages.
Notice of Allowance received for U.S. Appl. No. 17/483,549, dated Apr. 15, 2022, 10 pages.
Notice of Allowance received for U.S. Appl. No. 17/483,582, dated Apr. 19, 2022, 5 pages.
Notice of Allowance received for U.S. Appl. No. 17/483,582, dated Jan. 20, 2022, 10 pages.
Office Action received for Chinese Patent Application No. 202110328601.5, dated Apr. 27, 2022, 25 pages (14 pages of English Translation and 11 pages of Official Copy).
Office Action received for Korean Patent Application No. 10-2021-7017731, dated May 30, 2022, 5 pages (2 pages of English Translation and 3 pages of Official Copy).

\* cited by examiner

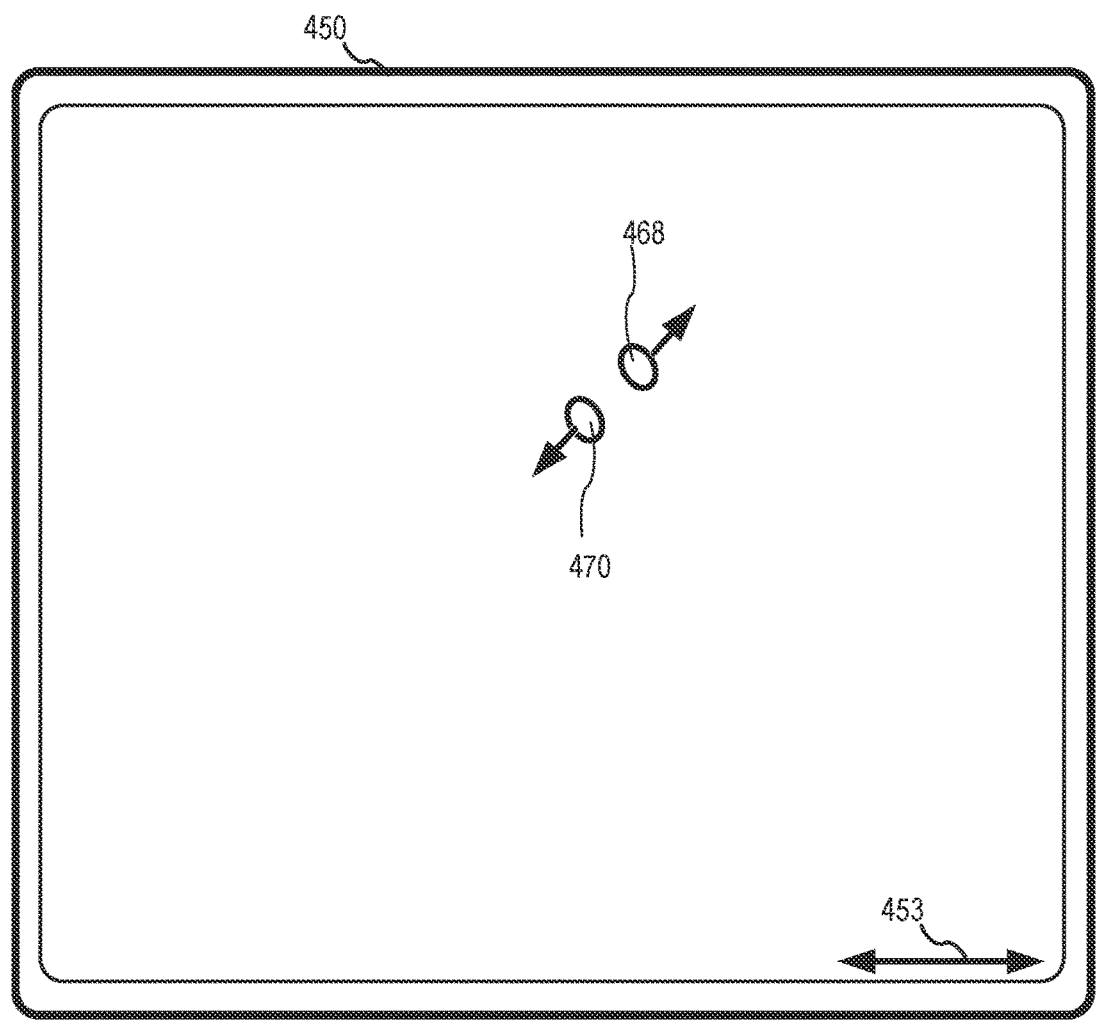
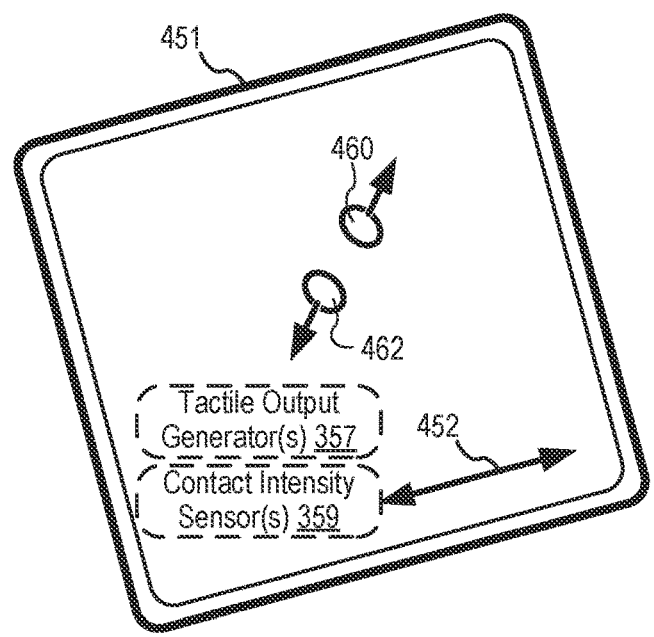
*FIG. 4B*

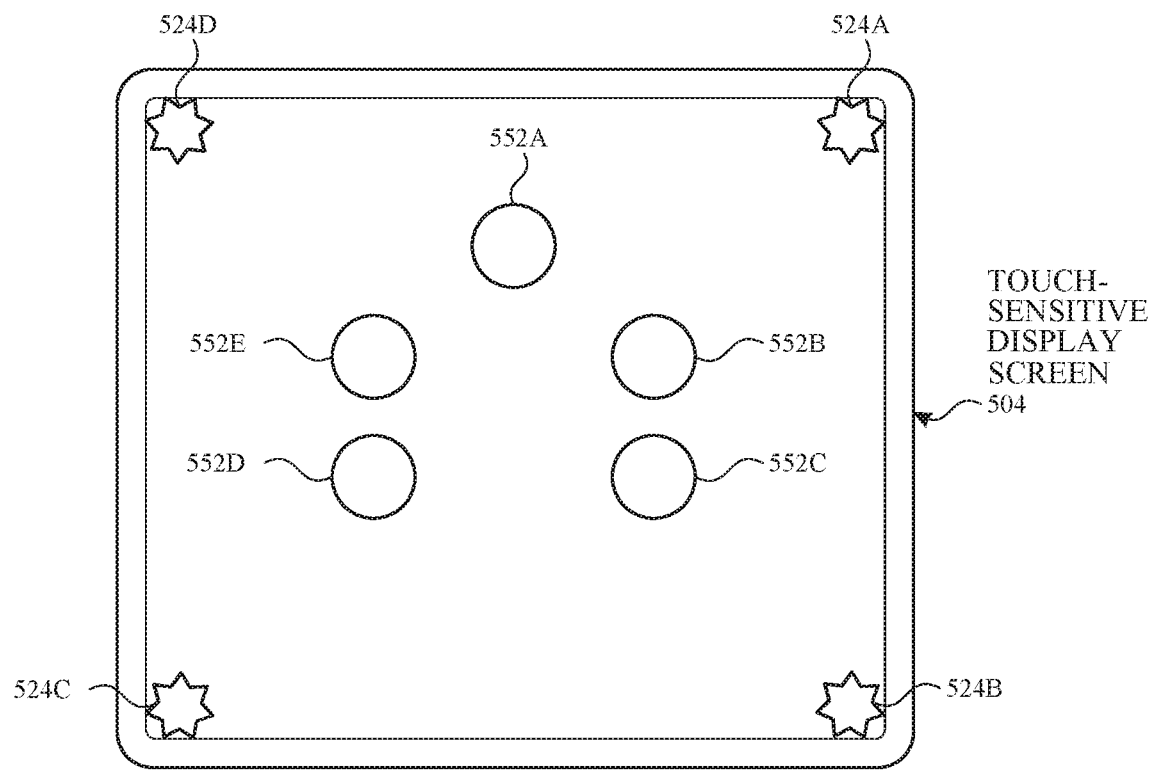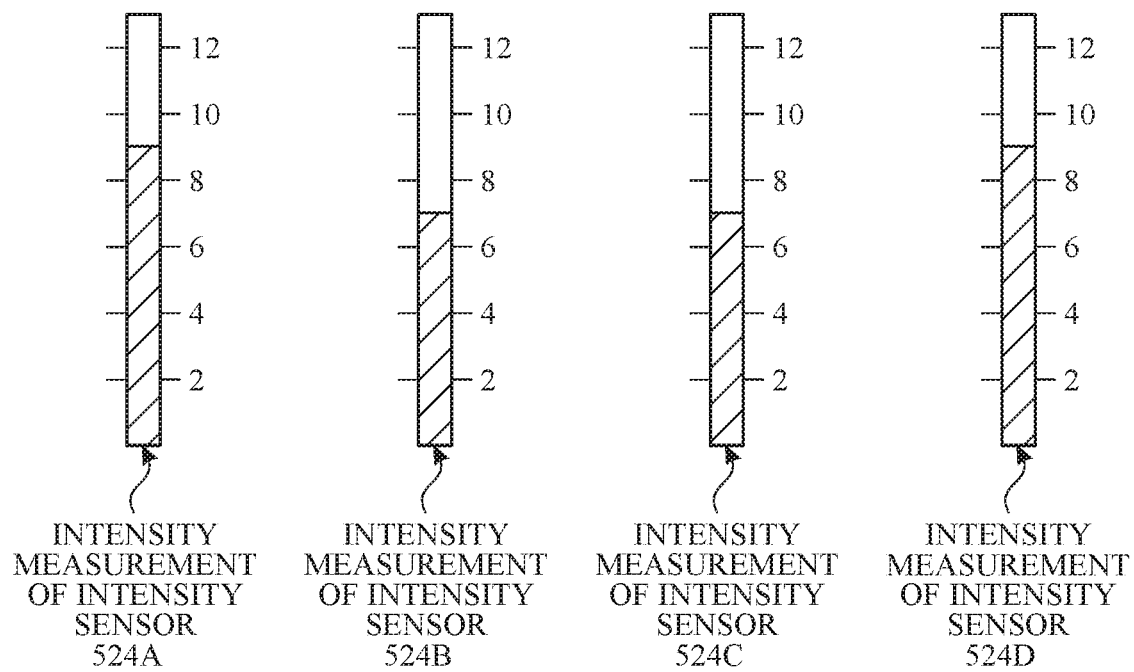
FIG. 5C

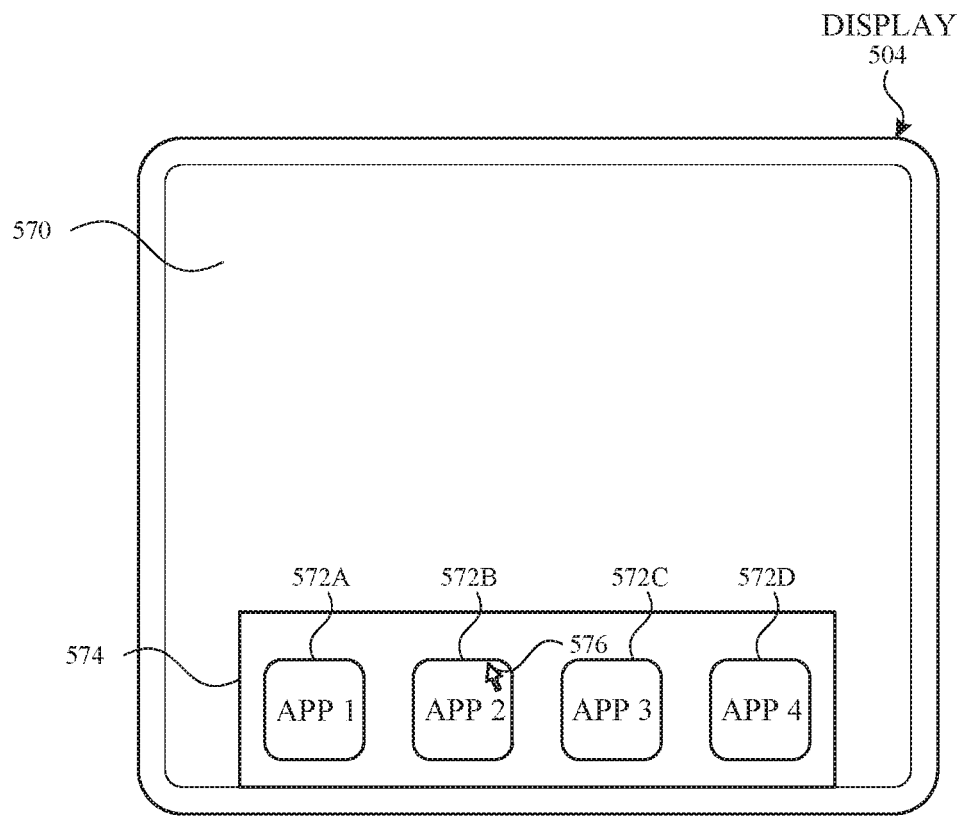
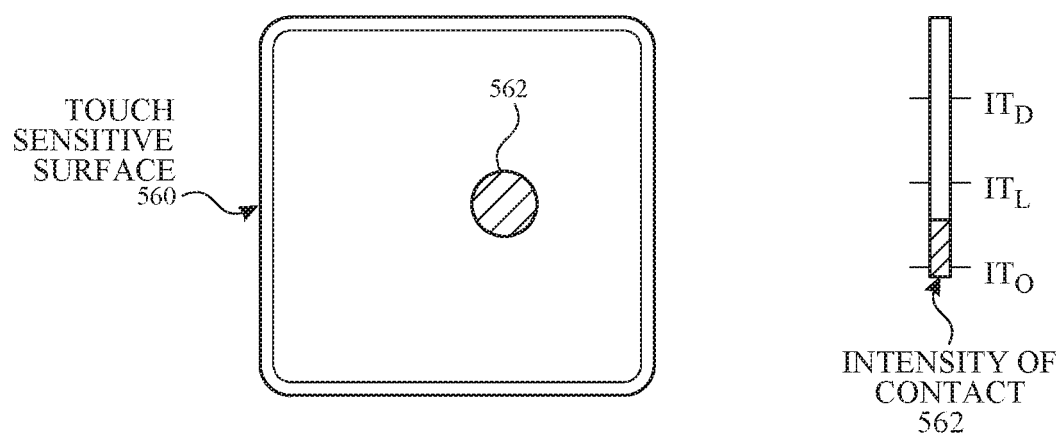
FIG. 5E

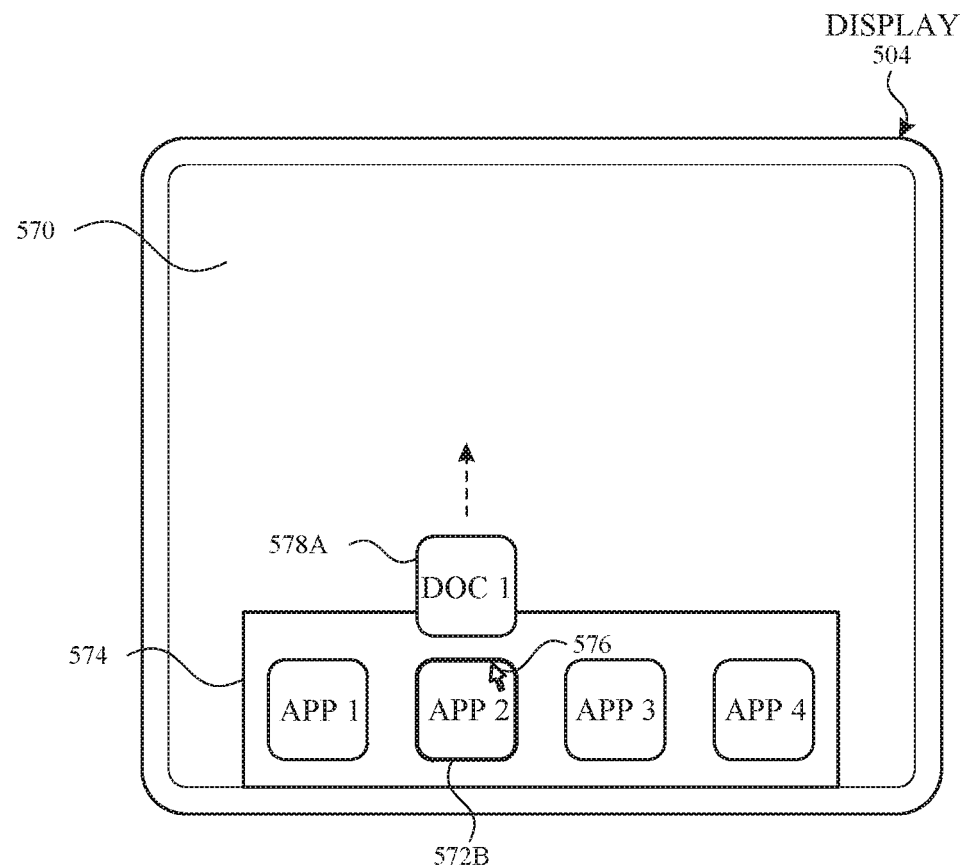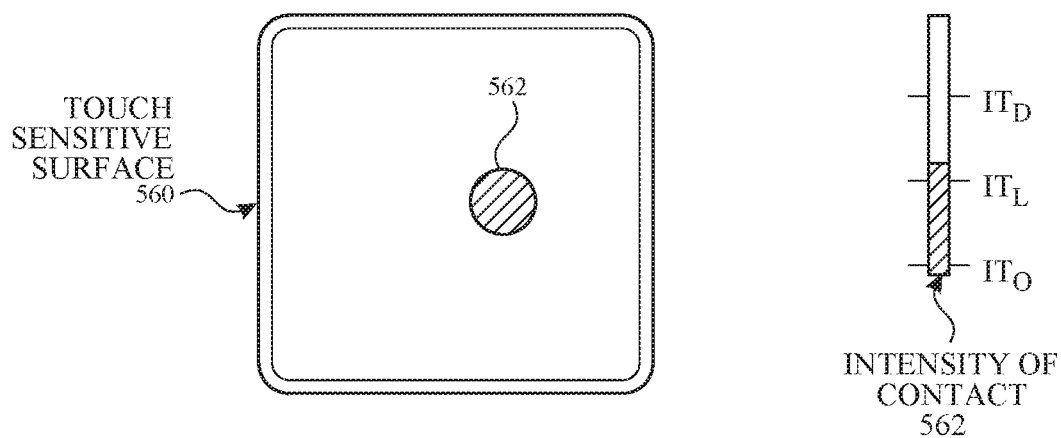
FIG. 5F

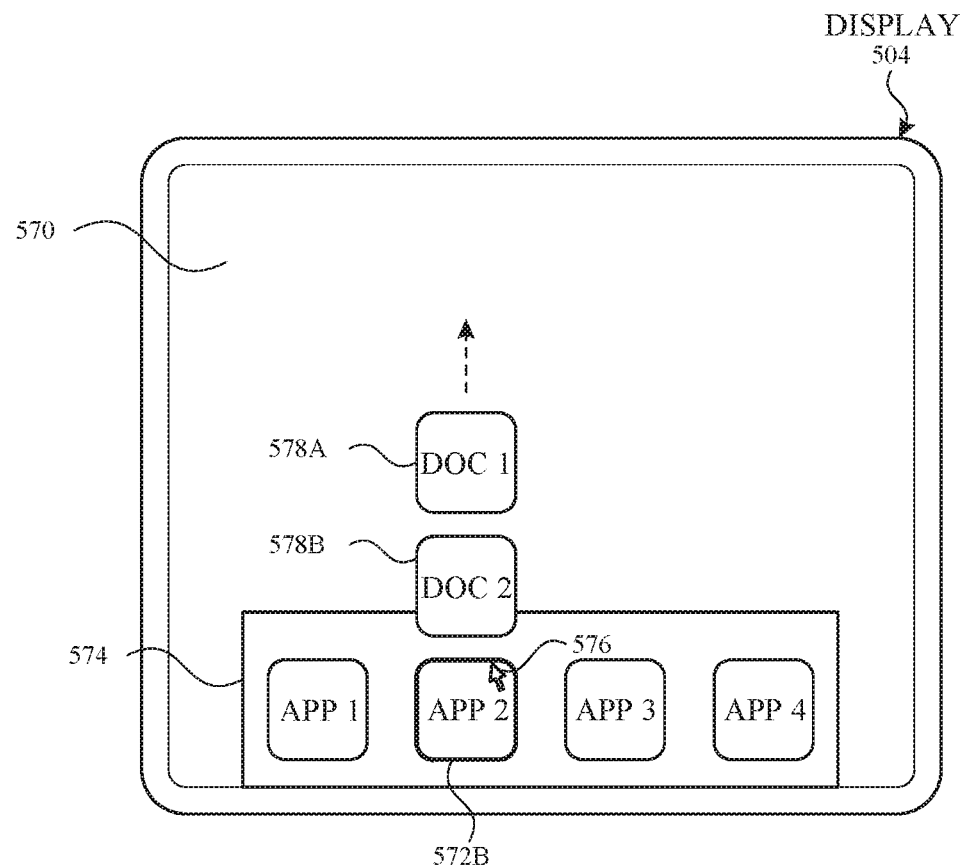
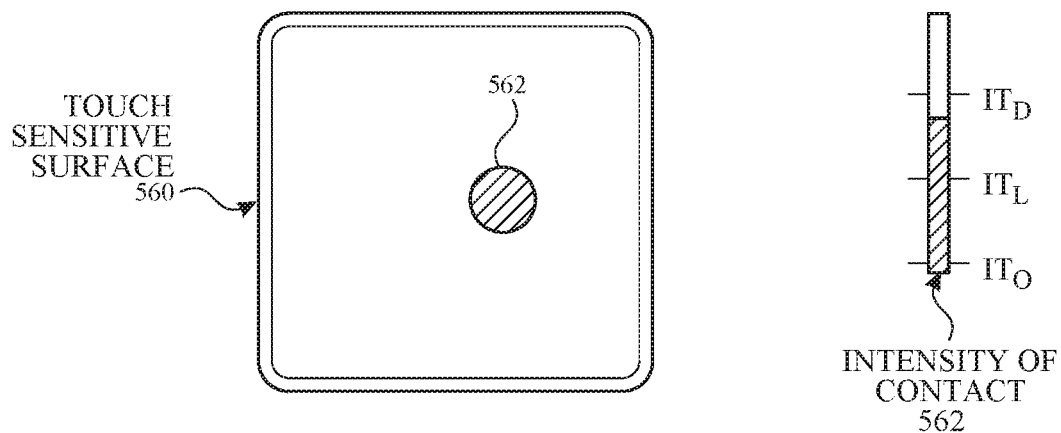
*FIG. 5G*

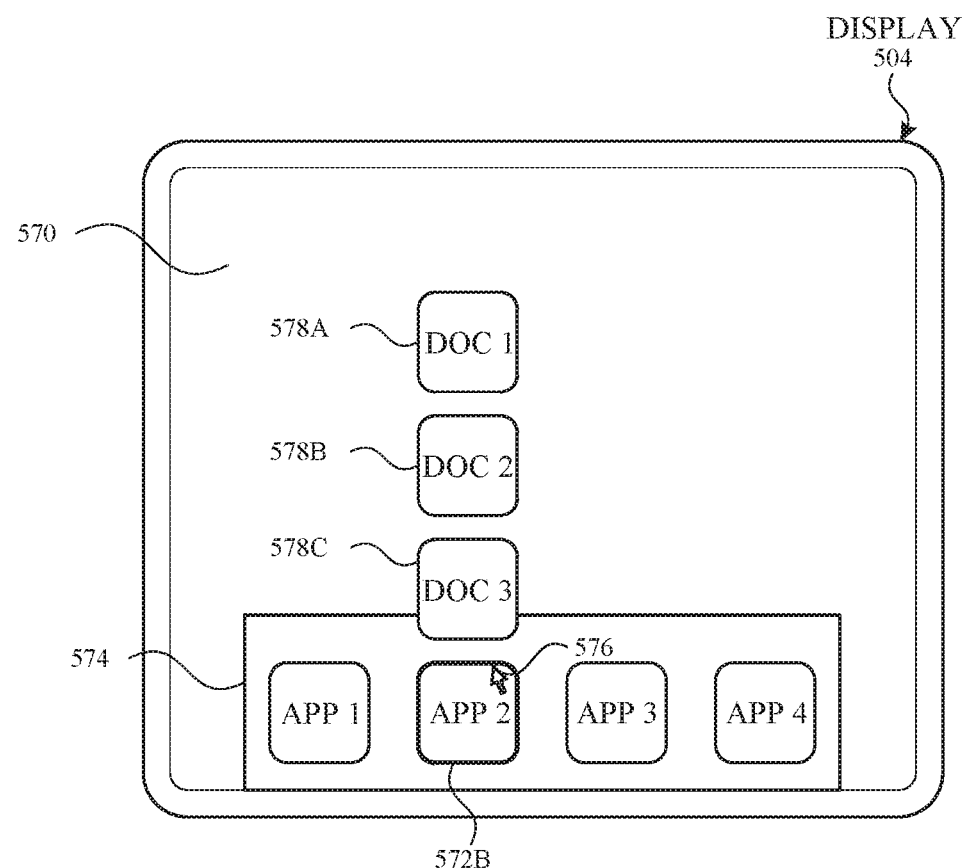
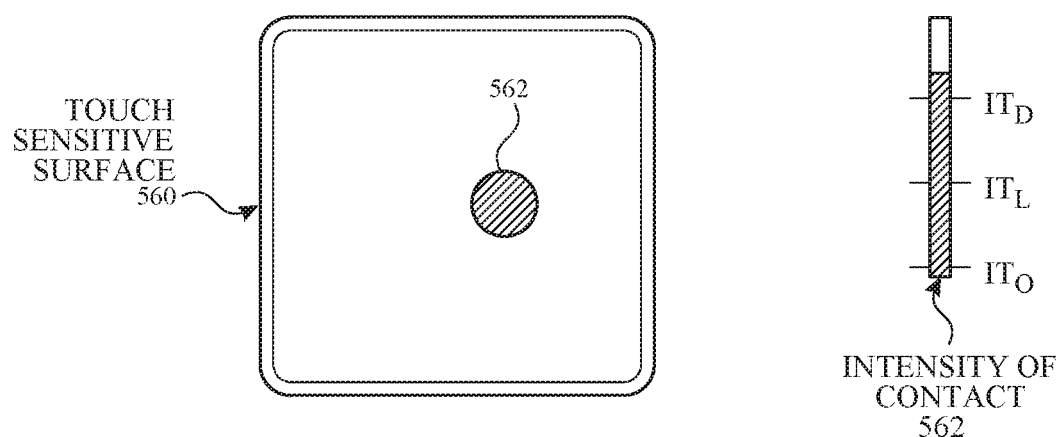
FIG. 5H

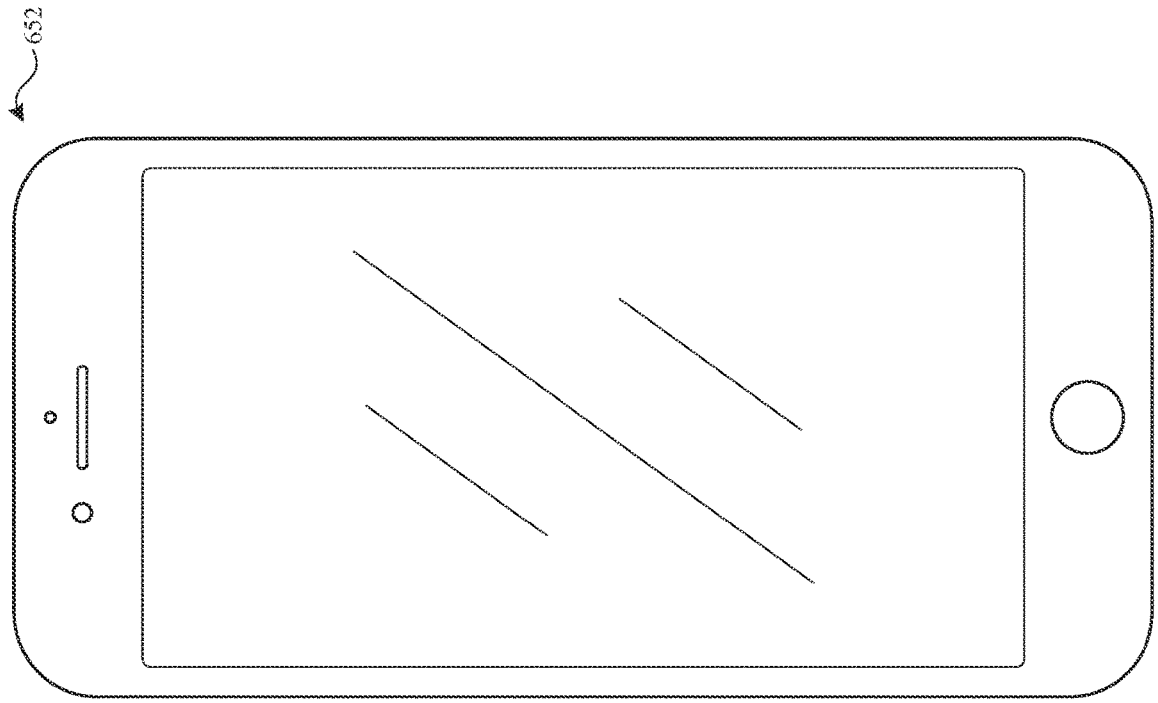
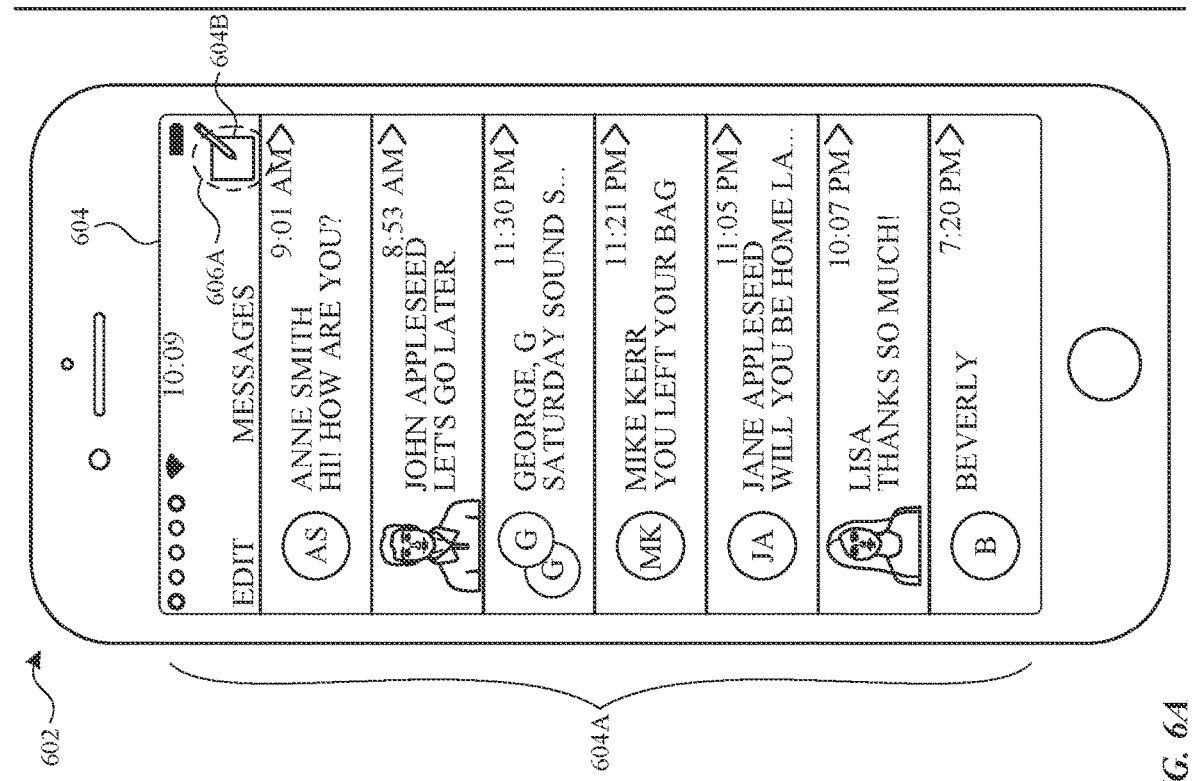
FIG. 6A

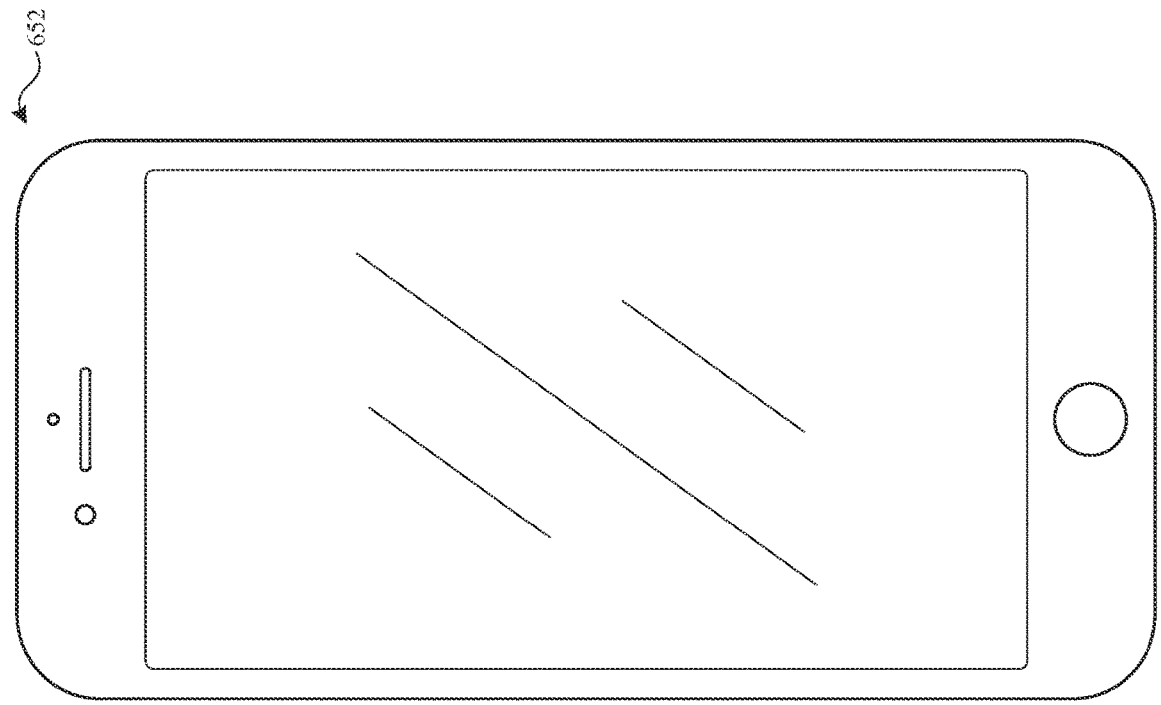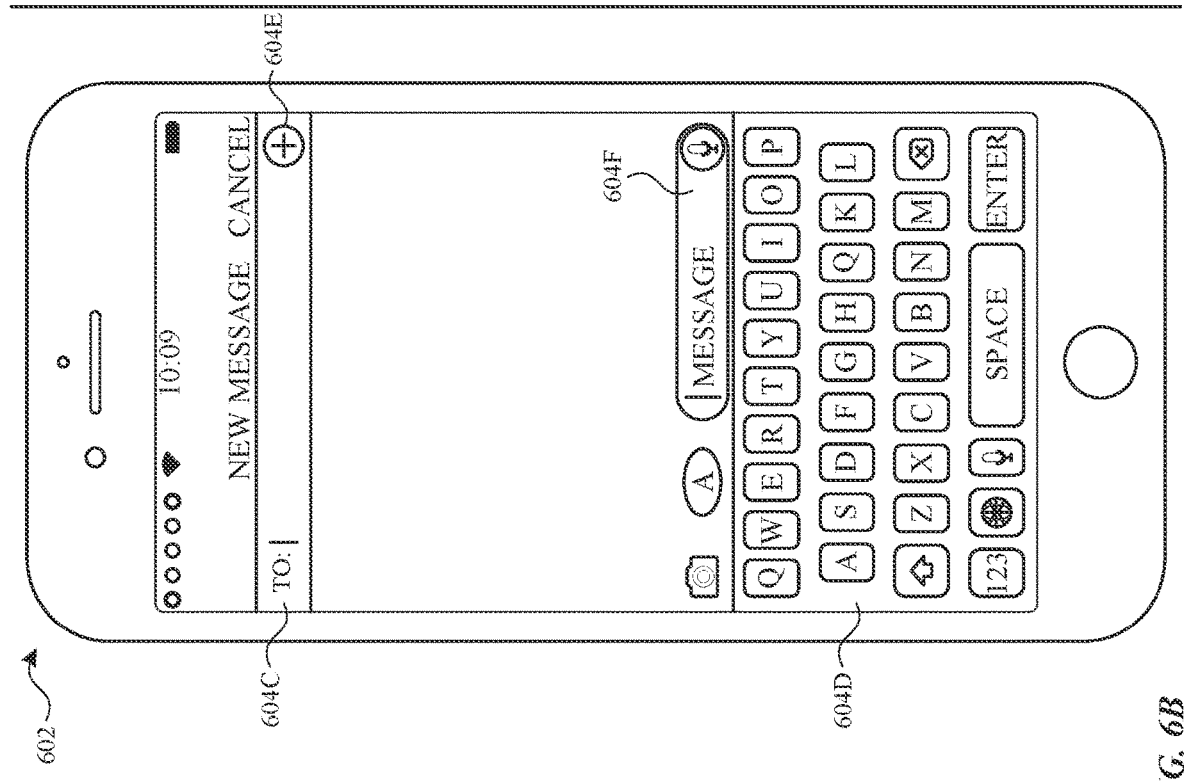
FIG. 6B

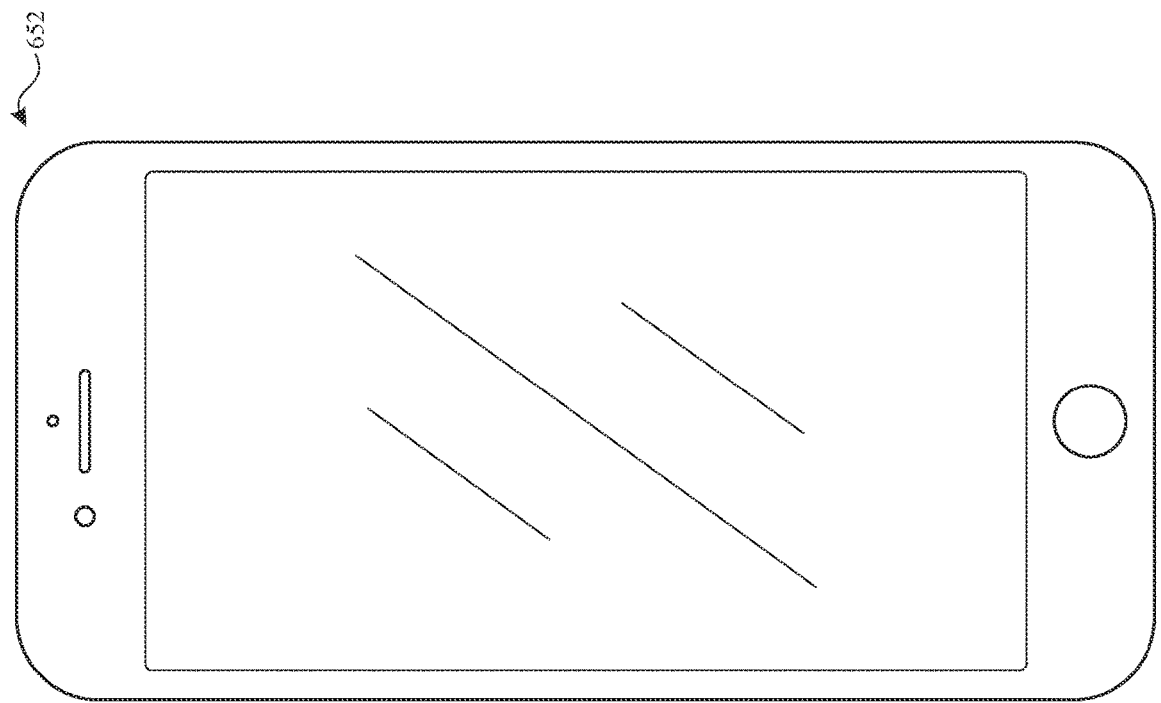
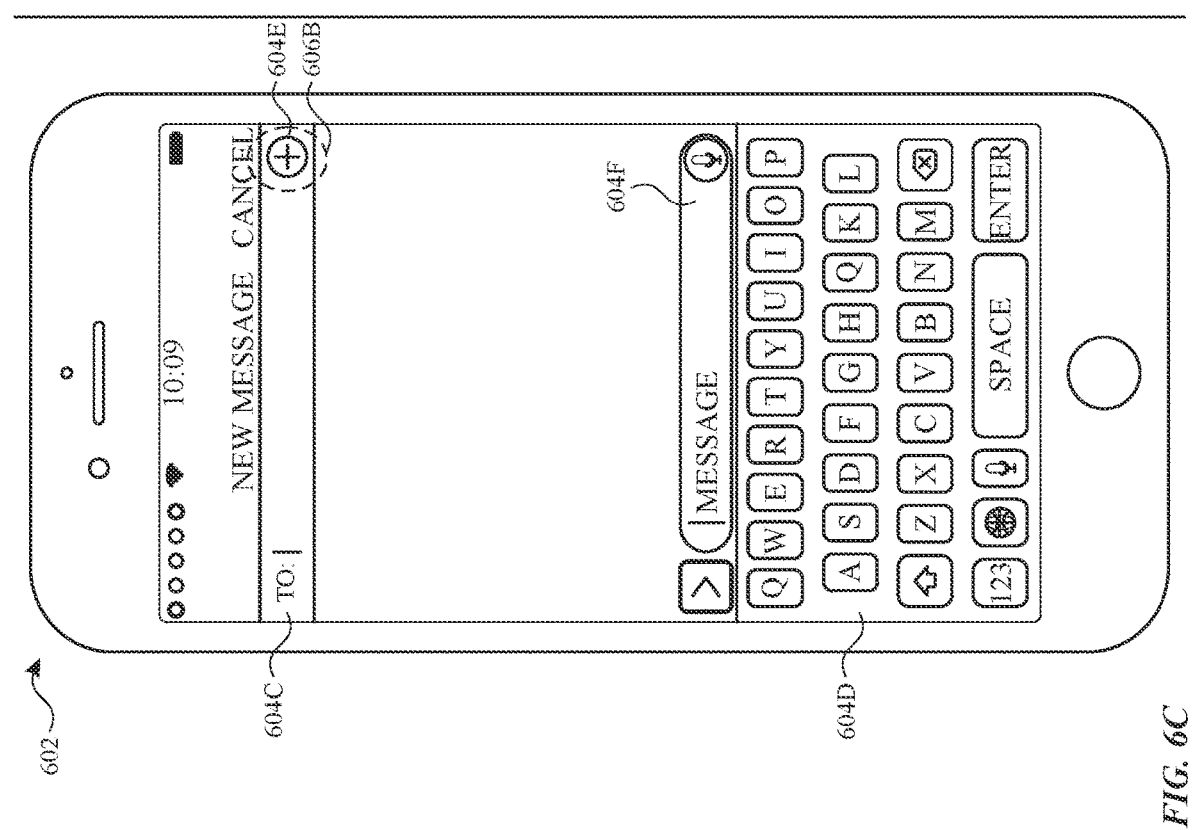
FIG. 6C

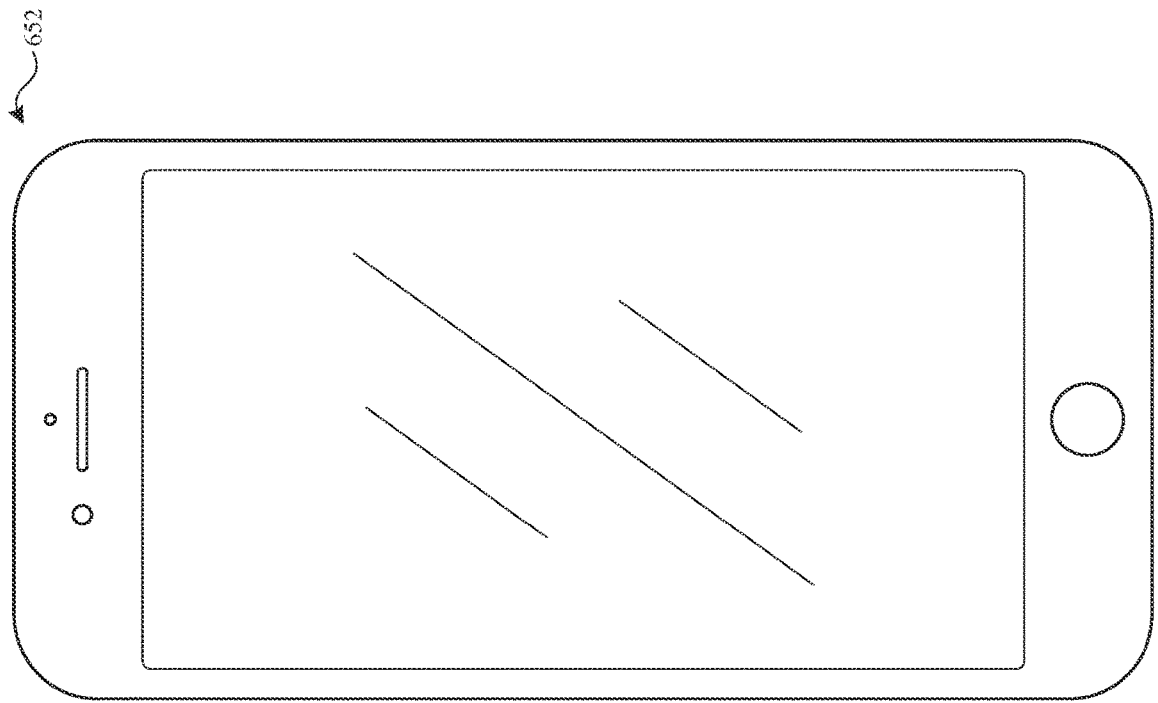
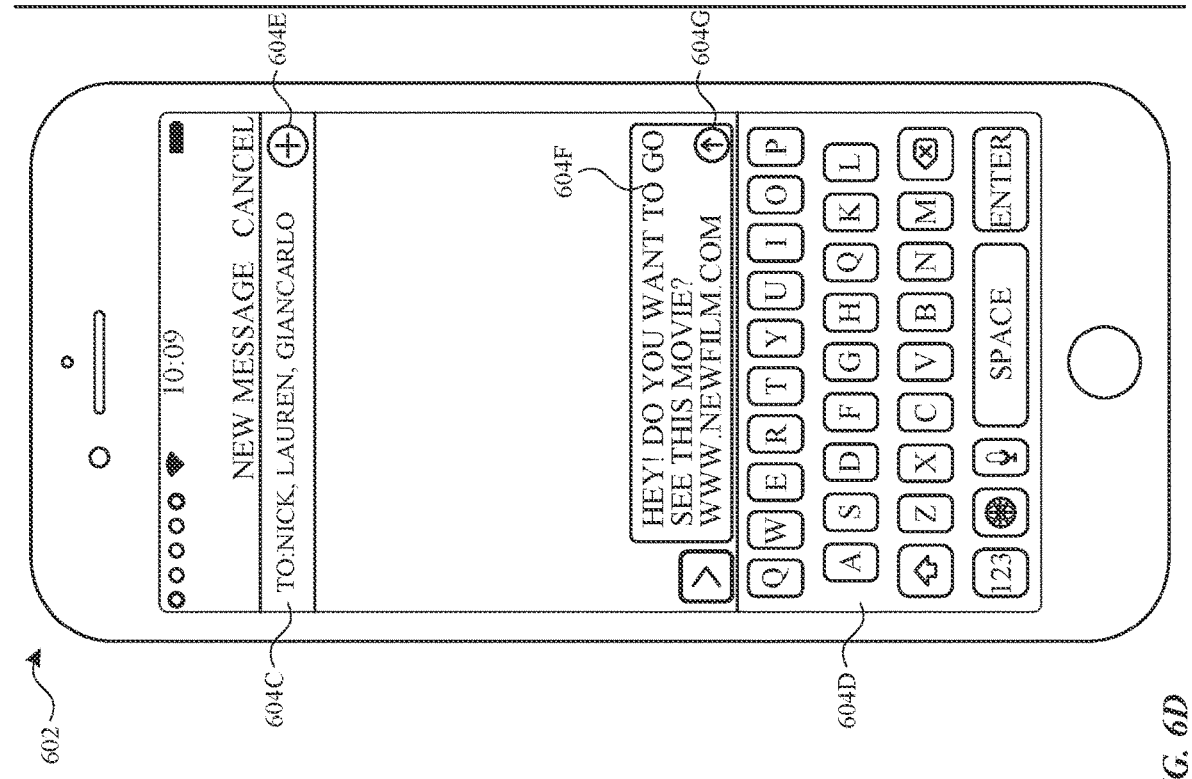
FIG. 6D

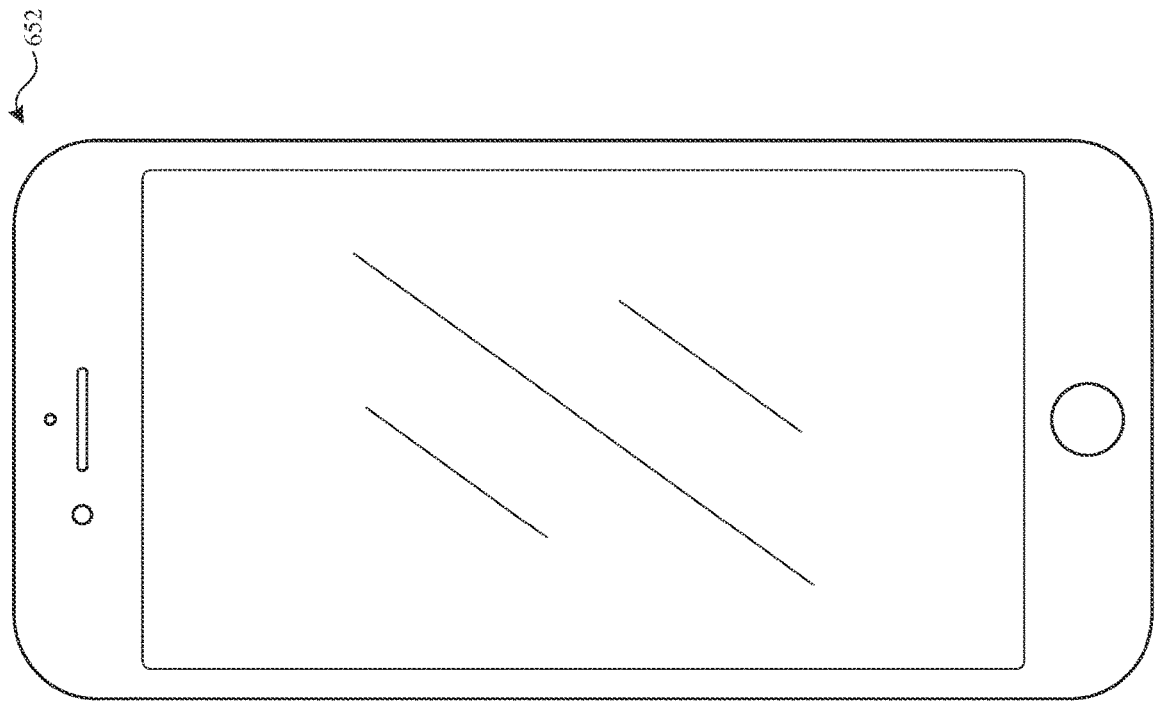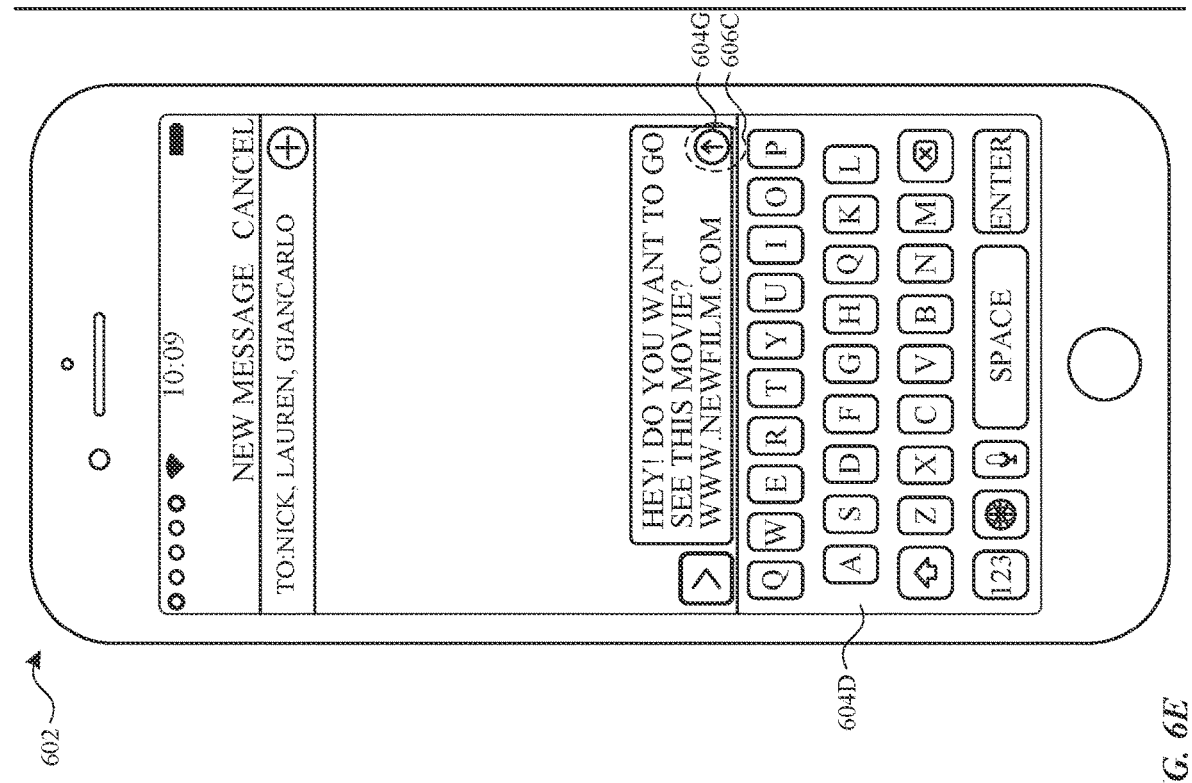
FIG. 6E

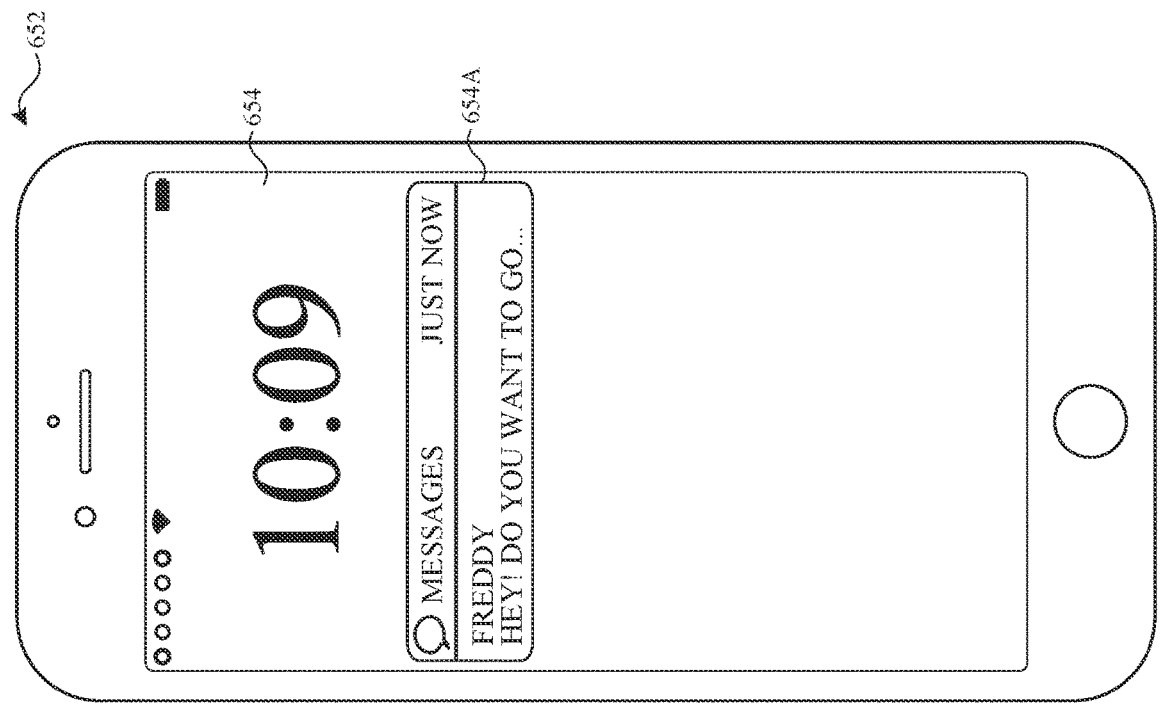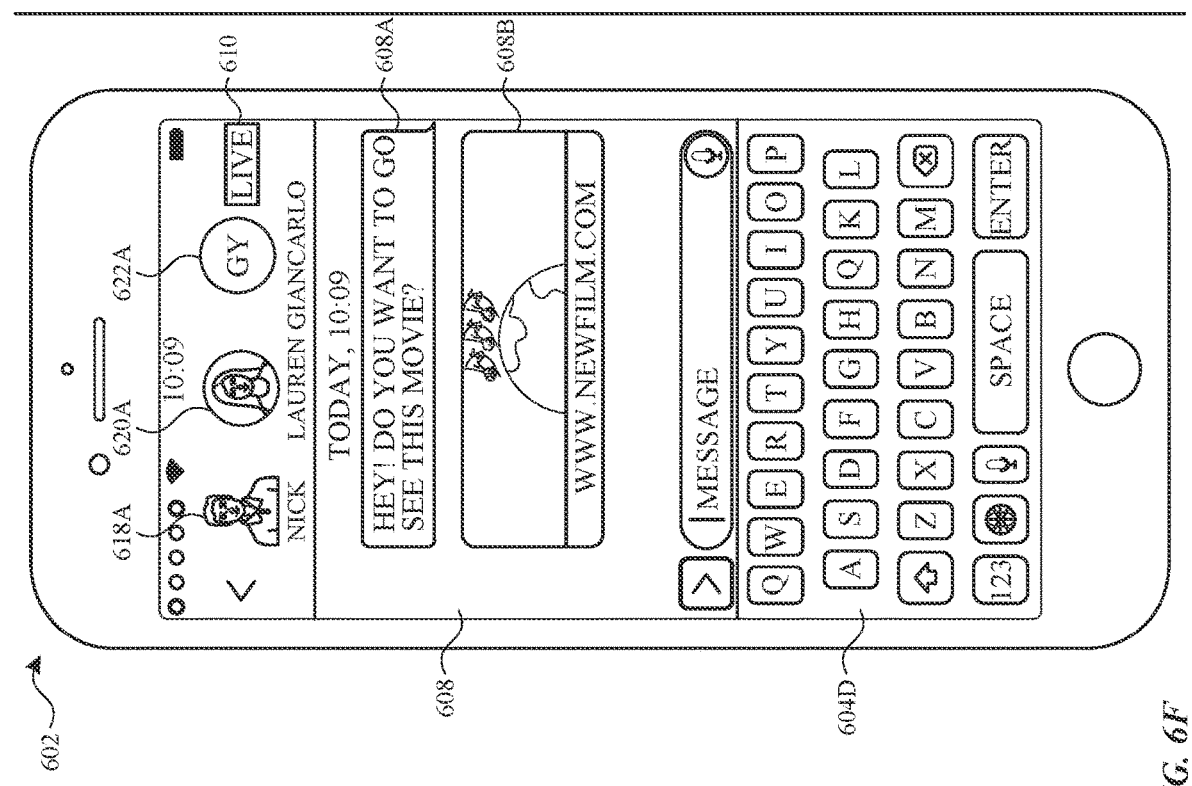
FIG. 6F

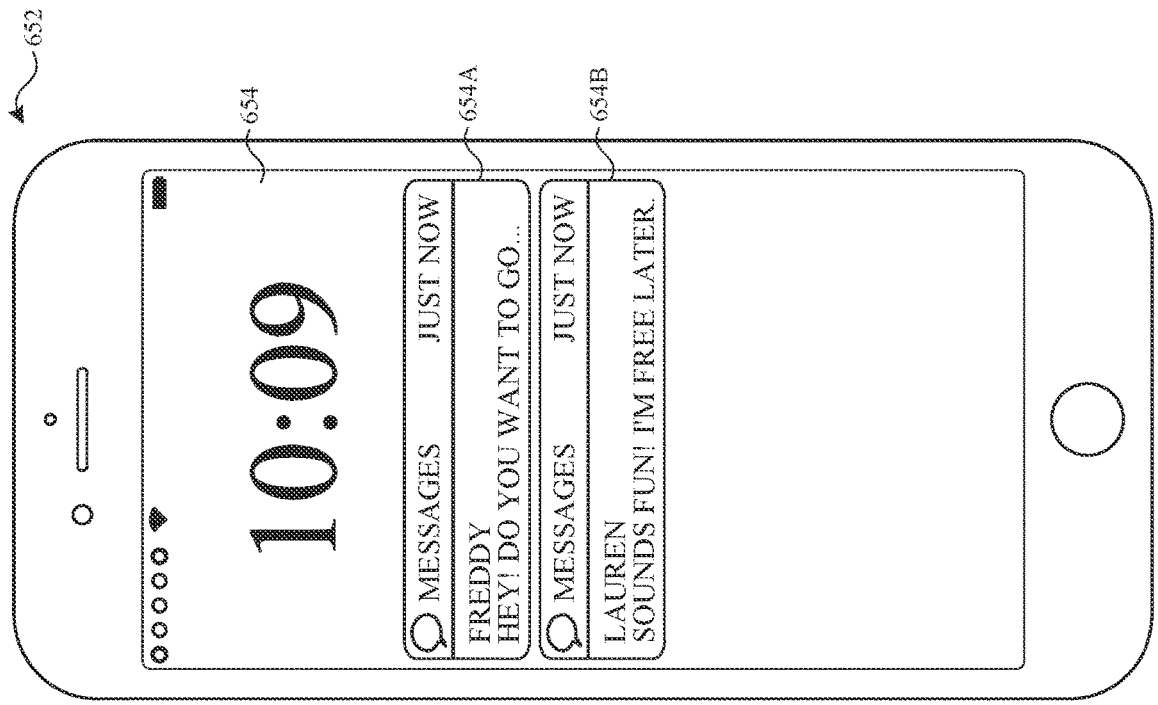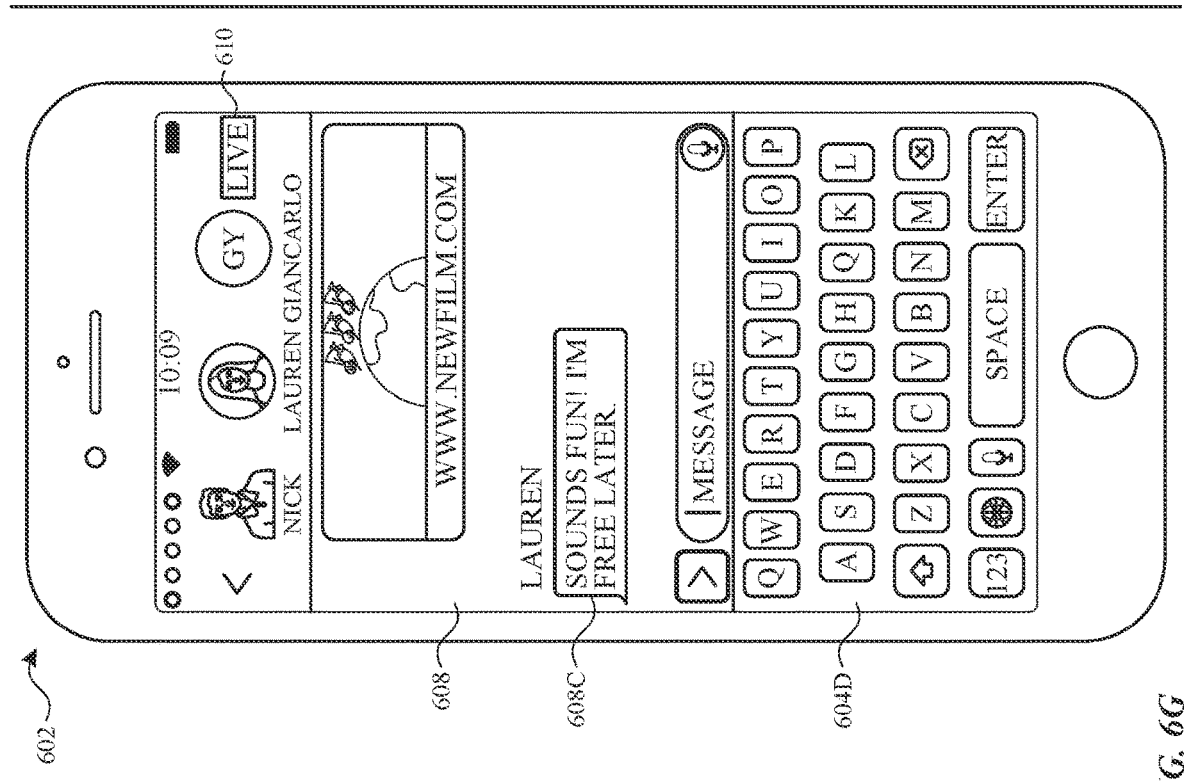
FIG. 6G

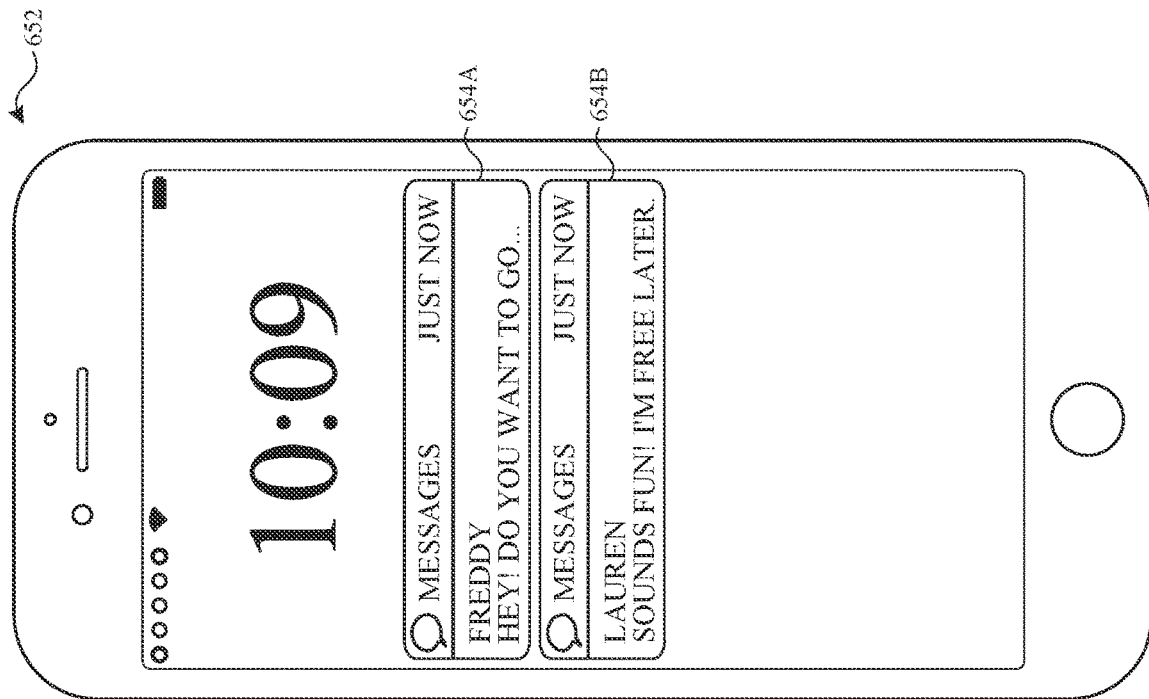
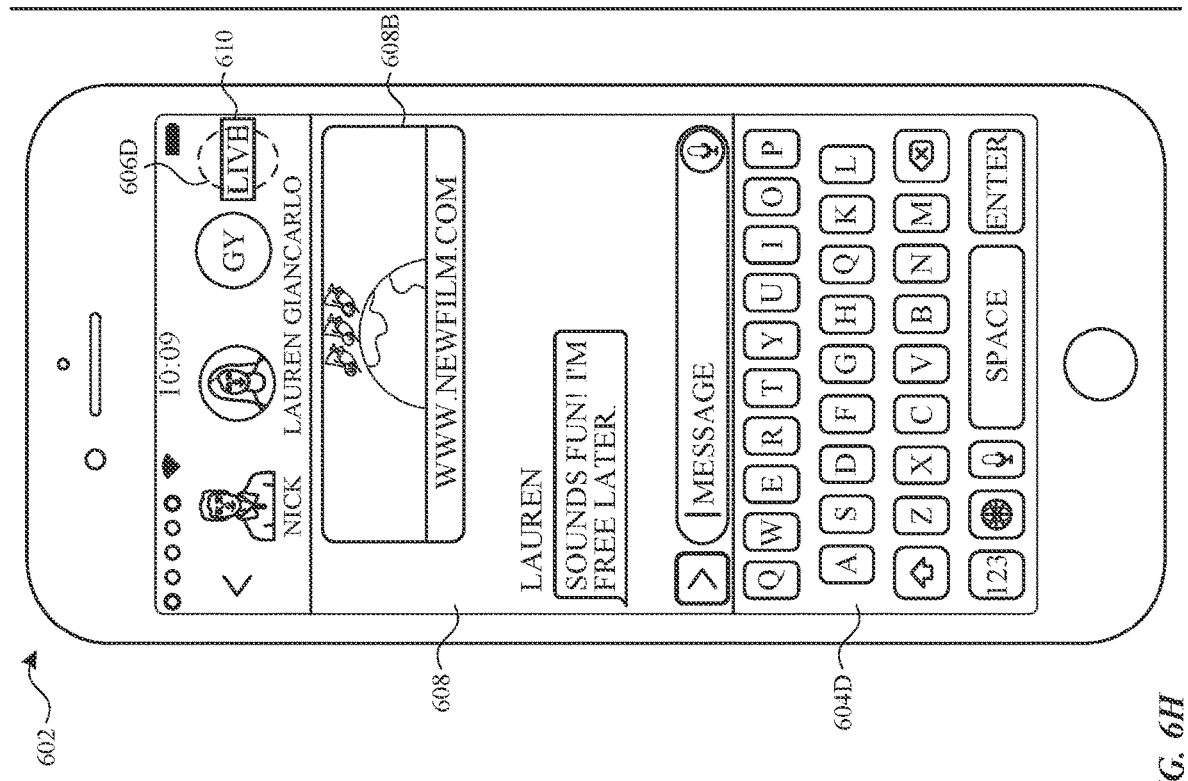
FIG. 6H

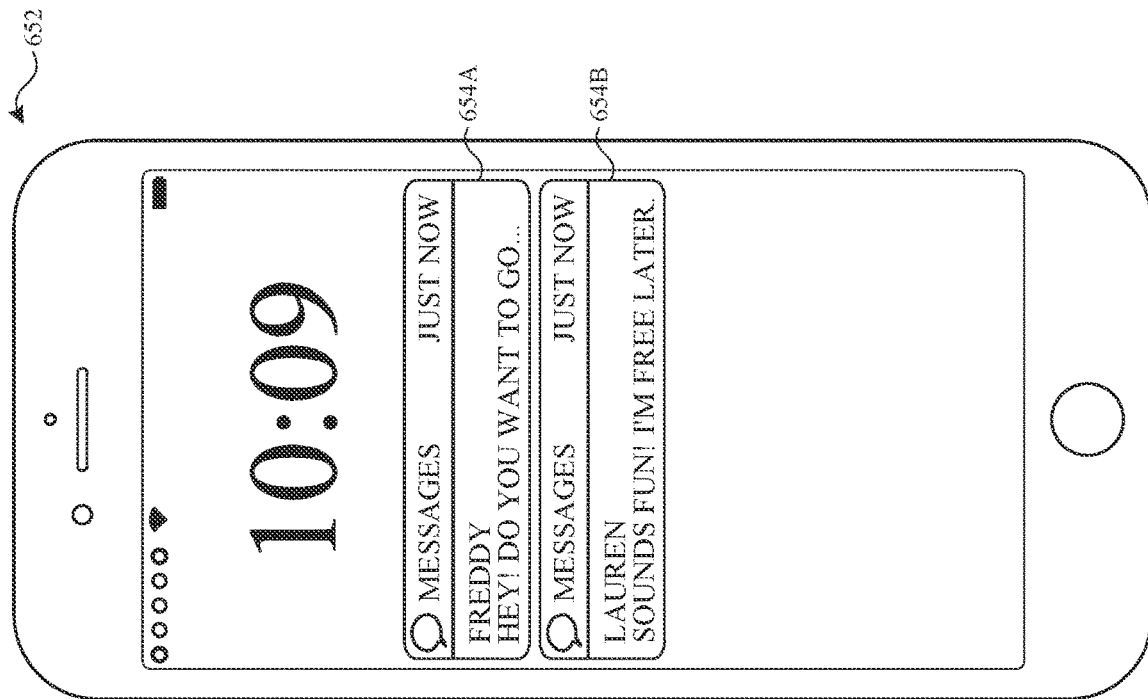
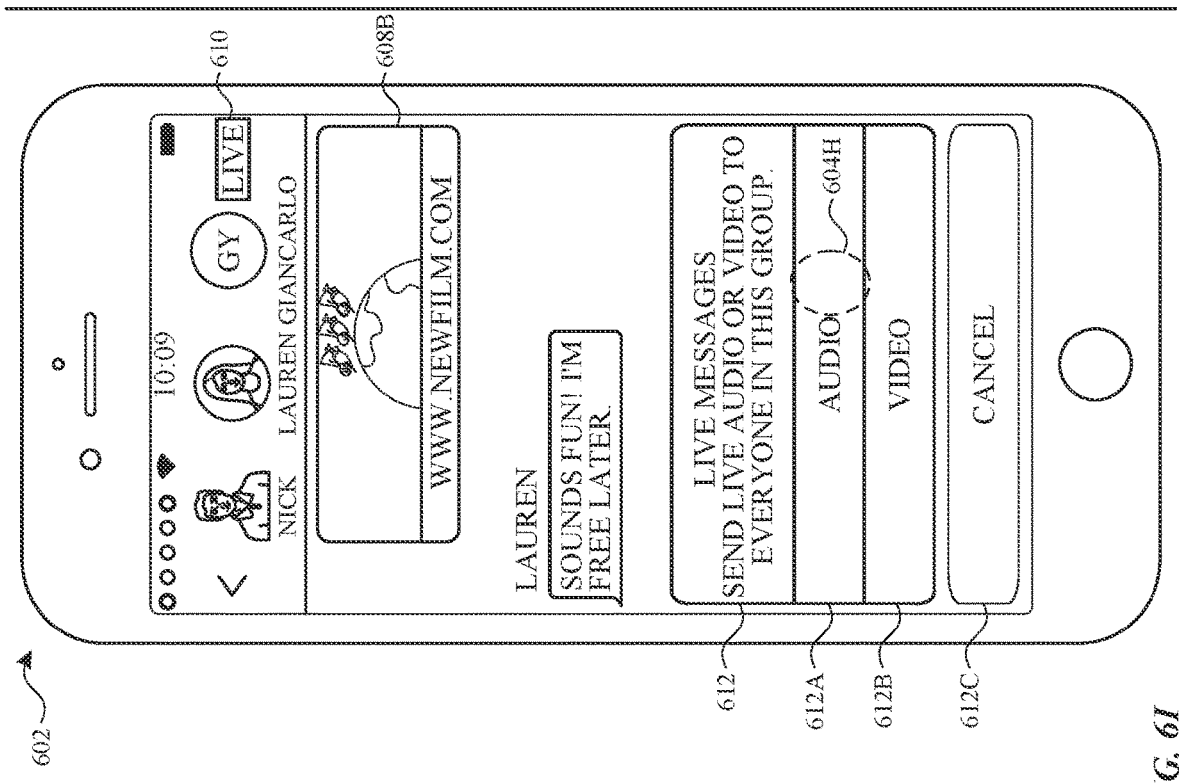
FIG. 6I

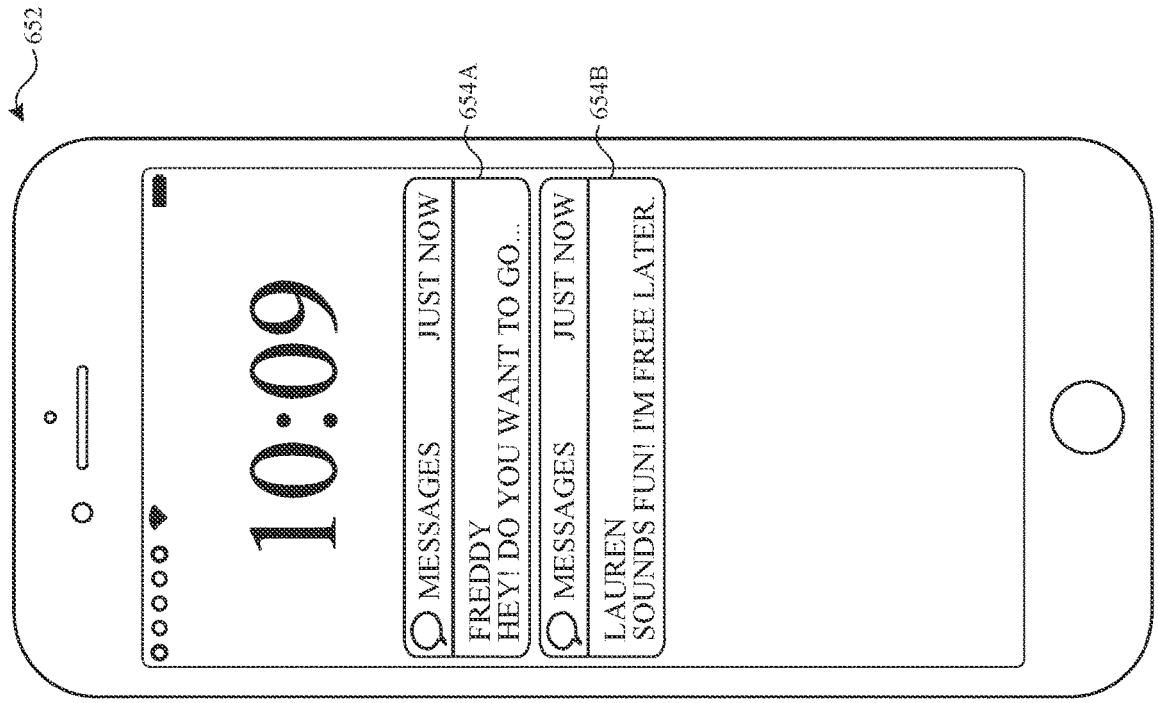
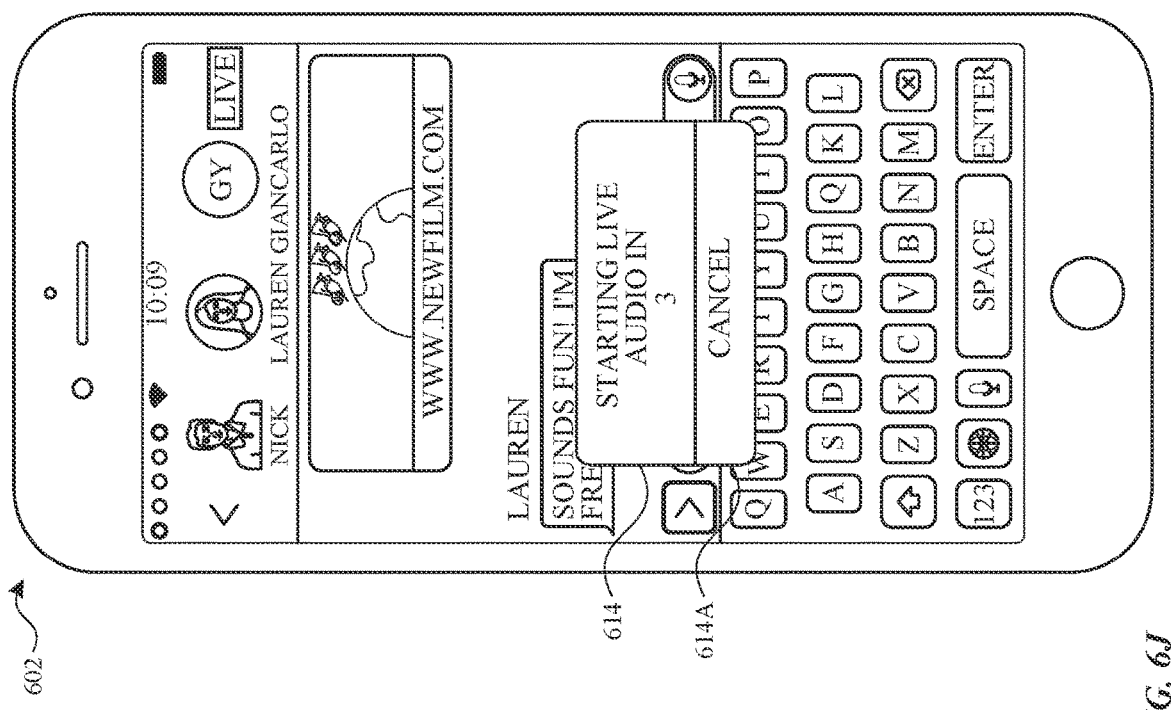
FIG. 6J

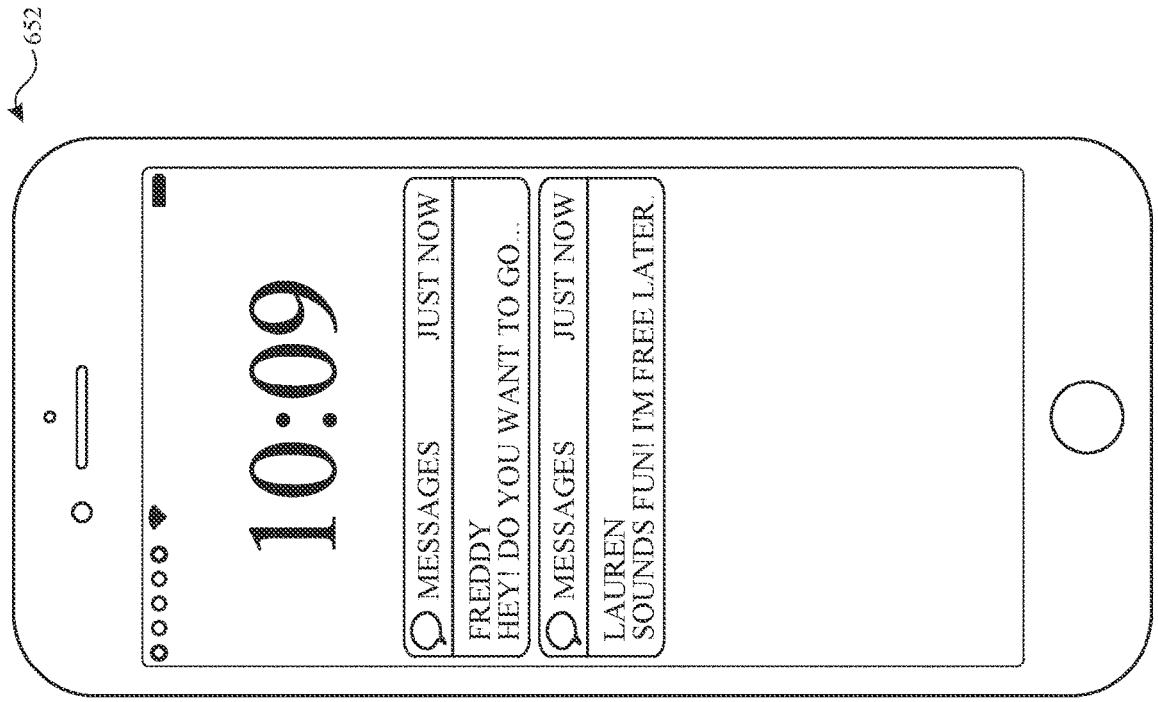
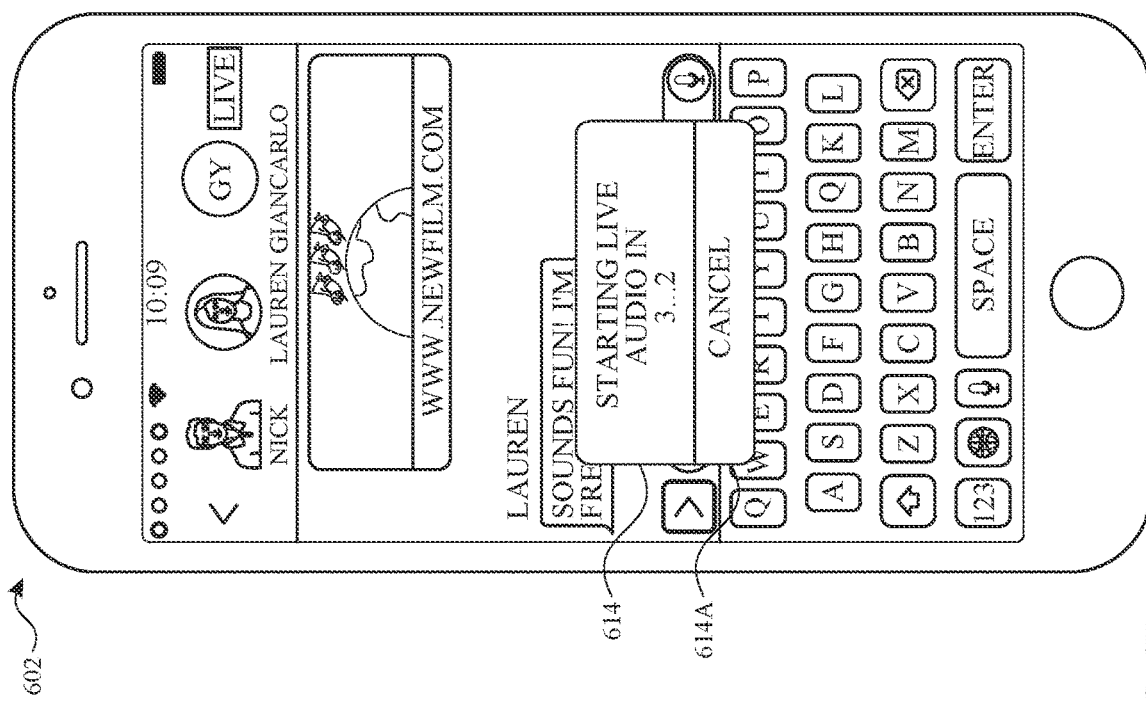
FIG. 6K

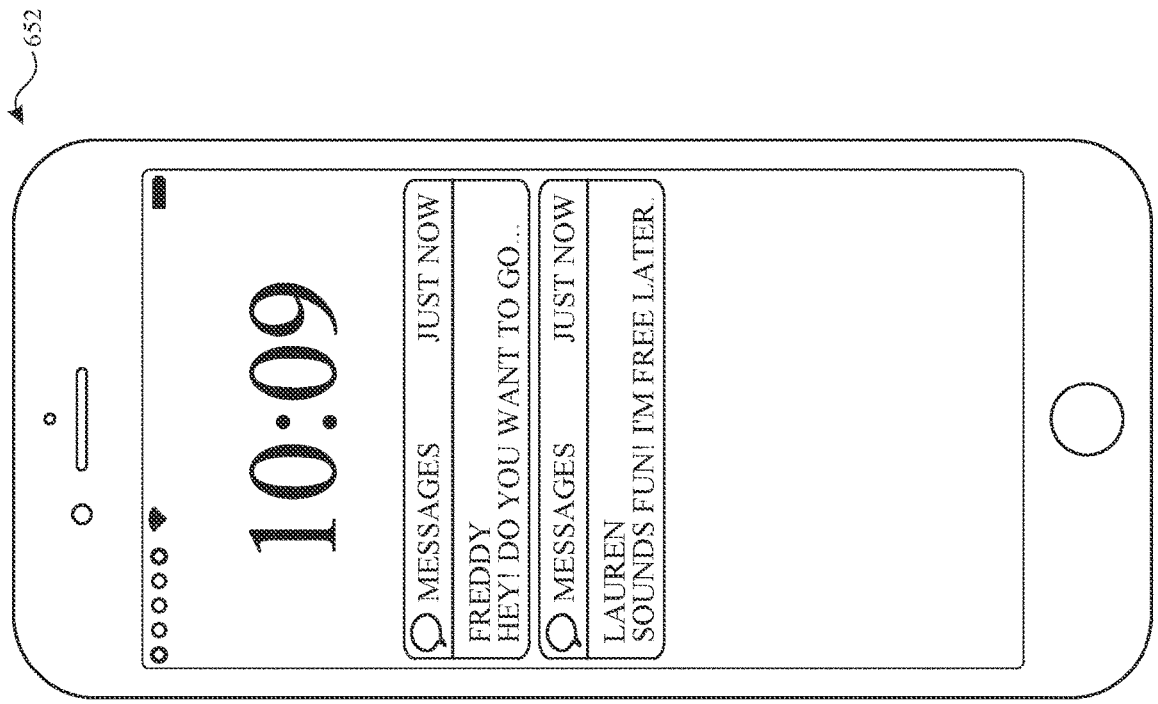
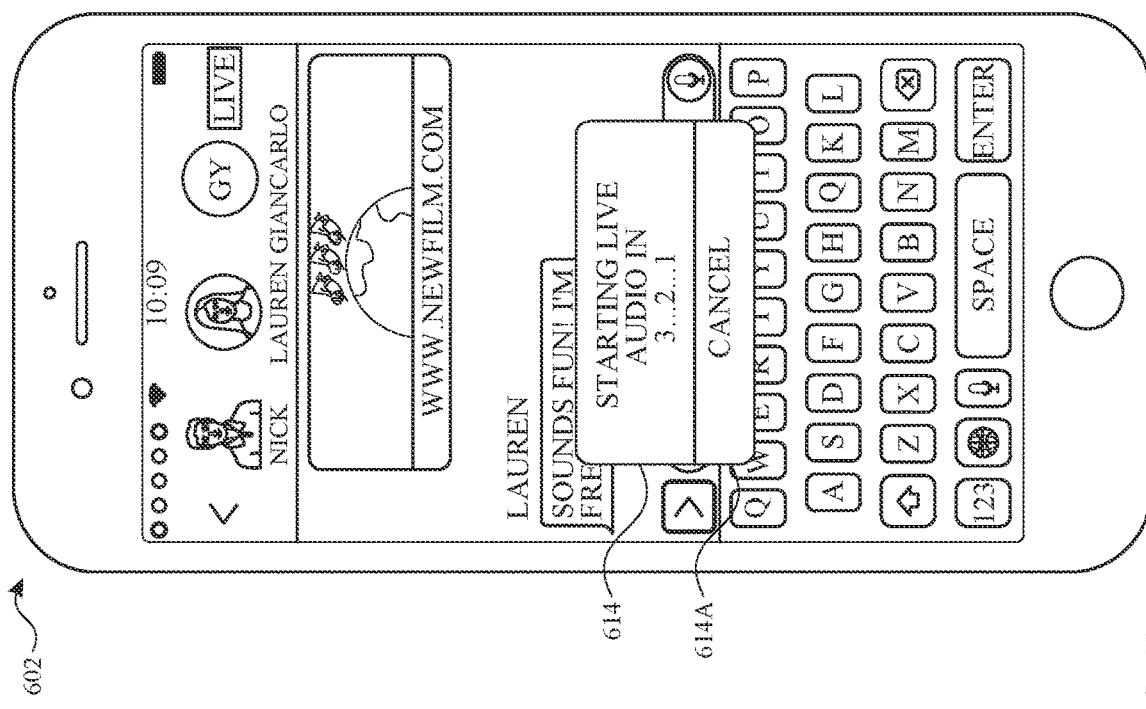
FIG. 6L

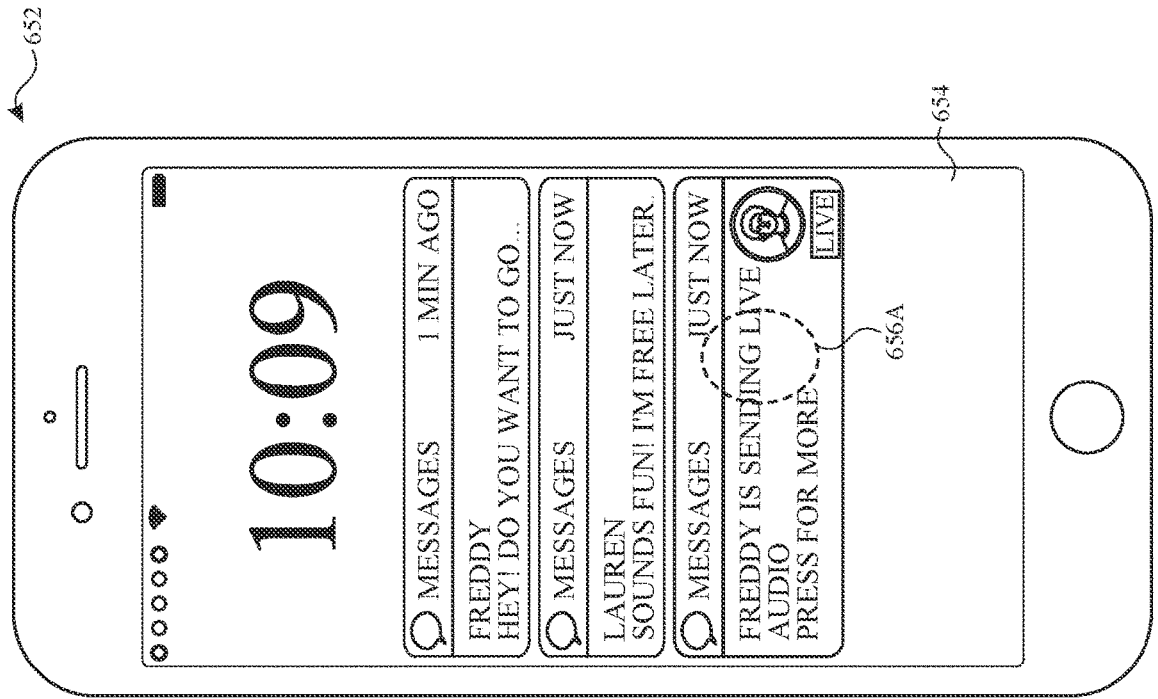
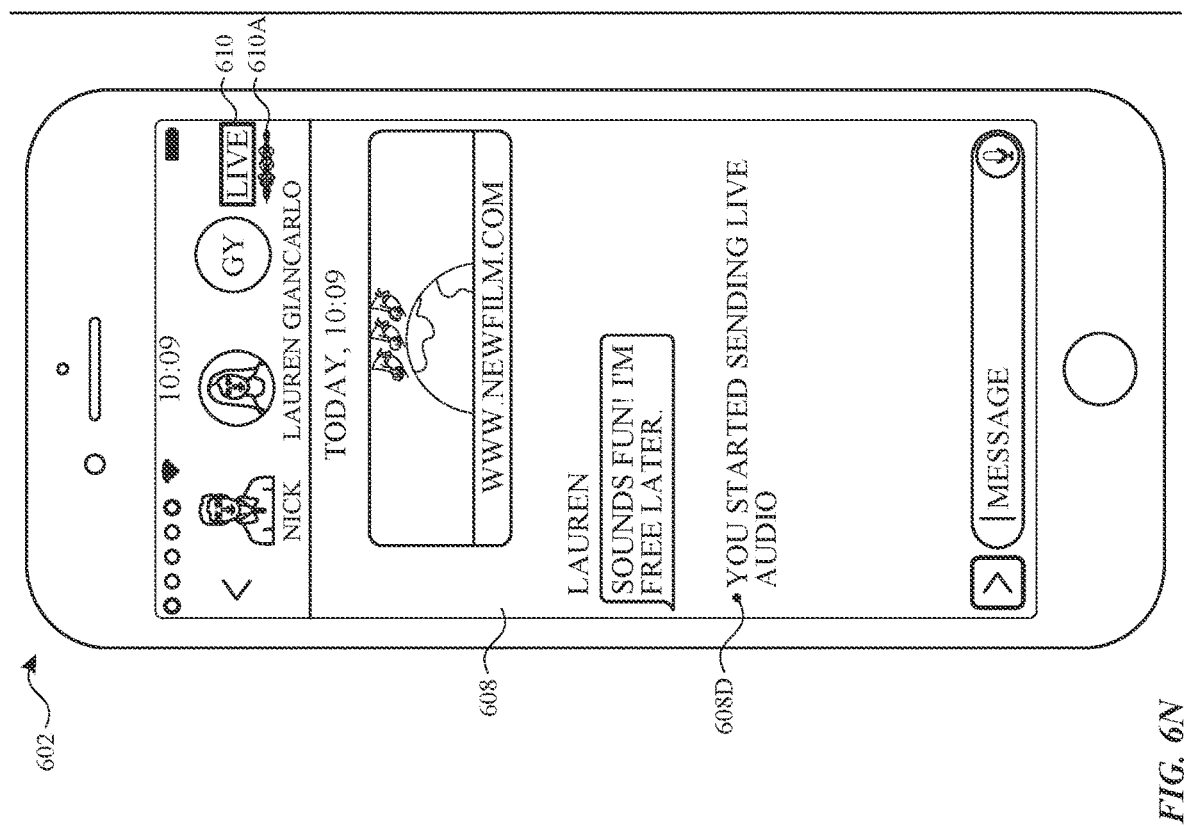
FIG. 6N

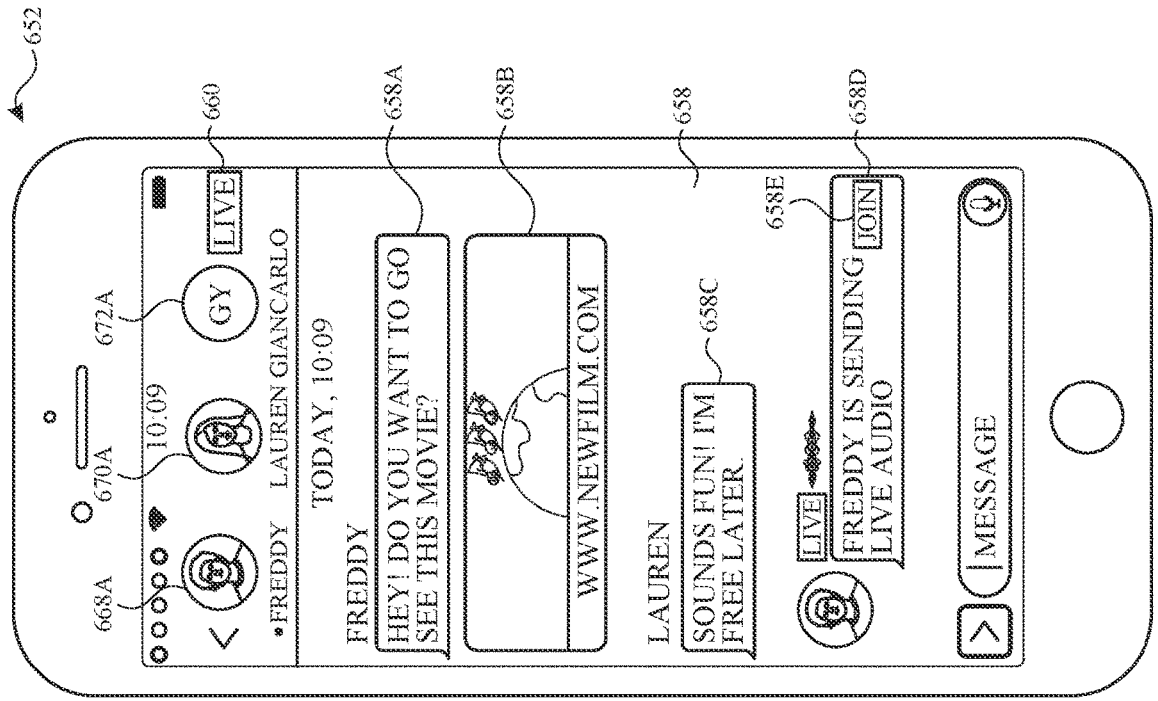
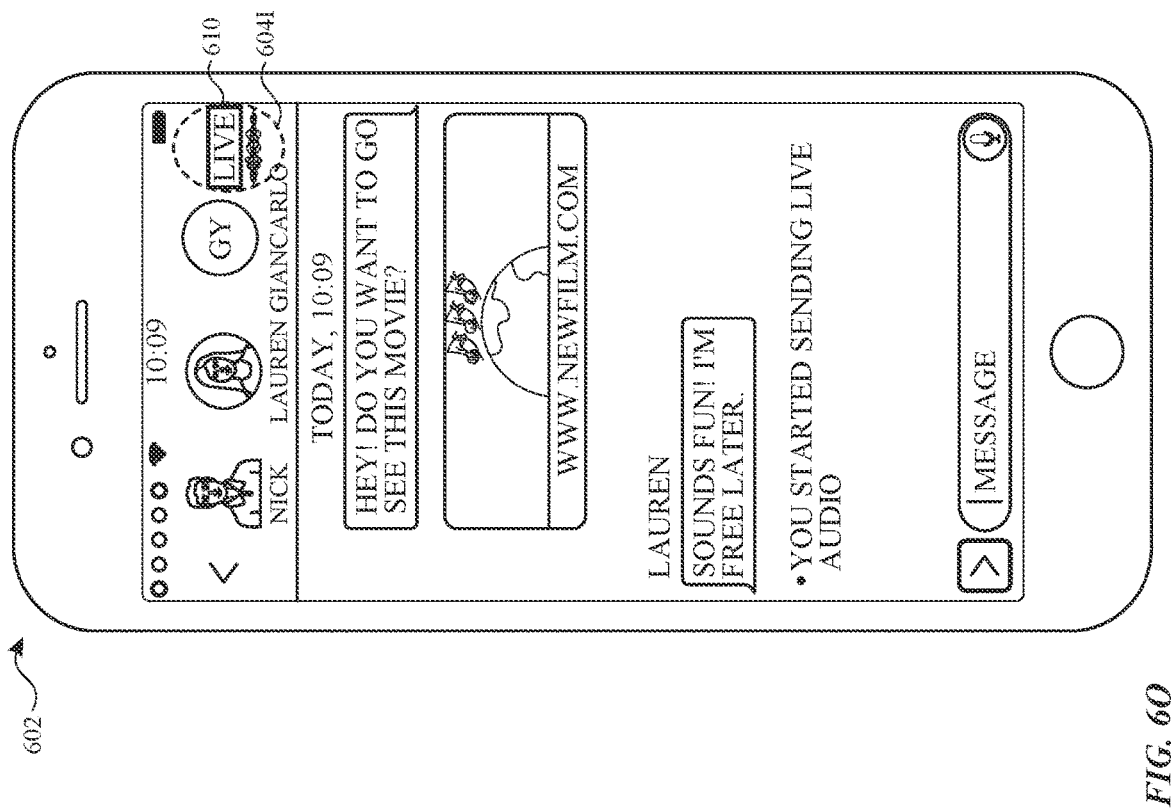
FIG. 6O

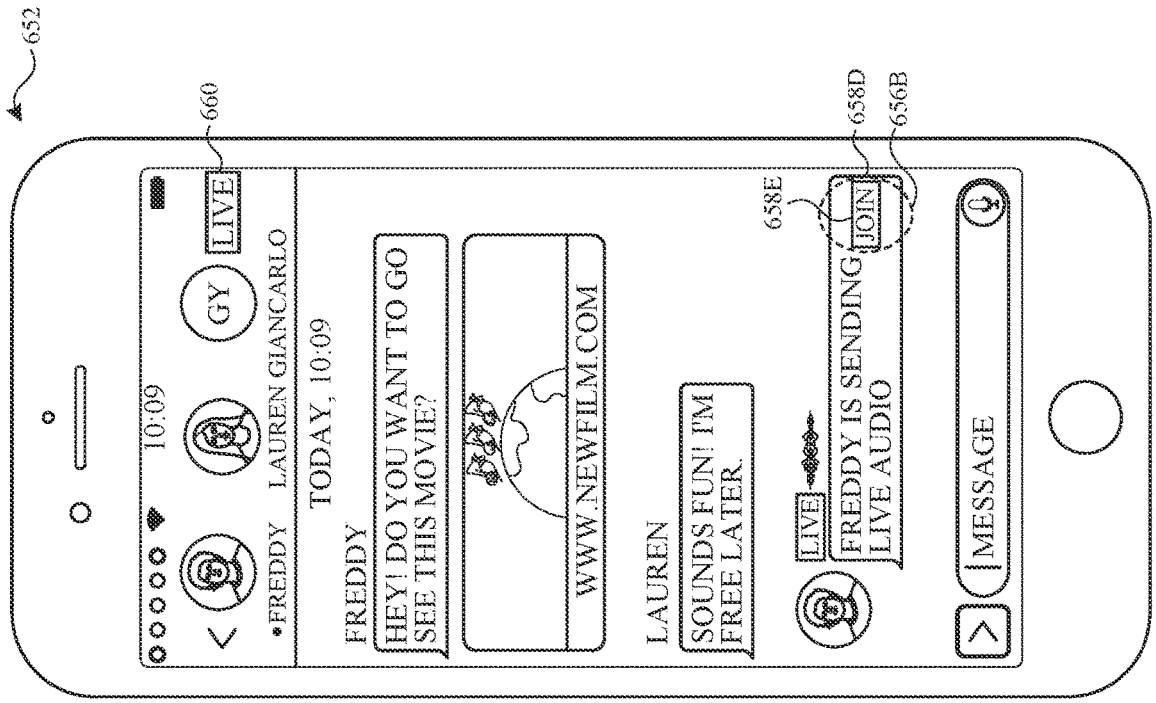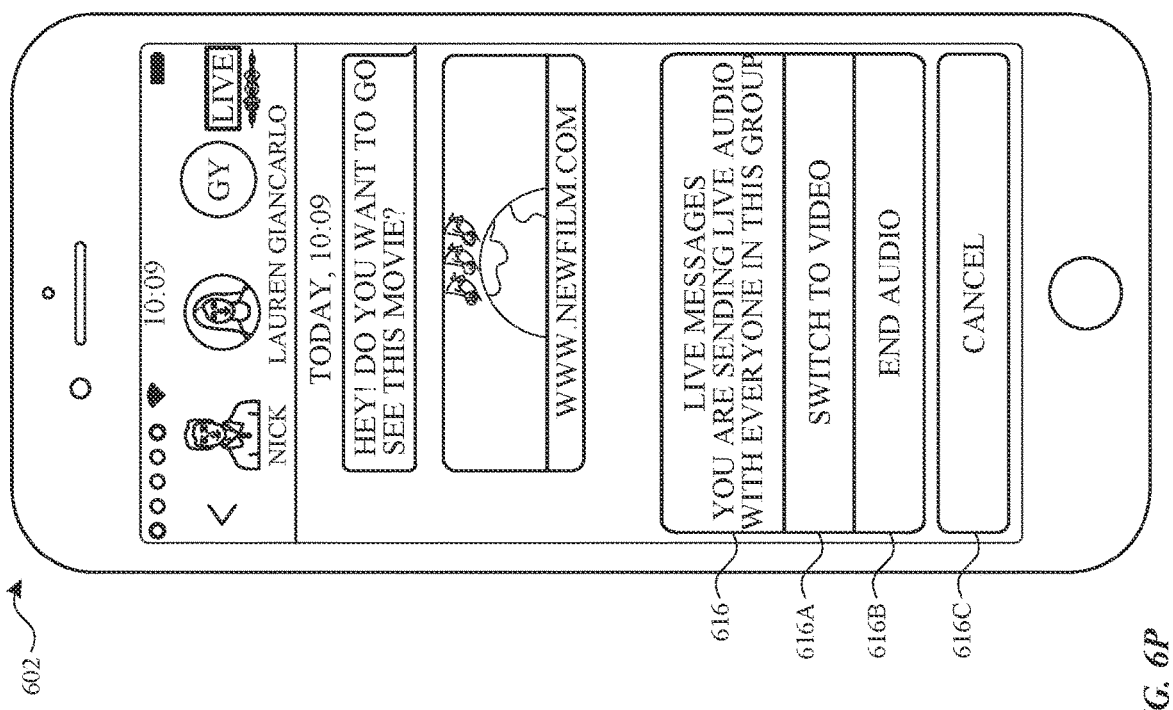
FIG. 6P

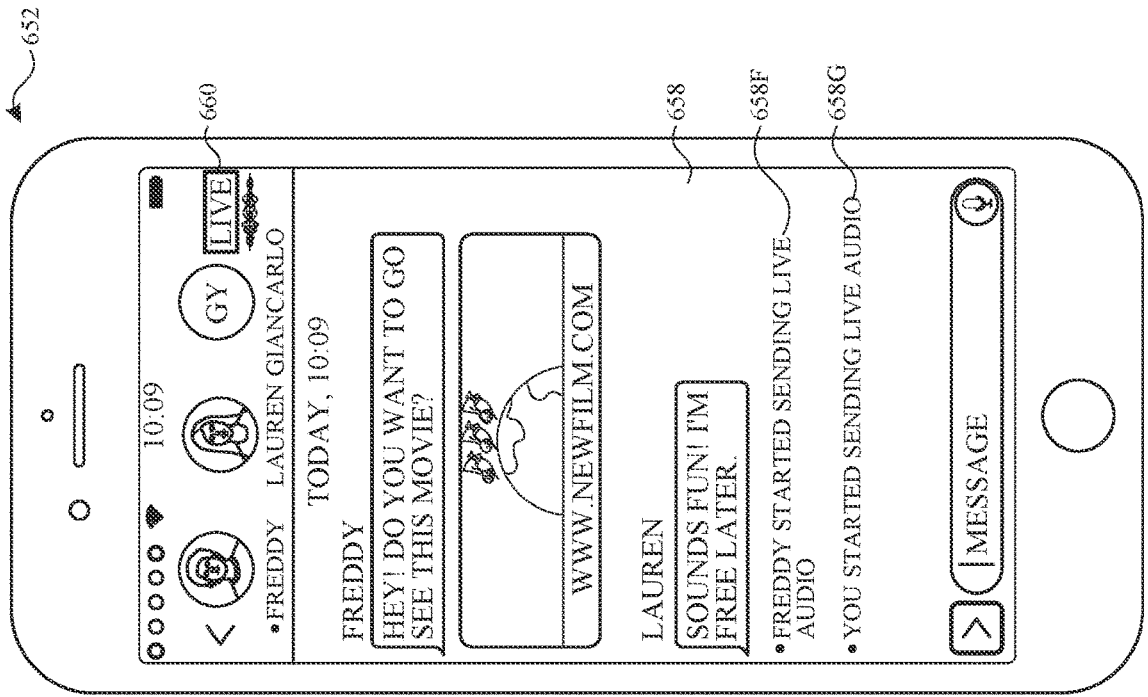
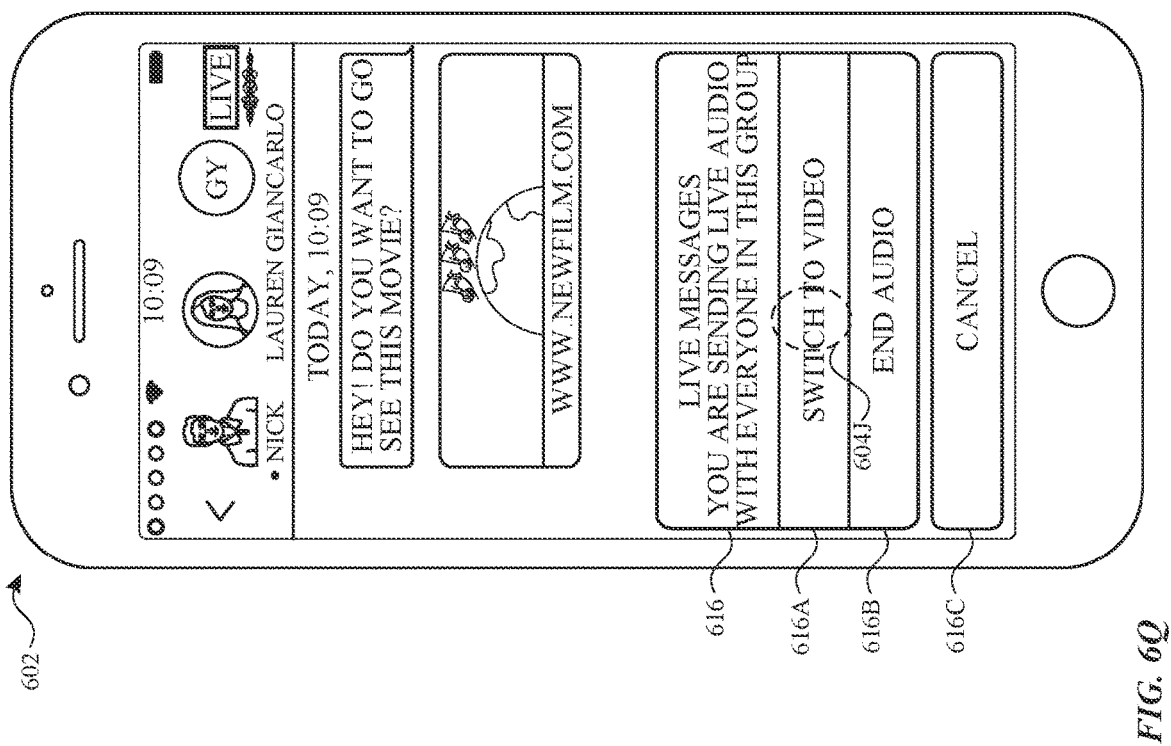
FIG. 6Q

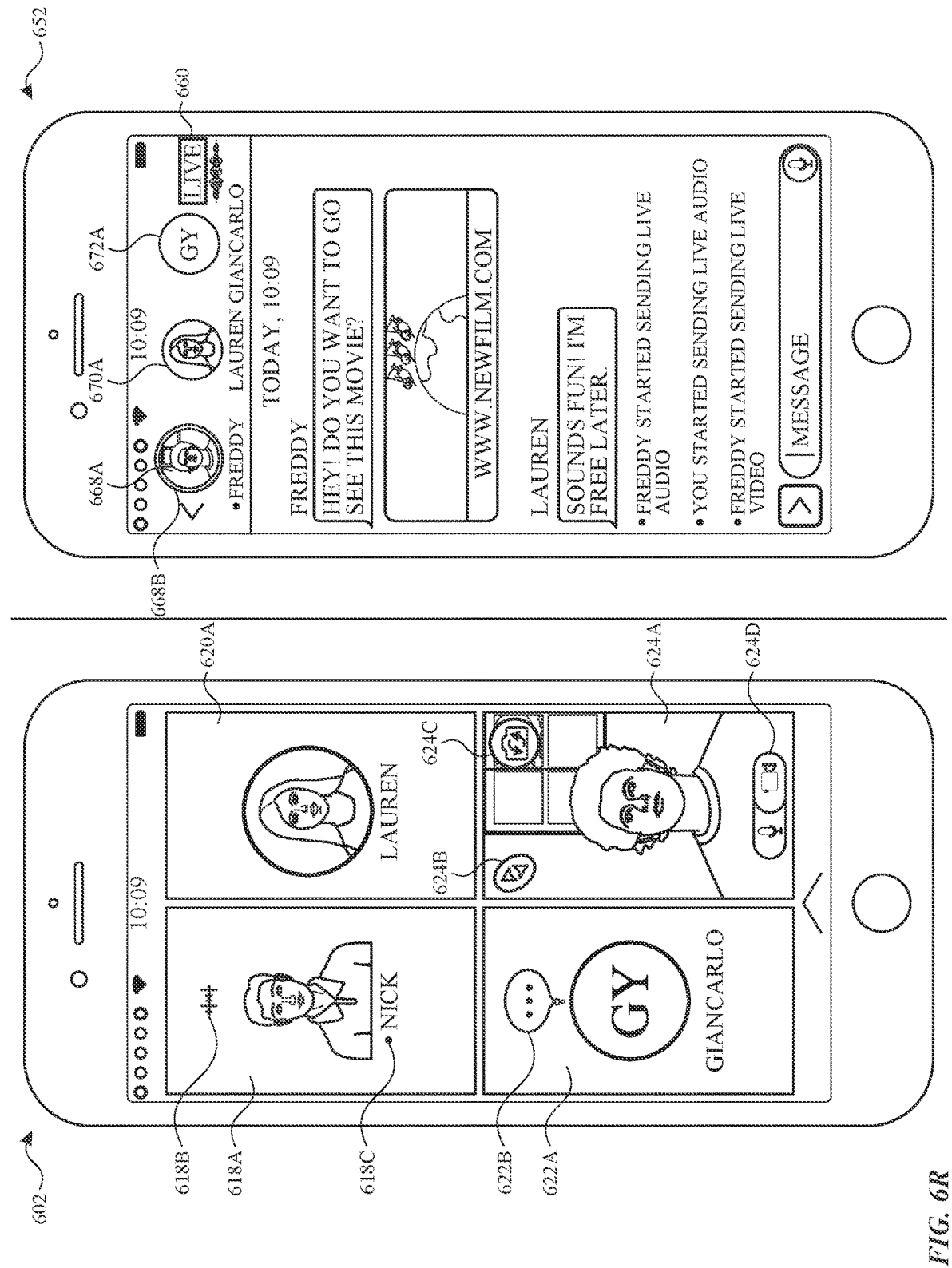

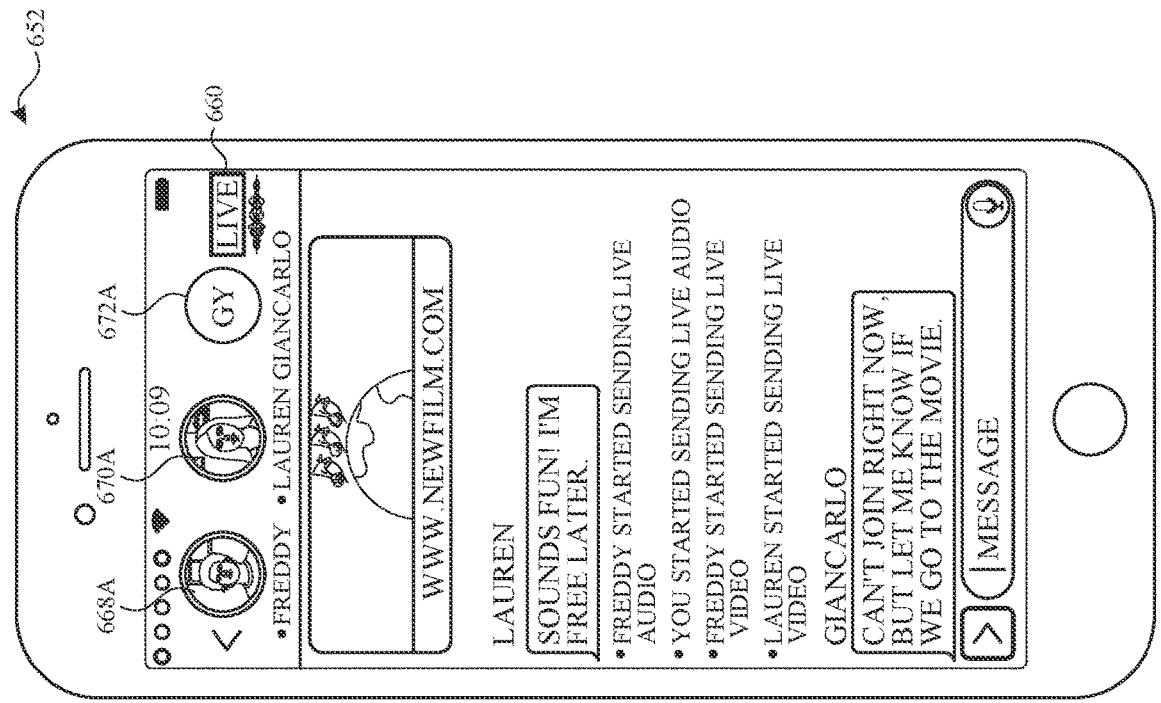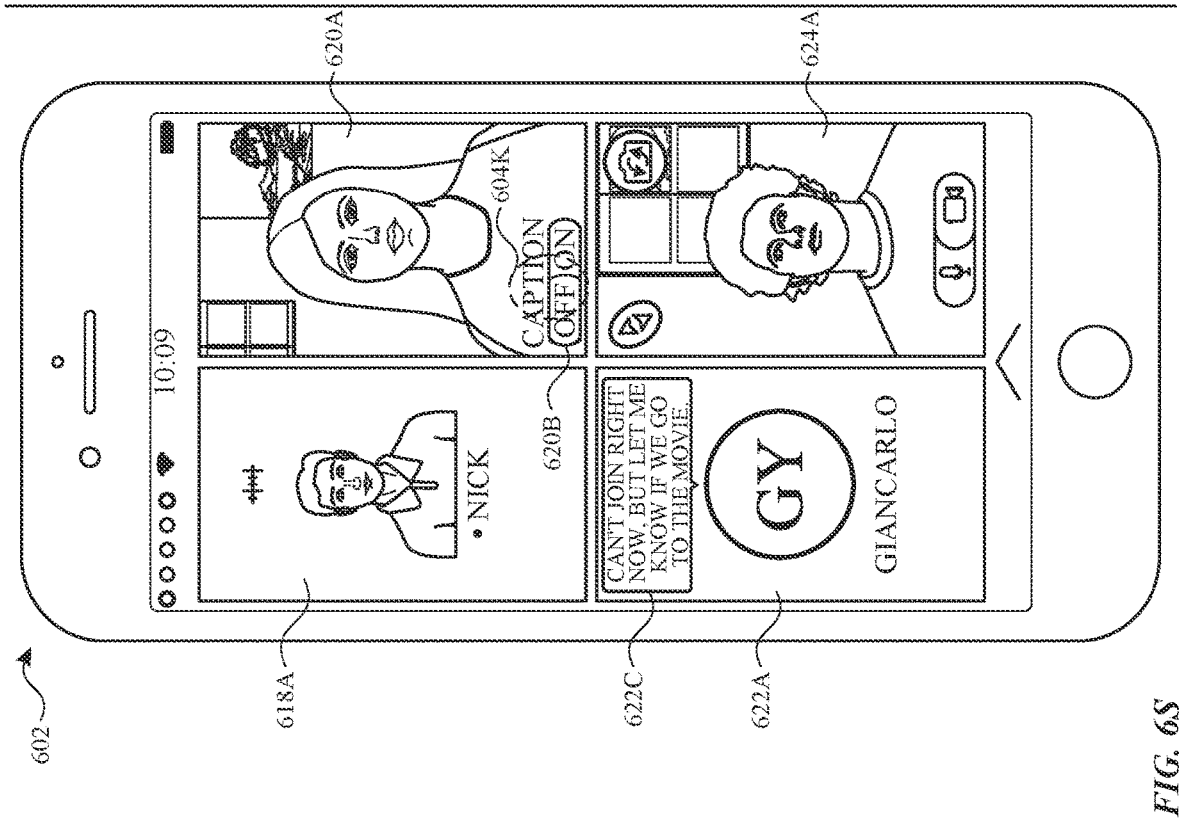
FIG. 6S

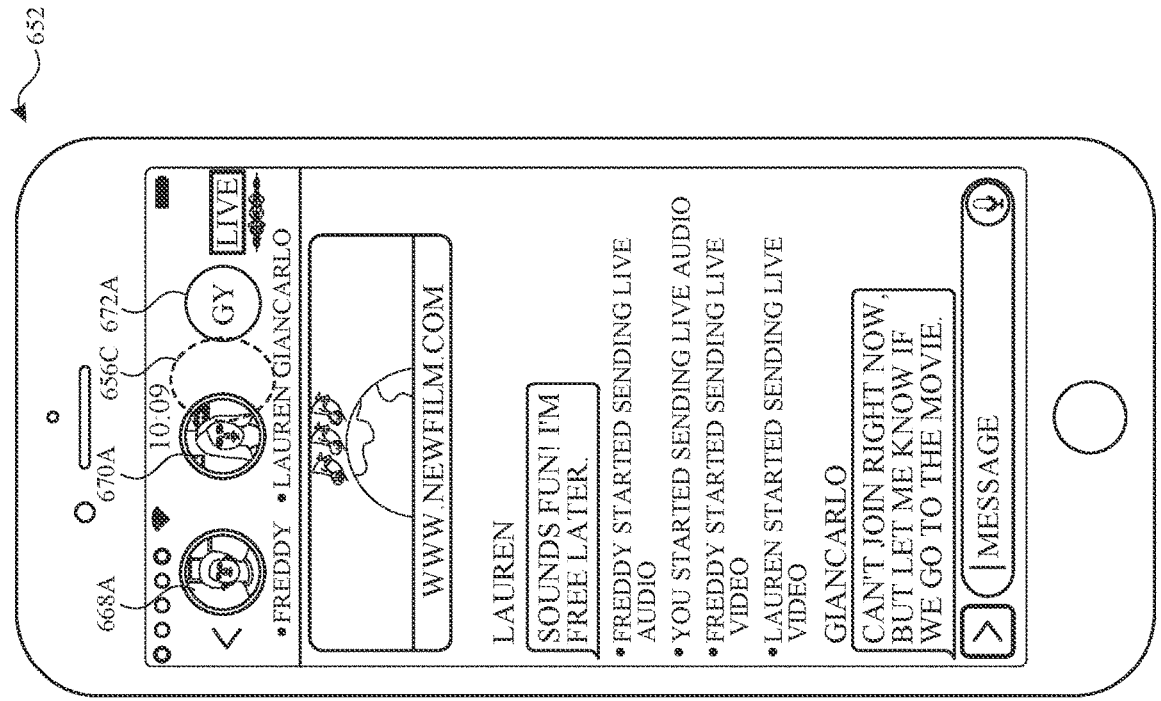
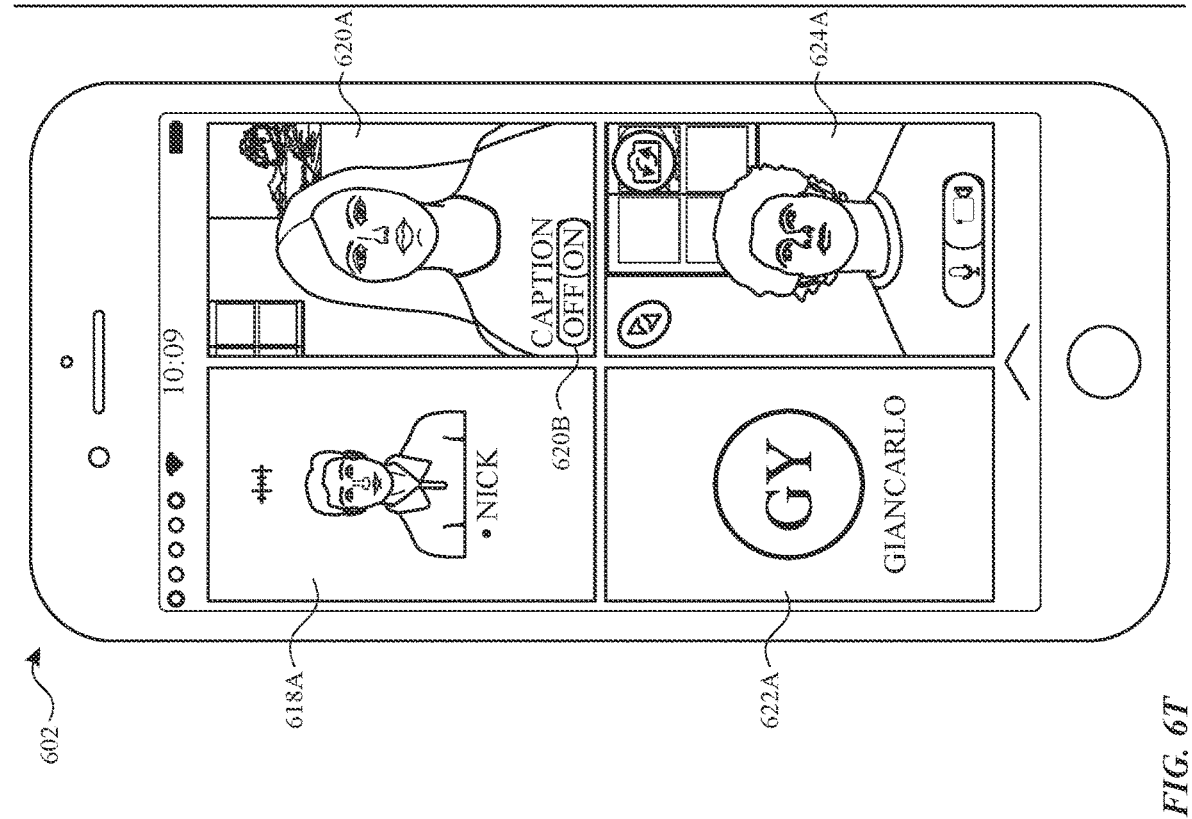
FIG. 6T

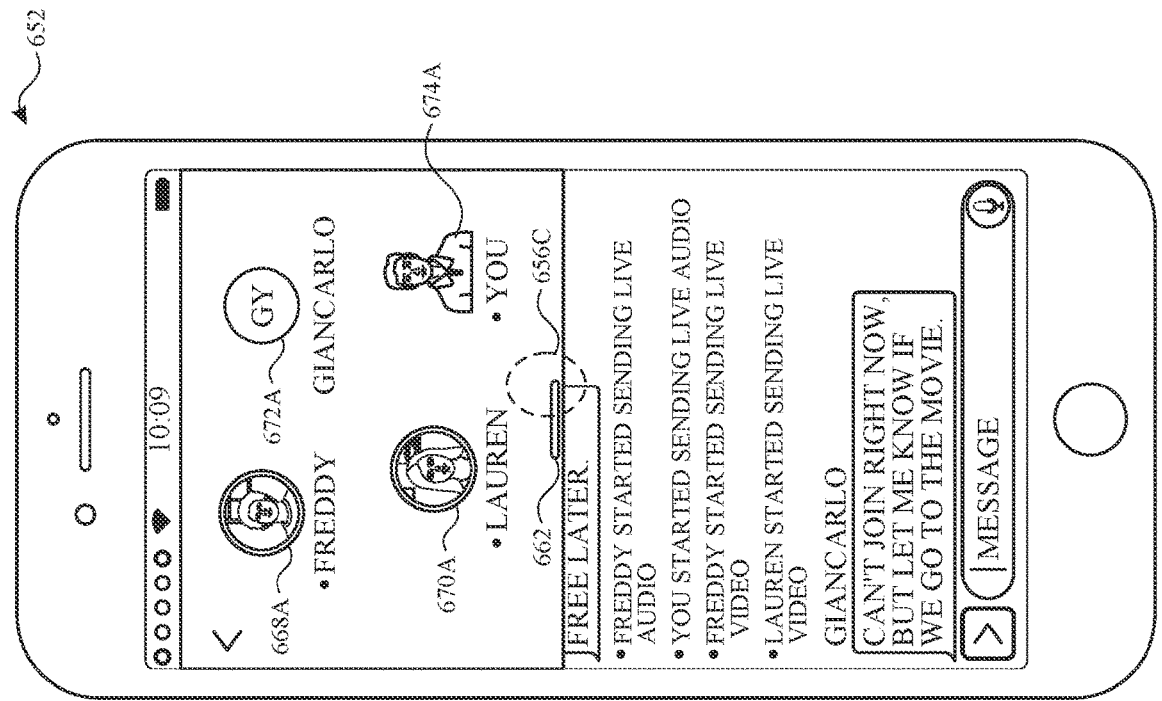
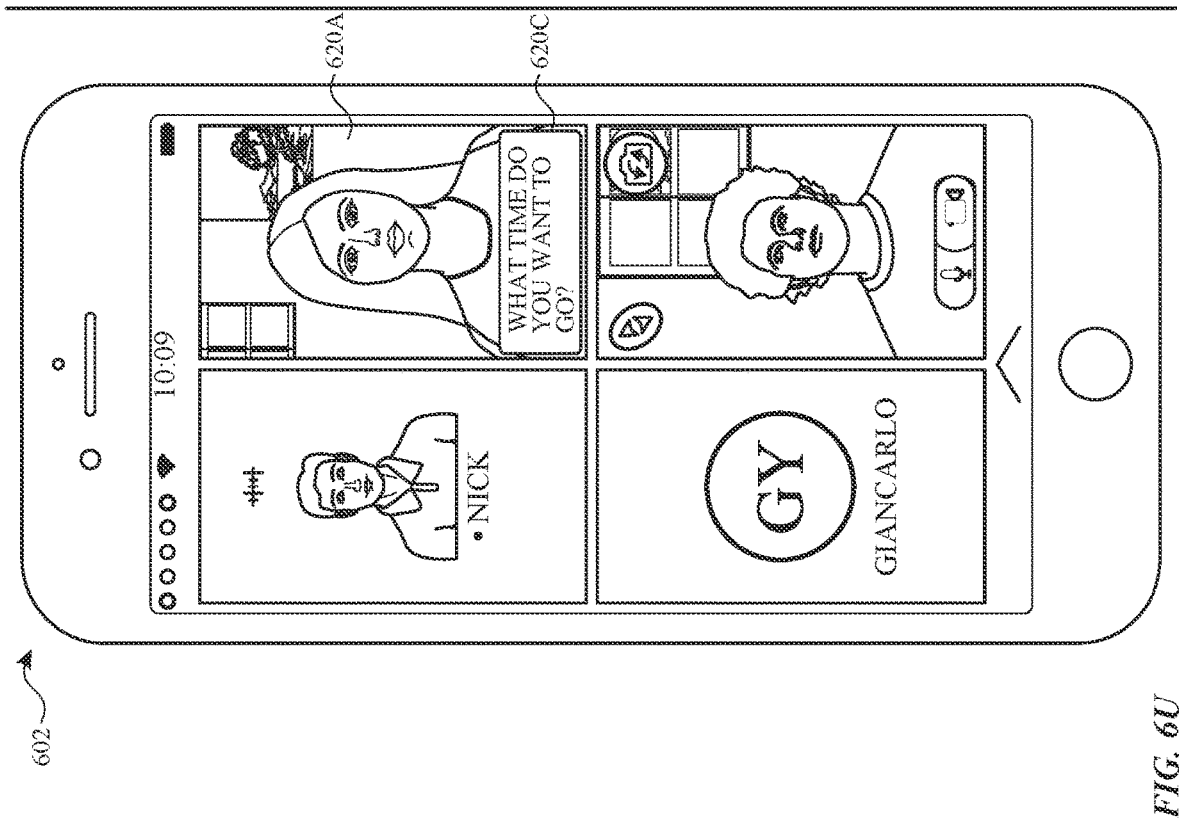
FIG. 6U

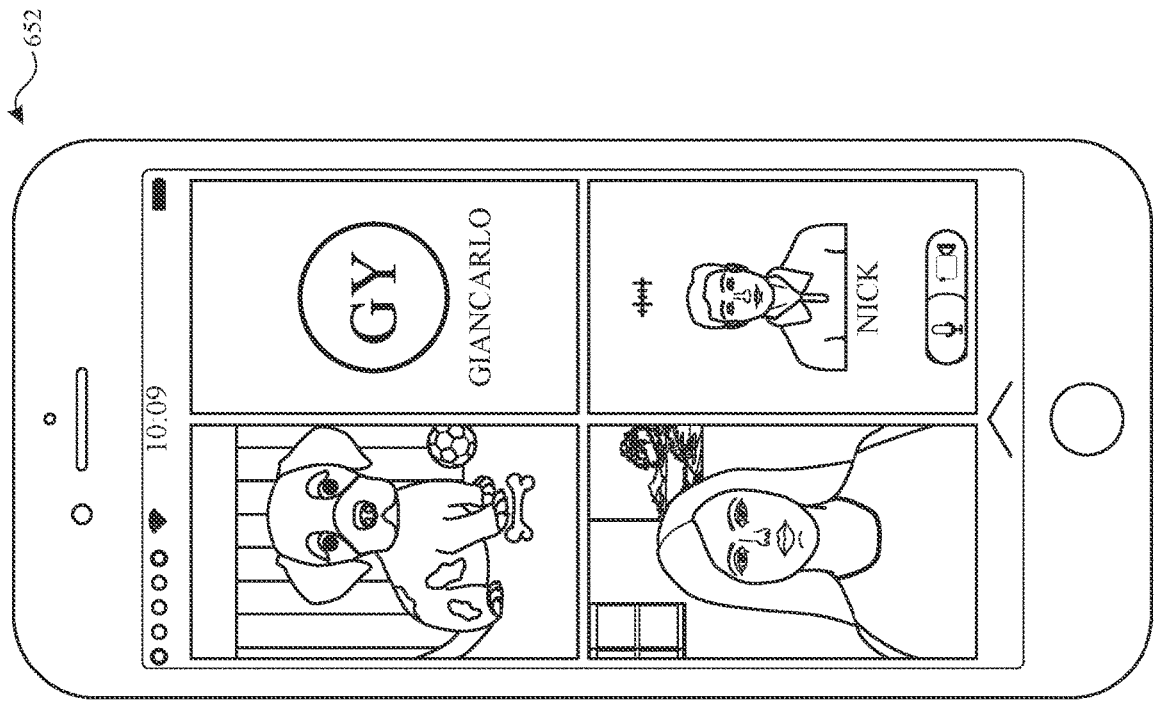
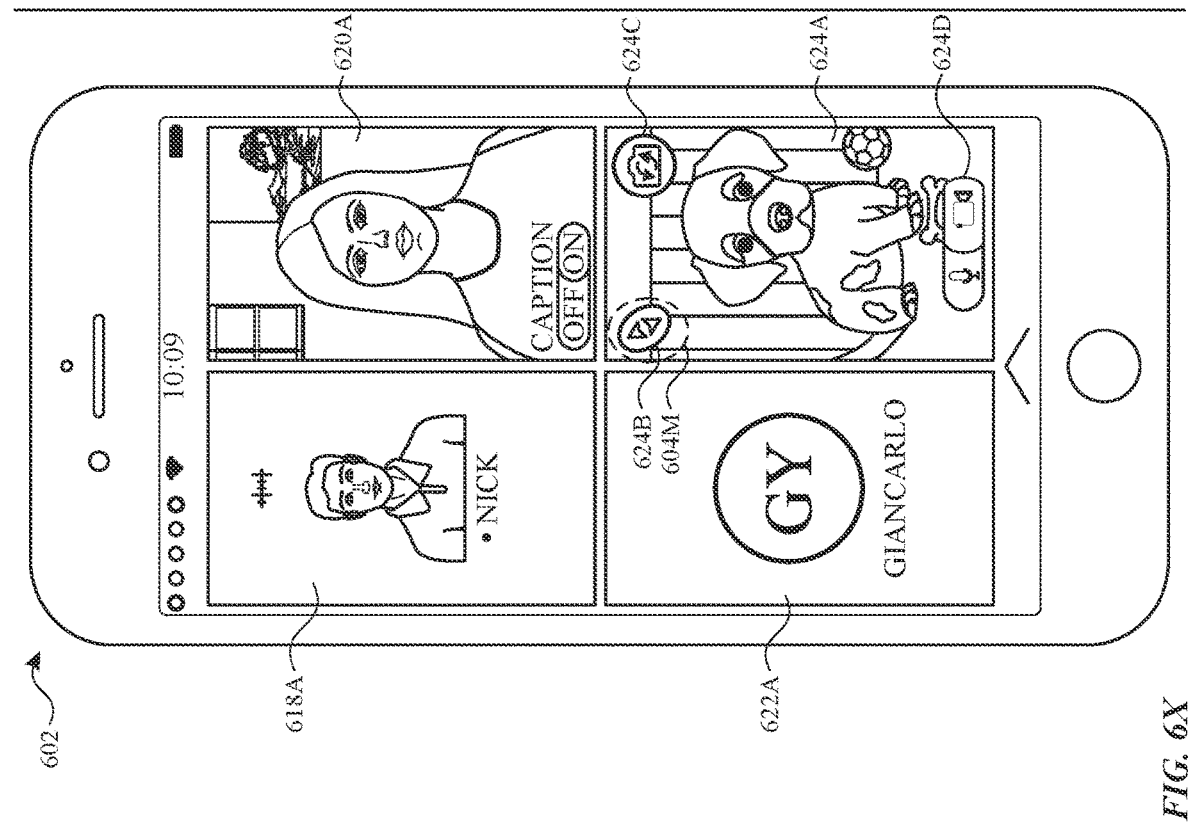
FIG. 6X

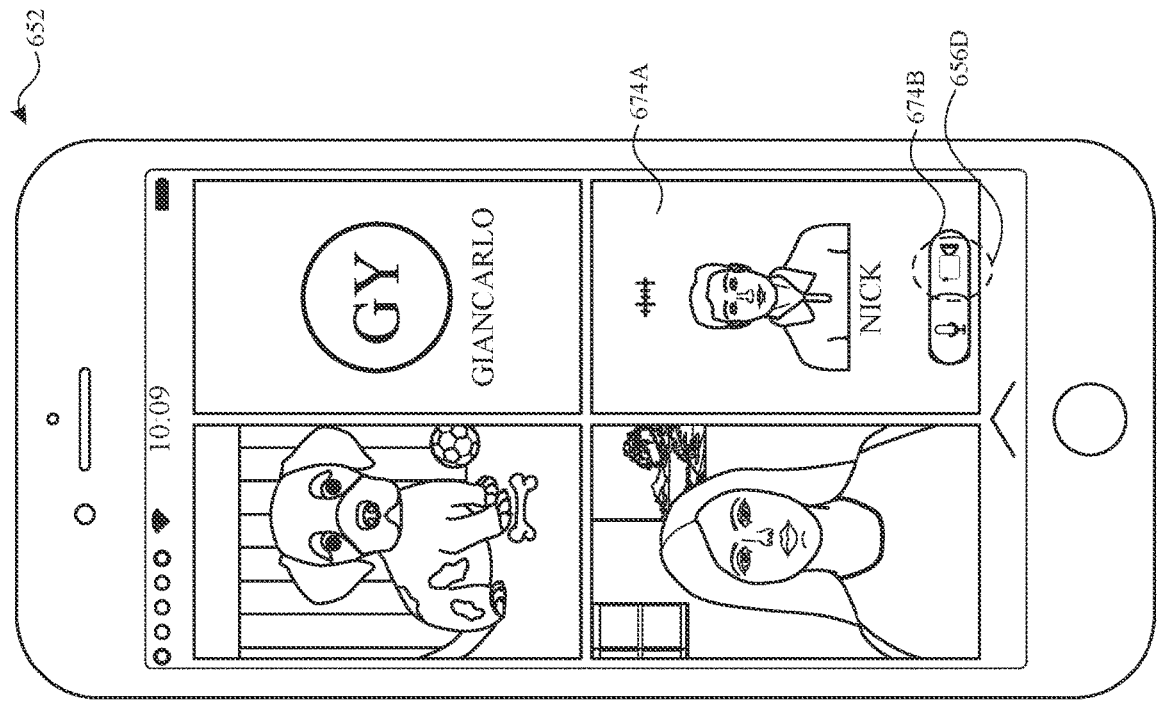
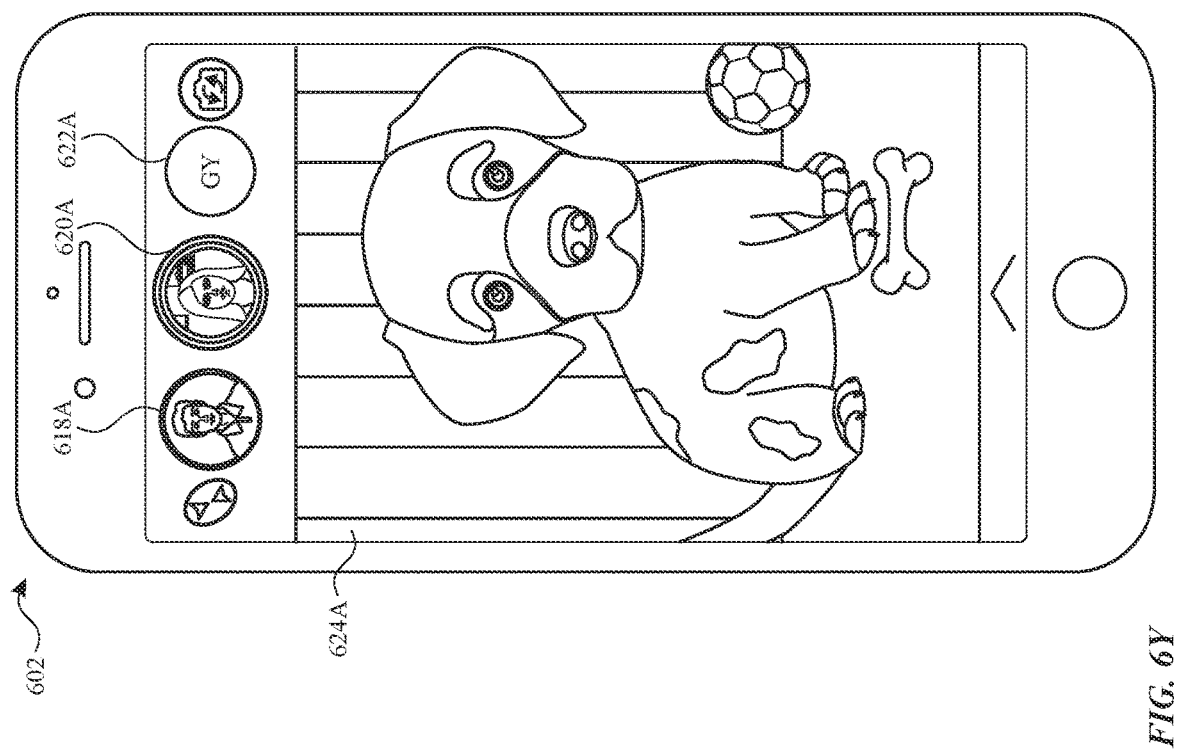
FIG. 6Y

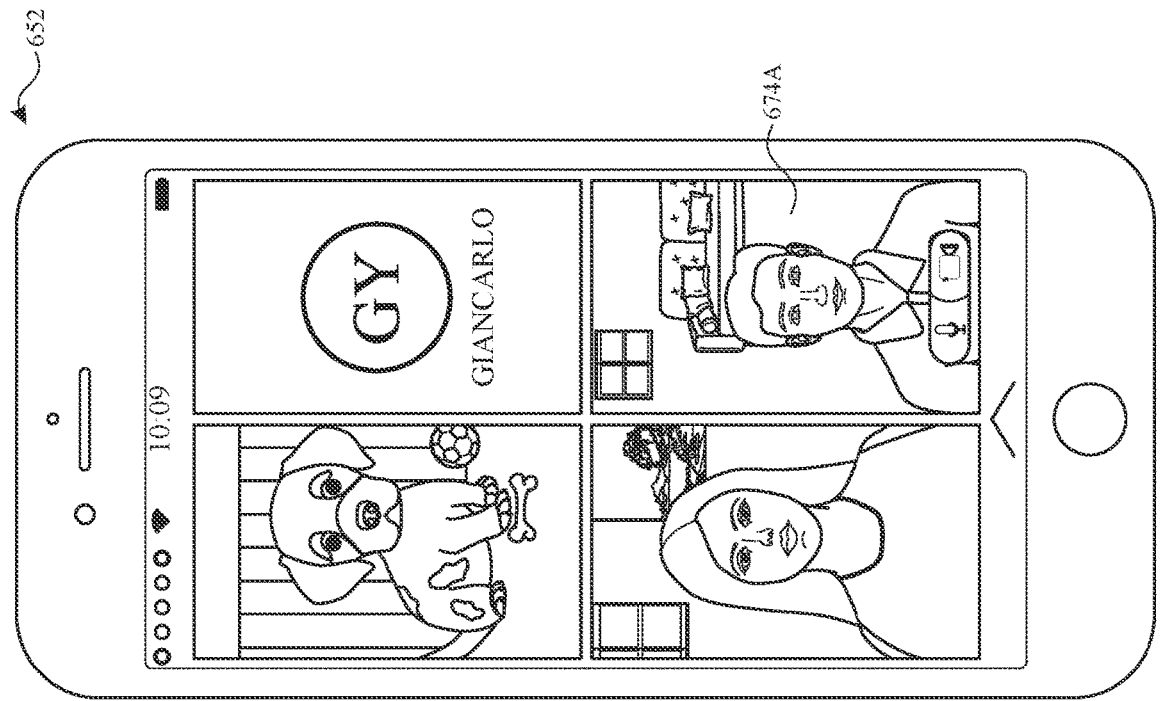
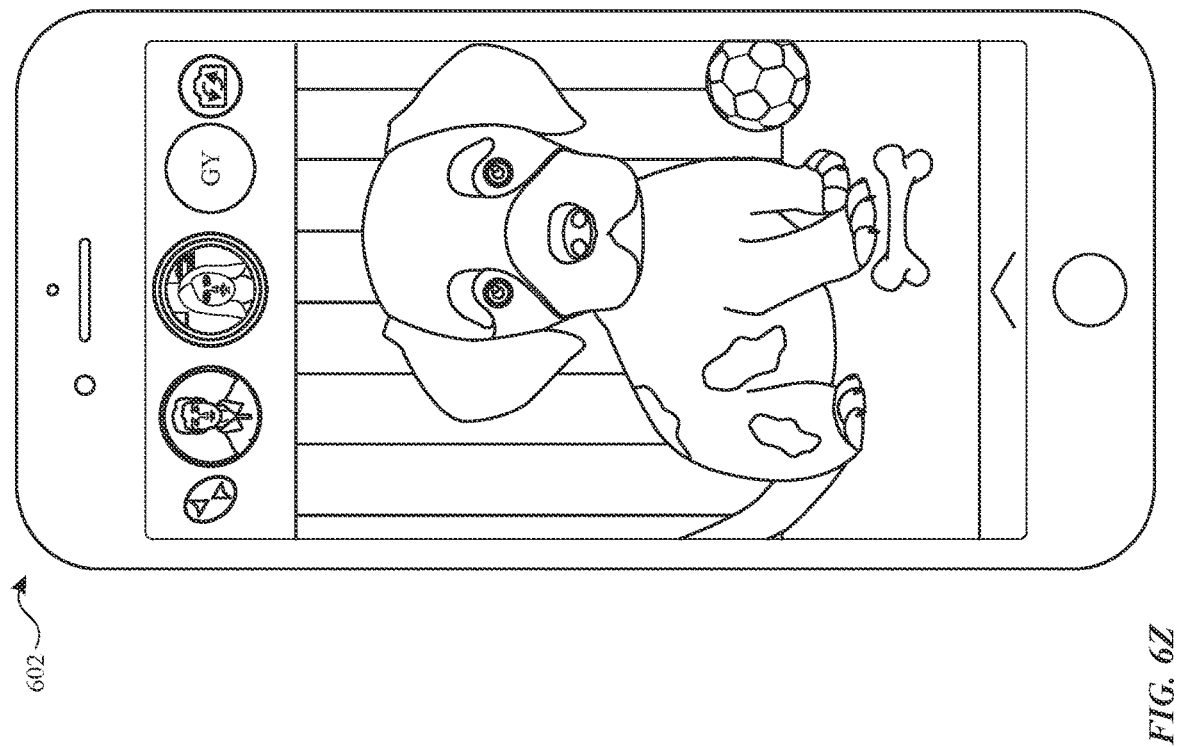
FIG. 6Z

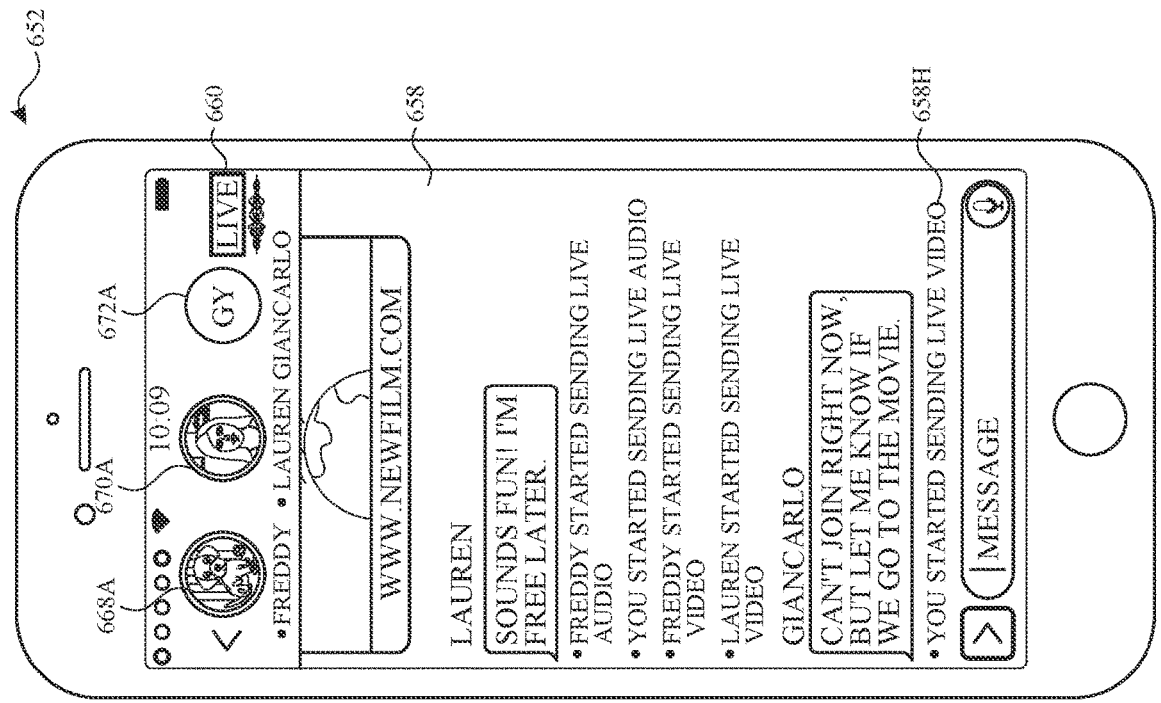
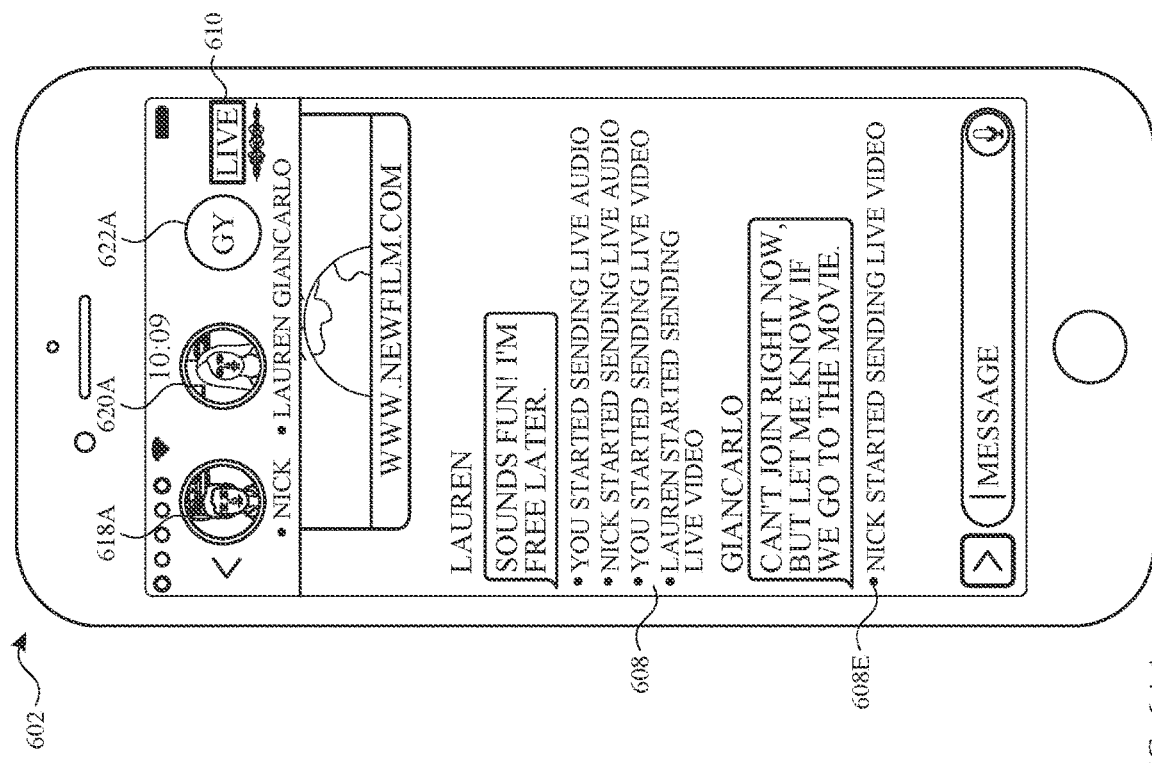
FIG. 6AA

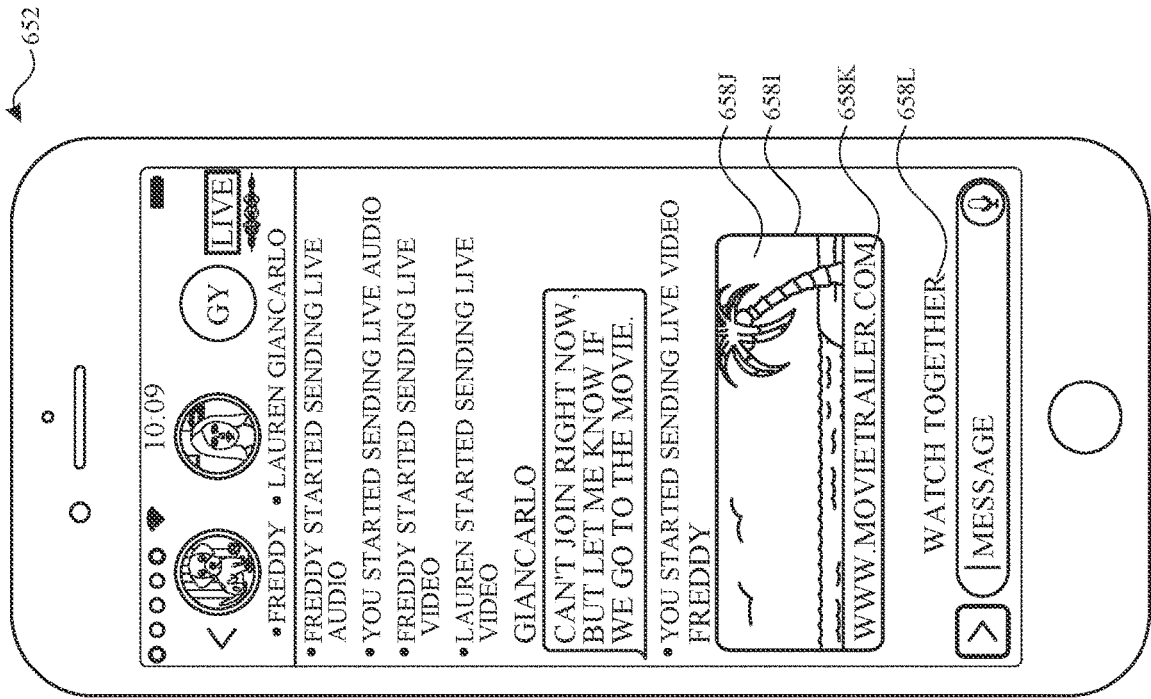
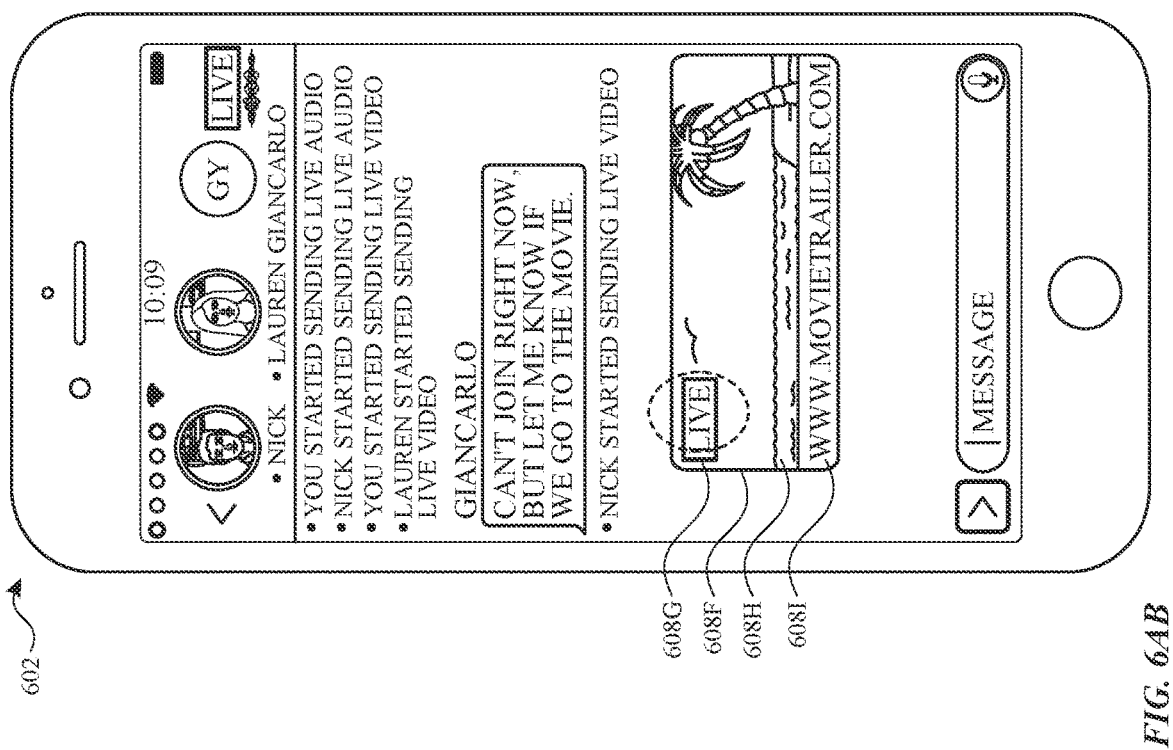
FIG. 6AB

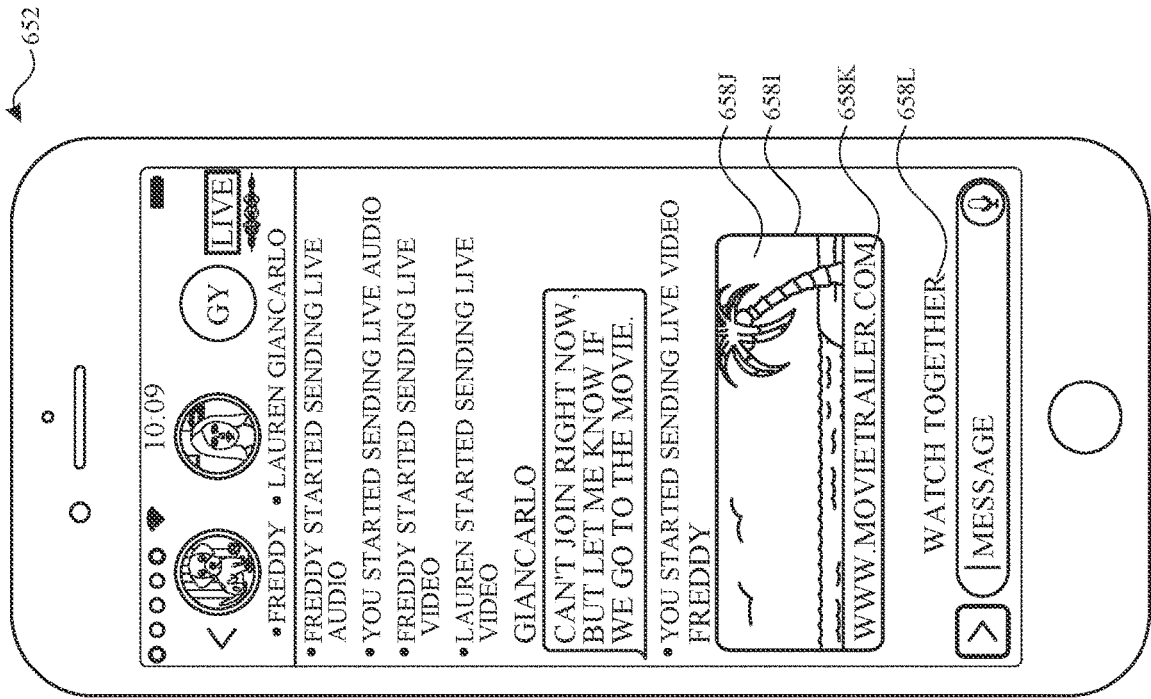
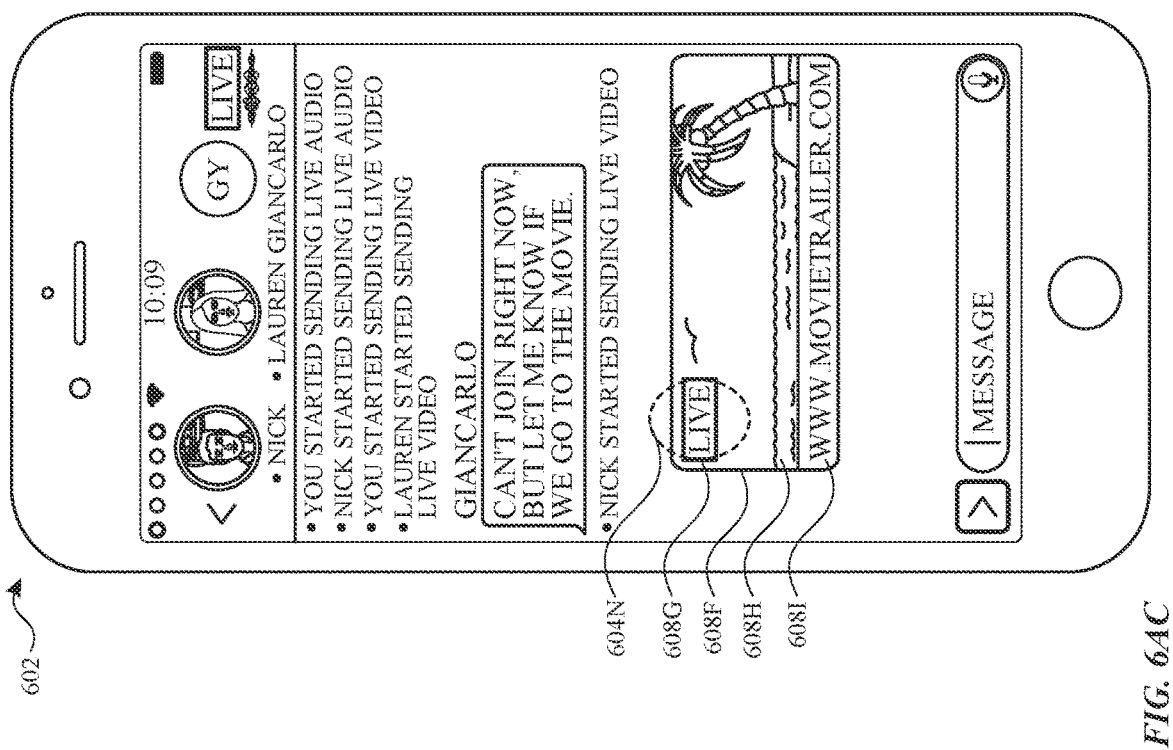
FIG. 6AC

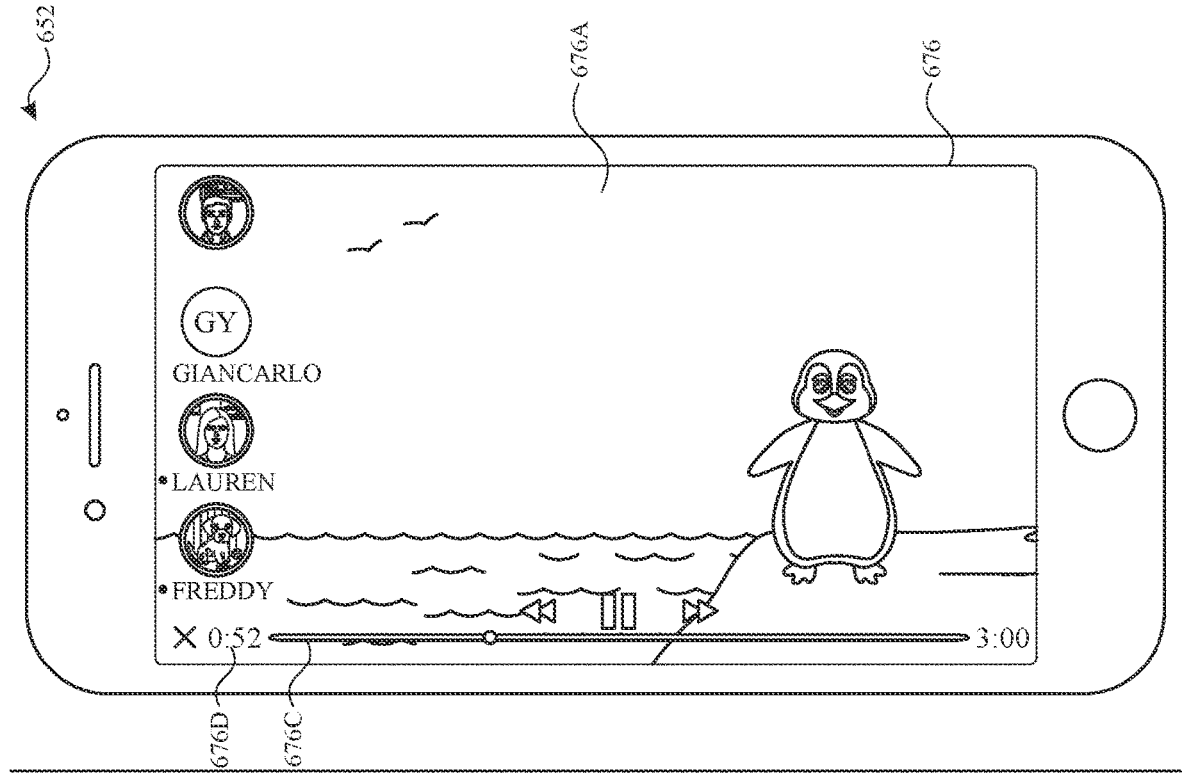
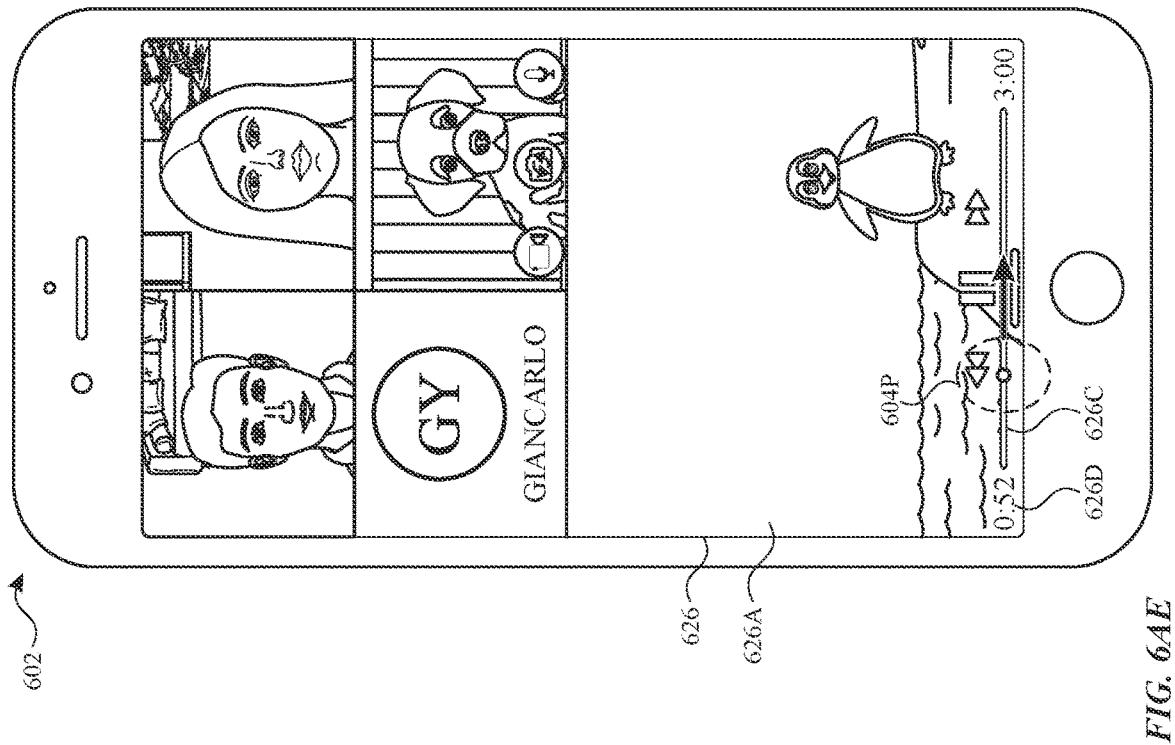
FIG. 6AE

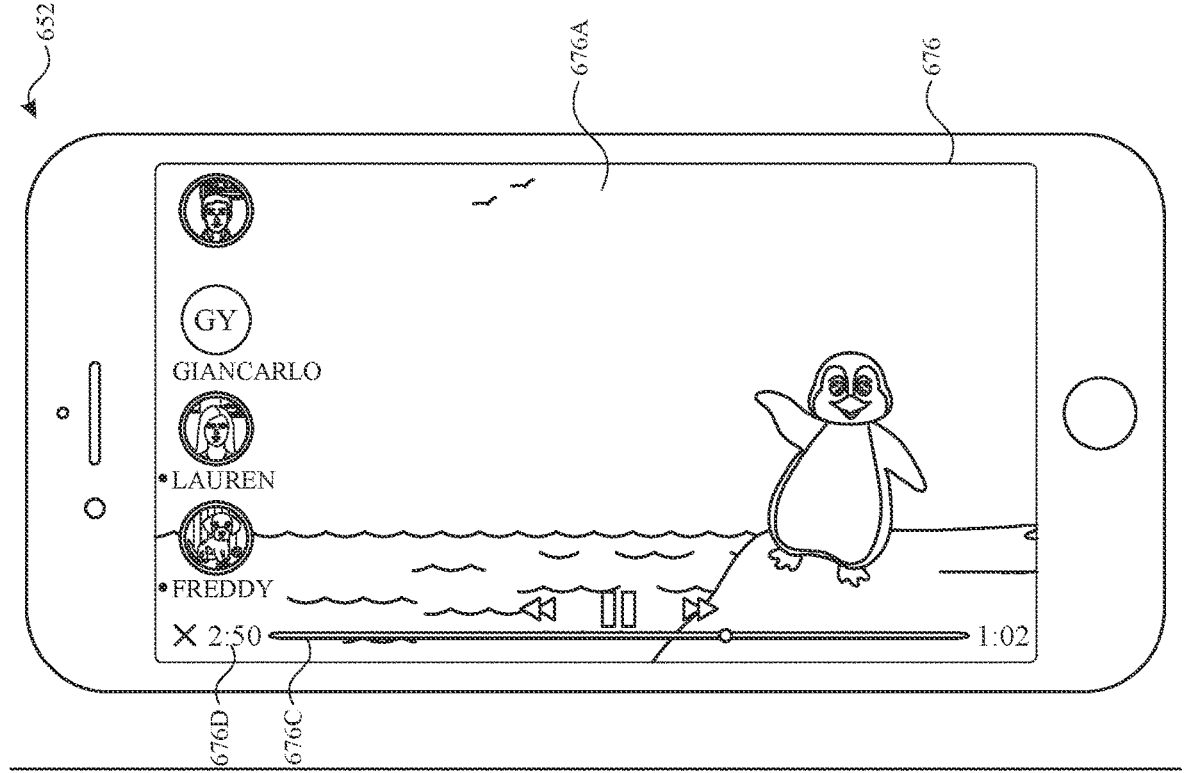
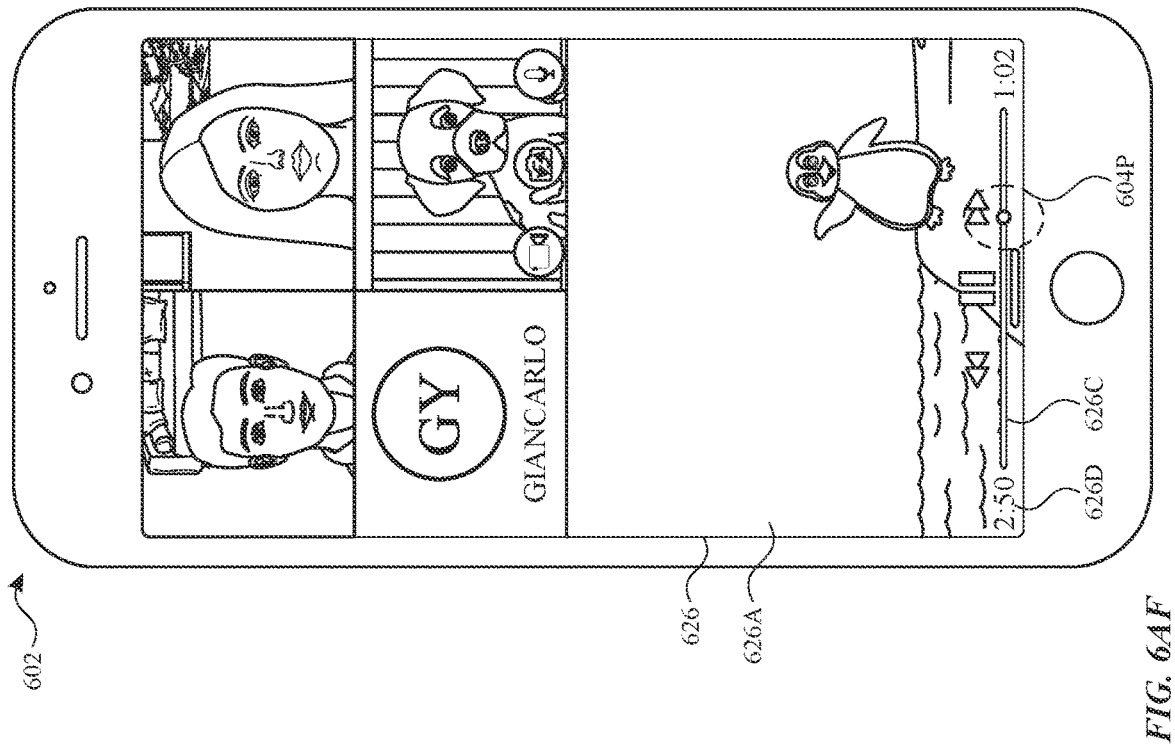
FIG. 6AF

700 ⟶

702
Receive user input identifying one or more contacts to include as one or more participants in a communication session.

704
Receive user input for initiating a live streaming session.

706
While in the communication session, concurrently display, on the display:

708
A first affordance for transmitting a live media stream that includes live audio and does not include live video.

710
A second affordance for transmitting a live media stream that includes live audio and live video.

712
Receive user input activating one of the first affordance and the second affordance.

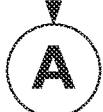 

714
In accordance with receiving user input activating the first affordance, concurrently:

716
Detect, using the one or more microphones, audio.

718
Transmit the live audio in a live media stream to the one or more participants of the communication session, wherein transmitting the live audio occurs without transmission of live video.

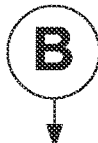

720
In accordance with receiving user input activating the second affordance, concurrently:

722
Detect, using the one or more microphones, audio.

724
Detect, using the one or more camera sensors, a plurality of images for a video.

726
Transmit the live audio and the live video in a live media stream to the one or more participants of the communication session.

802
While transmitting an outgoing live media stream of a first type to one or more participants of a communication session:

804
Output, at the electronic device, at least one or more incoming live media streams.

806
Receive user input to transition from transmitting the outgoing live media stream of the first type to transmitting an outgoing live media stream of a second type, wherein the first type is different from the second type.

808
Detect a tap user input on an affordance, wherein the affordance is displayed as part of an avatar of the user of the electronic device.

810
In response to receiving the user input to transition, transition from transmitting the outgoing live media stream of the first type to transmitting an outgoing live media stream of a second type, including:

812
In accordance with the first type of live media stream including live audio and not including live video, transmit live video.

814
In accordance with the first type of live media stream including live audio and live video, cease to transmit the live video.

922
While participating in a communication session with one or more participants:

924
In response to receiving the media playback control user input:

926
Control playback of the media in the media playback user interface at the electronic device in accordance with the received media playback control user input.

928
In accordance with the user input being an activation of the affordance:

930
Transmit instructions to control playback of the media at devices of the one or more participants in accordance with the received media playback control user input, such that playback of the media at devices of the one or more participants of the communication session remains substantially synchronized.

932
In accordance with the user input being an activation of the image that is based on the content of the media:

934
Forgo transmitting instructions to control playback of the media at devices of the one or more participants in accordance with the received media playback control user input.

*FIG. 9B*

USER INTERFACE FOR MULTI-USER COMMUNICATION SESSION

CROSS-REFERENCE TO RELATED APPLICATIONS

This application is a continuation of U.S. patent application Ser. No. 16/790,619, entitled "USER INTERFACE FOR MULTI-USER COMMUNICATION SESSION", filed on Feb. 13, 2020, which is a continuation of U.S. patent application Ser. No. 16/511,578, entitled "USER INTERFACE FOR MULTI-USER COMMUNICATION SESSION", filed on Jul. 15, 2019, which is a continuation of U.S. patent application Ser. No. 16/035,422, entitled "USER INTERFACE FOR MULTI-USER COMMUNICATION SESSION", filed on Jul. 13, 2018, which claims priority to U.S. Provisional Patent Application No. 62/566,181, entitled "USER INTERFACE FOR MULTI-USER COMMUNICATION SESSION," filed on Sep. 29, 2017, the contents of which are hereby incorporated by reference in their entireties.

FIELD

The present disclosure relates generally to computer user interfaces, and more specifically to techniques for managing a communication session.

BACKGROUND

Electronic devices enabled remote users to communicate, such as through instant messages and phone calls. While such exemplary conventional techniques enable communication, the techniques provide users with only limited ability to fully engage in conversations, particularly when the conversation includes groups of users.

BRIEF SUMMARY

Some techniques for managing a communication session using electronic devices are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices, such as mobile phones.

Accordingly, the present techniques provide electronic devices with faster, more efficient methods and interfaces for managing a communication session. Such methods and interfaces optionally complement or replace other methods for managing communication sessions. Such methods and interfaces reduce the cognitive burden on a user and produce a more efficient human-machine interface. For battery-operated computing devices, such methods and interfaces conserve power and increase the time between battery charges. In addition, such techniques enable users to more fully simultaneously engage with multiple participants in conversations. Further, such techniques enable remote users to concurrently experience media while communicating.

In accordance some embodiments, a method is performed at an electronic device with a display, one or more camera sensors, and one or more microphones. The method comprises: receiving user input identifying one or more contacts to include as one or more participants in a communication session; while in the communication session, concurrently displaying, on the display: a first affordance for transmitting a live media stream that includes live audio and does not include live video, and a second affordance for transmitting a live media stream that includes live audio and live video; receiving user input activating one of the first affordance and the second affordance; in accordance with receiving user input activating the first affordance, concurrently: detecting, using the one or more microphones, audio; and transmitting live audio in a live media stream to the one or more participants of the communication session, wherein transmitting the live audio occurs without transmission of live video; and in accordance with receiving user input activating the second affordance, concurrently: detecting, using the one or more microphones, audio; detecting, using the one or more camera sensors, a plurality of images for a video; and transmitting the live audio and the live video in a live media stream to the one or more participants of the communication session.

In accordance some embodiments, a non-transitory computer-readable storage medium is described. The non-transitory computer-readable storage medium stores one or more programs configured to be executed by one or more processors of an electronic device with a display, one or more camera sensors, and one or more microphones, the one or more programs including instructions for: receiving user input identifying one or more contacts to include as one or more participants in a communication session; while in the communication session, concurrently displaying, on the display: a first affordance for transmitting a live media stream that includes live audio and does not include live video, and a second affordance for transmitting a live media stream that includes live audio and live video; receiving user input activating one of the first affordance and the second affordance; in accordance with receiving user input activating the first affordance, concurrently: detecting, using the one or more microphones, audio; and transmitting live audio in a live media stream to the one or more participants of the communication session, wherein transmitting the live audio occurs without transmission of live video; and in accordance with receiving user input activating the second affordance, concurrently: detecting, using the one or more microphones, audio; detecting, using the one or more camera sensors, a plurality of images for a video; and transmitting the live audio and the live video in a live media stream to the one or more participants of the communication session.

In accordance some embodiments, a transitory computer-readable storage medium is described. The transitory computer-readable storage medium stores one or more programs configured to be executed by one or more processors of an electronic device with a display, one or more camera sensors, and one or more microphones, the one or more programs including instructions for: receiving user input identifying one or more contacts to include as one or more participants in a communication session; while in the communication session, concurrently displaying, on the display: a first affordance for transmitting a live media stream that includes live audio and does not include live video, and a second affordance for transmitting a live media stream that includes live audio and live video; receiving user input activating one of the first affordance and the second affordance; in accordance with receiving user input activating the first affordance, concurrently: detecting, using the one or more microphones, audio; and transmitting live audio in a live media stream to the one or more participants of the communication session, wherein transmitting the live audio occurs without transmission of live video; and in accordance with receiving user input activating the second affordance, concurrently: detecting, using the one or more microphones, audio; detecting, using the one or more camera sensors, a plurality of images for a video; and transmitting the live audio and the live video in a live media stream to the one or more participants of the communication session.

In accordance some embodiments, an electronic device is described. The electronic device comprises: a display; one or more camera sensors; one or more microphones; one or more processors; and memory storing one or more programs configured to be executed by the one or more processors, the one or more programs including instructions for: receiving user input identifying one or more contacts to include as one or more participants in a communication session; while in the communication session, concurrently displaying, on the display: a first affordance for transmitting a live media stream that includes live audio and does not include live video, and a second affordance for transmitting a live media stream that includes live audio and live video; receiving user input activating one of the first affordance and the second affordance; in accordance with receiving user input activating the first affordance, concurrently: detecting, using the one or more microphones, audio; and transmitting live audio in a live media stream to the one or more participants of the communication session, wherein transmitting the live audio occurs without transmission of live video; and in accordance with receiving user input activating the second affordance, concurrently: detecting, using the one or more microphones, audio; detecting, using the one or more camera sensors, a plurality of images for a video; and transmitting the live audio and the live video in a live media stream to the one or more participants of the communication session.

In accordance some embodiments, an electronic device is described. The electronic device comprises: a display; one or more camera sensors; one or more microphones; means for receiving user input identifying one or more contacts to include as one or more participants in a communication session; means, while in the communication session, for concurrently displaying, on the display: a first affordance for transmitting a live media stream that includes live audio and does not include live video, and a second affordance for transmitting a live media stream that includes live audio and live video; means for receiving user input activating one of the first affordance and the second affordance; means, in accordance with receiving user input activating the first affordance, for concurrently: detecting, using the one or more microphones, audio; and transmitting live audio in a live media stream to the one or more participants of the communication session, wherein transmitting the live audio occurs without transmission of live video; and means, in accordance with receiving user input activating the second affordance, for concurrently: detecting, using the one or more microphones, audio; detecting, using the one or more camera sensors, a plurality of images for a video; and transmitting the live audio and the live video in a live media stream to the one or more participants of the communication session.

In accordance some embodiments, a method is performed at an electronic device with a display. The method comprises: while transmitting an outgoing live media stream of a first type to one or more participants of a communication session: outputting, at the electronic device, at least one or more incoming live media streams; receiving user input to transition from transmitting the outgoing live media stream of the first type to transmitting an outgoing live media stream of a second type, wherein the first type is different from the second type; and in response to receiving the user input to transition, transitioning from transmitting the outgoing live media stream of the first type to transmitting an outgoing live media stream of a second type, including: in accordance with the first type of live media stream including live audio and not including live video, transmitting live video; and in accordance with the first type of live media stream including live audio and live video, ceasing to transmit the live video.

In accordance some embodiments, a non-transitory computer-readable storage medium is described. The non-transitory computer-readable storage medium stores one or more programs configured to be executed by one or more processors of an electronic device with a display, the one or more programs including instructions for: while transmitting an outgoing live media stream of a first type to one or more participants of a communication session: outputting, at the electronic device, at least one or more incoming live media streams; receiving user input to transition from transmitting the outgoing live media stream of the first type to transmitting an outgoing live media stream of a second type, wherein the first type is different from the second type; and in response to receiving the user input to transition, transitioning from transmitting the outgoing live media stream of the first type to transmitting an outgoing live media stream of a second type, including: in accordance with the first type of live media stream including live audio and not including live video, transmitting live video; and in accordance with the first type of live media stream including live audio and live video, ceasing to transmit the live video.

In accordance some embodiments, a transitory computer-readable storage medium is described. The transitory computer-readable storage medium stores one or more programs configured to be executed by one or more processors of an electronic device with a display, the one or more programs including instructions for: while transmitting an outgoing live media stream of a first type to one or more participants of a communication session: outputting, at the electronic device, at least one or more incoming live media streams; receiving user input to transition from transmitting the outgoing live media stream of the first type to transmitting an outgoing live media stream of a second type, wherein the first type is different from the second type; and in response to receiving the user input to transition, transitioning from transmitting the outgoing live media stream of the first type to transmitting an outgoing live media stream of a second type, including: in accordance with the first type of live media stream including live audio and not including live video, transmitting live video; and in accordance with the first type of live media stream including live audio and live video, ceasing to transmit the live video.

In accordance some embodiments, an electronic device is described. The electronic device comprises: a display; one or more processors; and memory storing one or more programs configured to be executed by the one or more processors, the one or more programs including instructions for: while transmitting an outgoing live media stream of a first type to one or more participants of a communication session: outputting, at the electronic device, at least one or more incoming live media streams; receiving user input to transition from transmitting the outgoing live media stream of the first type to transmitting an outgoing live media stream of a second type, wherein the first type is different from the second type; and in response to receiving the user input to transition, transitioning from transmitting the outgoing live media stream of the first type to transmitting an outgoing live media stream of a second type, including: in accordance with the first type of live media stream including live audio and not including live video, transmitting live video; and in accordance with the first type of live media stream including live audio and live video, ceasing to transmit the live video.

In accordance some embodiments, an electronic device is described. The electronic device comprises: a display; means, while transmitting an outgoing live media stream of a first type to one or more participants of a communication session, for: outputting, at the electronic device, at least one or more incoming live media streams; receiving user input to transition from transmitting the outgoing live media stream of the first type to transmitting an outgoing live media stream of a second type, wherein the first type is different from the second type; and means, responsive to receiving the user input to transition, for transitioning from transmitting the outgoing live media stream of the first type to transmitting an outgoing live media stream of a second type, including: in accordance with the first type of live media stream including live audio and not including live video, transmitting live video; and in accordance with the first type of live media stream including live audio and live video, ceasing to transmit the live video.

In accordance some embodiments, a method is performed at an electronic device with a display. The method comprises: while participating in a communication session with one or more participants: transmitting, to one or more participants of the communication session, a link to media; displaying, on the display, a representation of the media, including an affordance; detecting a user input; in response to detecting the user input: displaying a media playback user interface corresponding to the media; while displaying the media playback user interface, detecting a media playback control user input; in response to receiving the media playback control user input: controlling playback of the media in the media playback user interface at the electronic device in accordance with the received media playback control user input; and in accordance with the user input being an activation of the affordance: transmitting instructions to control playback of the media at devices of the one or more participants in accordance with the received media playback control user input, such that playback of the media at devices of the one or more participants of the communication session remains substantially synchronized.

In accordance some embodiments, a non-transitory computer-readable storage medium is described. The non-transitory computer-readable storage medium stores one or more programs configured to be executed by one or more processors of an electronic device with a display, the one or more programs including instructions for: while participating in a communication session with one or more participants: transmitting, to one or more participants of the communication session, a link to media; displaying, on the display, a representation of the media, including an affordance; detecting a user input; in response to detecting the user input: displaying a media playback user interface corresponding to the media; while displaying the media playback user interface, detecting a media playback control user input; in response to receiving the media playback control user input: controlling playback of the media in the media playback user interface at the electronic device in accordance with the received media playback control user input; and in accordance with the user input being an activation of the affordance: transmitting instructions to control playback of the media at devices of the one or more participants in accordance with the received media playback control user input, such that playback of the media at devices of the one or more participants of the communication session remains substantially synchronized.

In accordance some embodiments, a transitory computer-readable storage medium is described. The transitory computer-readable storage medium stores one or more programs configured to be executed by one or more processors of an electronic device with a display, the one or more programs including instructions for: while participating in a communication session with one or more participants: transmitting, to one or more participants of the communication session, a link to media; displaying, on the display, a representation of the media, including an affordance; detecting a user input; in response to detecting the user input: displaying a media playback user interface corresponding to the media; while displaying the media playback user interface, detecting a media playback control user input; in response to receiving the media playback control user input: controlling playback of the media in the media playback user interface at the electronic device in accordance with the received media playback control user input; and in accordance with the user input being an activation of the affordance: transmitting instructions to control playback of the media at devices of the one or more participants in accordance with the received media playback control user input, such that playback of the media at devices of the one or more participants of the communication session remains substantially synchronized.

In accordance some embodiments, an electronic device is described. The electronic device comprises: a display; one or more processors; and memory storing one or more programs configured to be executed by the one or more processors, the one or more programs including instructions for: while participating in a communication session with one or more participants: transmitting, to one or more participants of the communication session, a link to media; displaying, on the display, a representation of the media, including an affordance; detecting a user input; in response to detecting the user input: displaying a media playback user interface corresponding to the media; while displaying the media playback user interface, detecting a media playback control user input; in response to receiving the media playback control user input: controlling playback of the media in the media playback user interface at the electronic device in accordance with the received media playback control user input; and in accordance with the user input being an activation of the affordance: transmitting instructions to control playback of the media at devices of the one or more participants in accordance with the received media playback control user input, such that playback of the media at devices of the one or more participants of the communication session remains substantially synchronized.

In accordance some embodiments, an electronic device is described. The electronic device comprises: a display: means, while participating in a communication session with one or more participants, for: transmitting, to one or more participants of the communication session, a link to media; displaying, on the display, a representation of the media, including an affordance; detecting a user input; in response to detecting the user input: displaying a media playback user interface corresponding to the media; while displaying the media playback user interface, detecting a media playback control user input; in response to receiving the media playback control user input: controlling playback of the media in the media playback user interface at the electronic device in accordance with the received media playback control user input; and in accordance with the user input being an activation of the affordance: transmitting instructions to control playback of the media at devices of the one or more participants in accordance with the received media playback control user input, such that playback of the media at devices of the one or more participants of the communication session remains substantially synchronized.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing a communication session, thereby increasing the effectiveness, efficiency, and user satisfaction with such devices. Such methods and interfaces may complement or replace other methods for managing communication sessions.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIGS. 7A-7B are a flow diagram illustrating methods for initiating a live stream.

FIG. 8 is a flow diagram illustrating methods for transitioning between streaming live audio and live video.

FIG. 9A-9B are a flow diagram illustrating methods for synchronizing media playback during a live stream.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing a communication session. For example, there is a need for efficient methods and interfaces for initiating live streams. For another example, there is a need for efficient methods and interfaces for transitioning between streaming live audio and live video. For another example, there is a need for efficient methods and interfaces for synchronizing media playback during a live stream. Such techniques can reduce the cognitive burden on a user who manages a communication session, thereby enhancing productivity. Further, such techniques can reduce processor and battery power otherwise wasted on redundant user inputs.

Figure 9A:
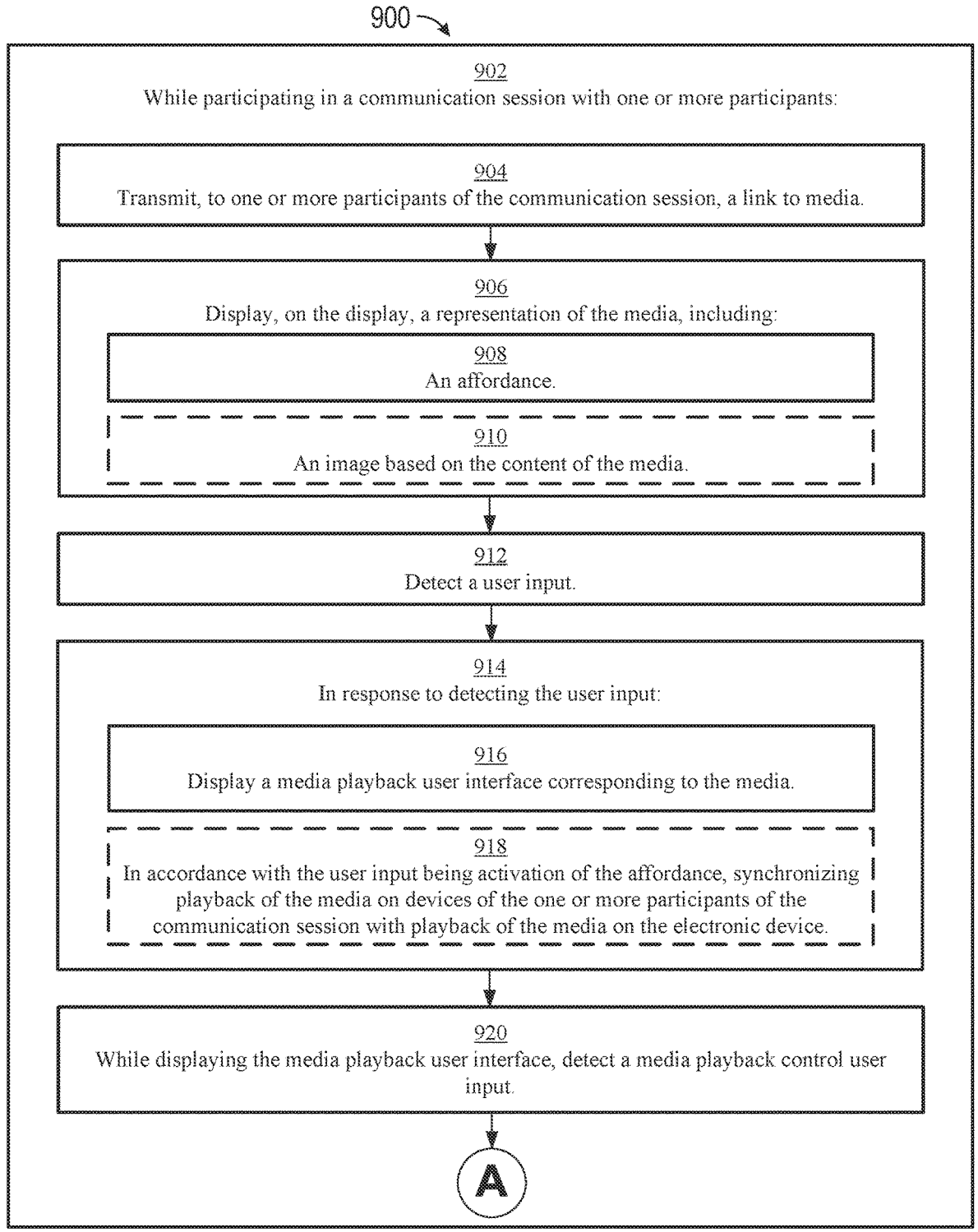

Below, FIGS. 1A-1B, 2, 3, 4A-4B, and 5A-5H provide a description of exemplary devices for performing the techniques for managing event notifications. FIGS. 6A-6AF illustrate exemplary devices and user interfaces for managing a communication session. FIGS. 7A-7B are a flow diagram illustrating methods of initiating a live stream in accordance with some embodiments. FIG. 8 is a flow diagram illustrating methods of transitioning between streaming live audio and live video in accordance with some embodiments. FIGS. 9A-9B is a flow diagram illustrating methods of synchronizing media playback during a live stream in accordance with some embodiments. The user interfaces in FIGS. 6A-6AF are used to illustrate the processes described below, including the processes in FIGS. 7A-7B, 8, and 9A-9B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
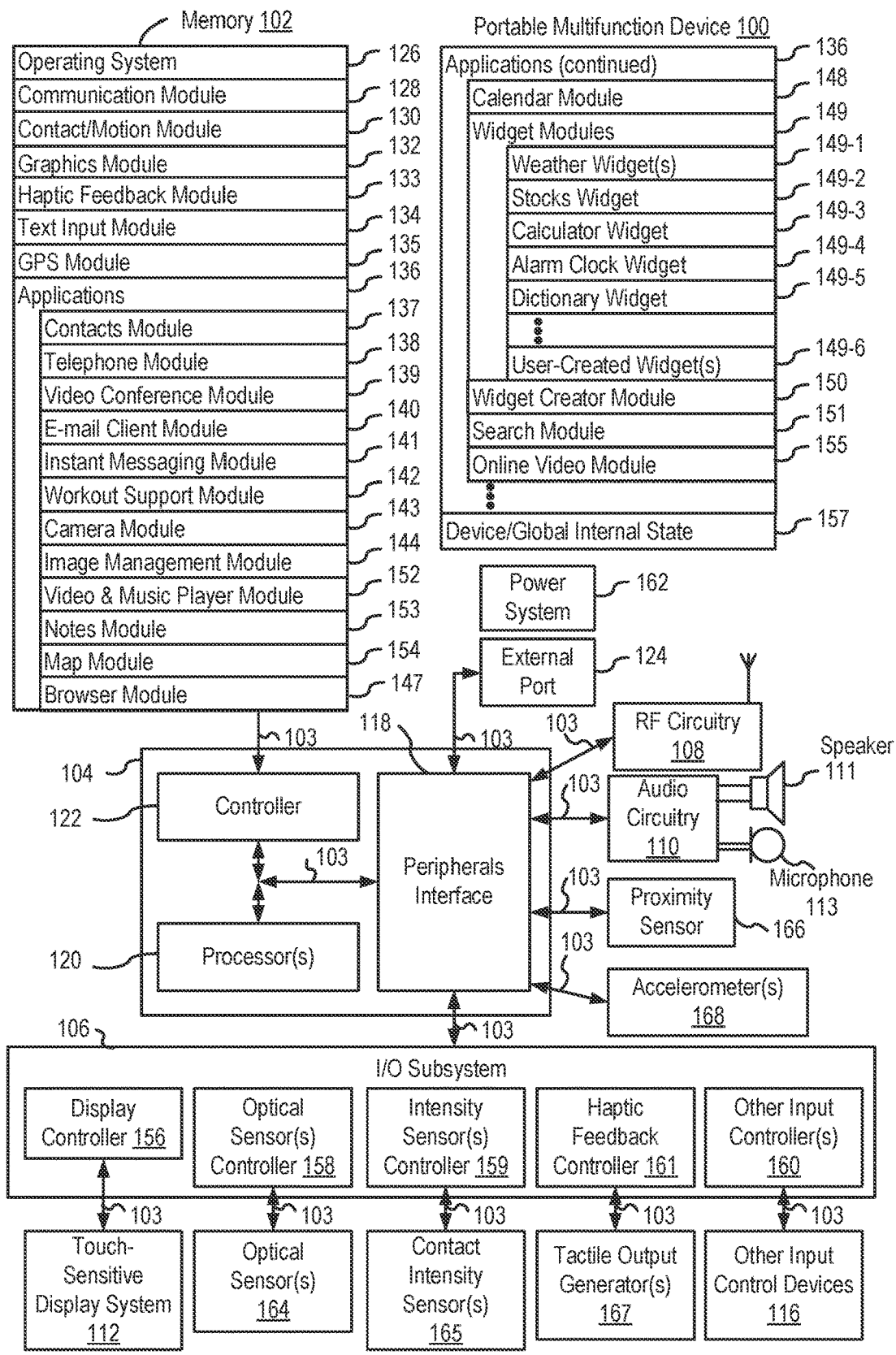
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that is, in some circumstances, otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
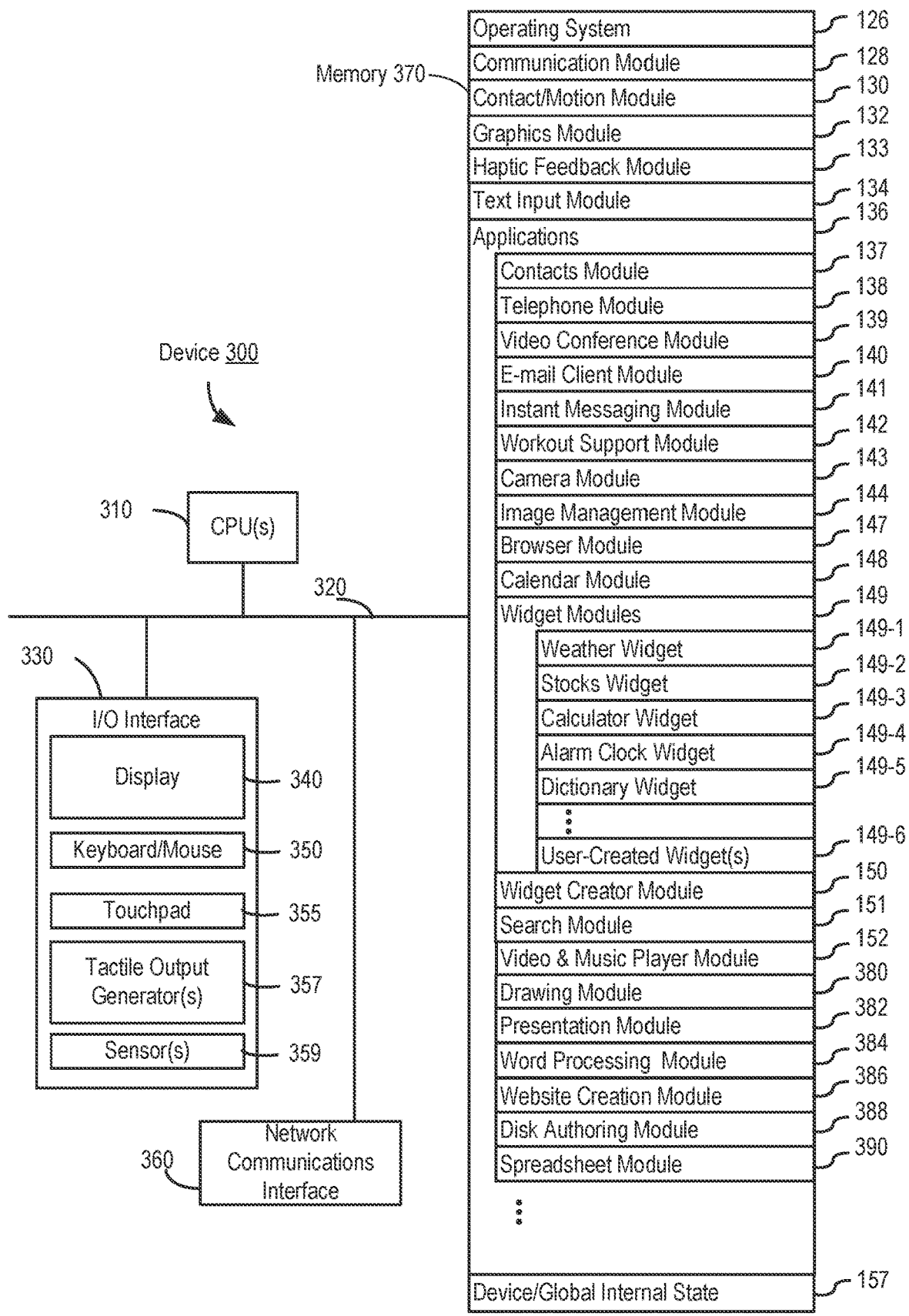
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
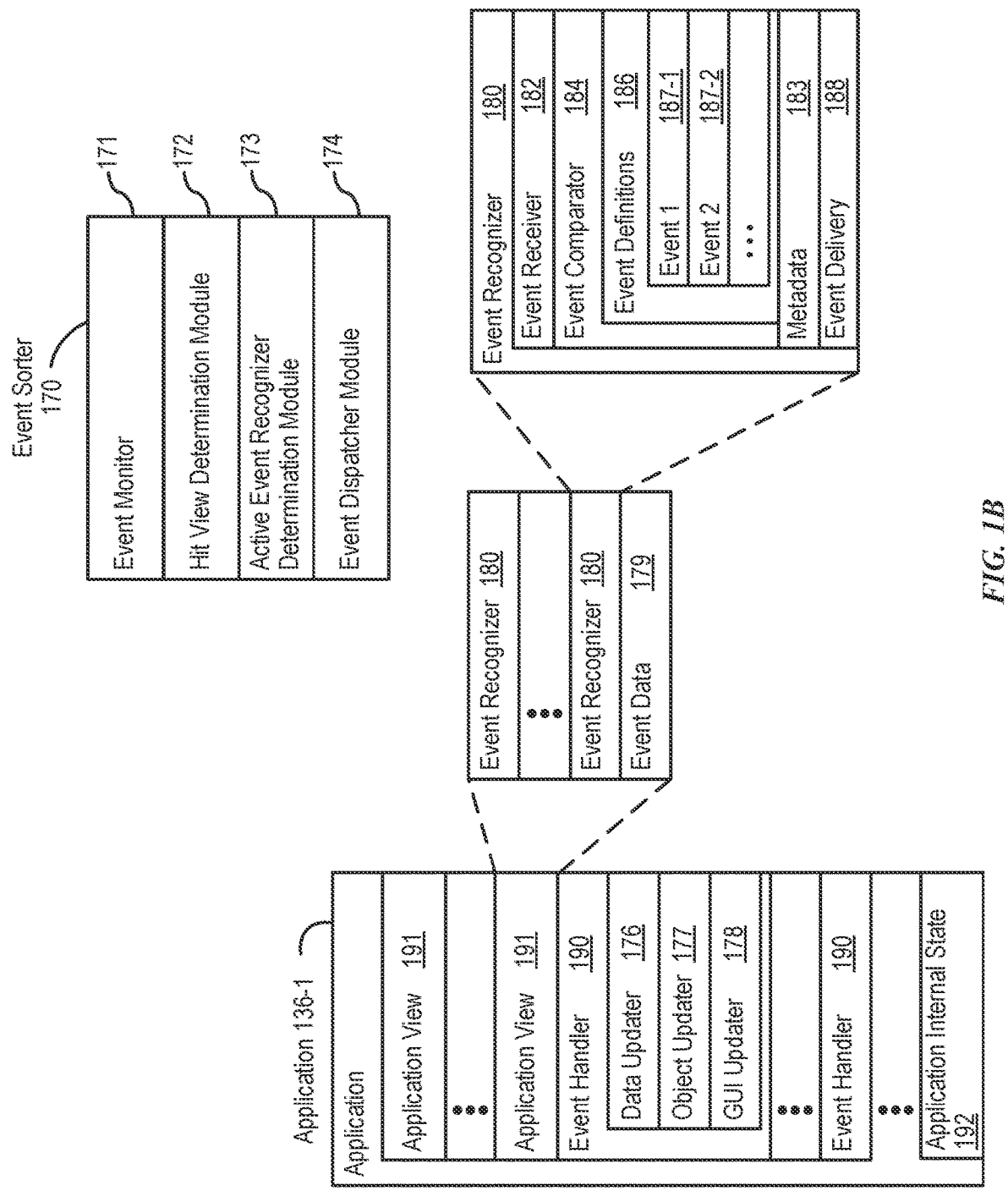
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
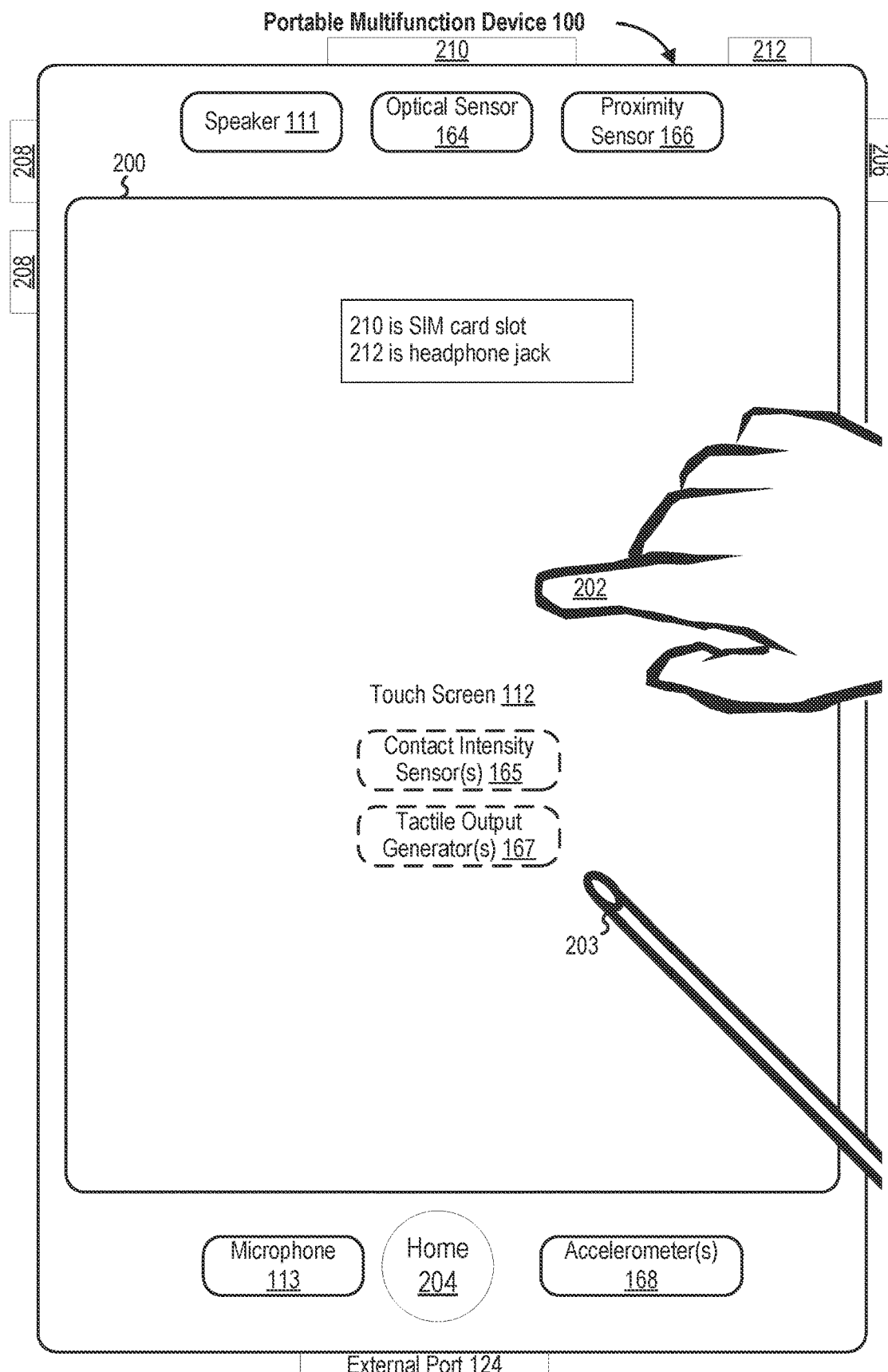
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
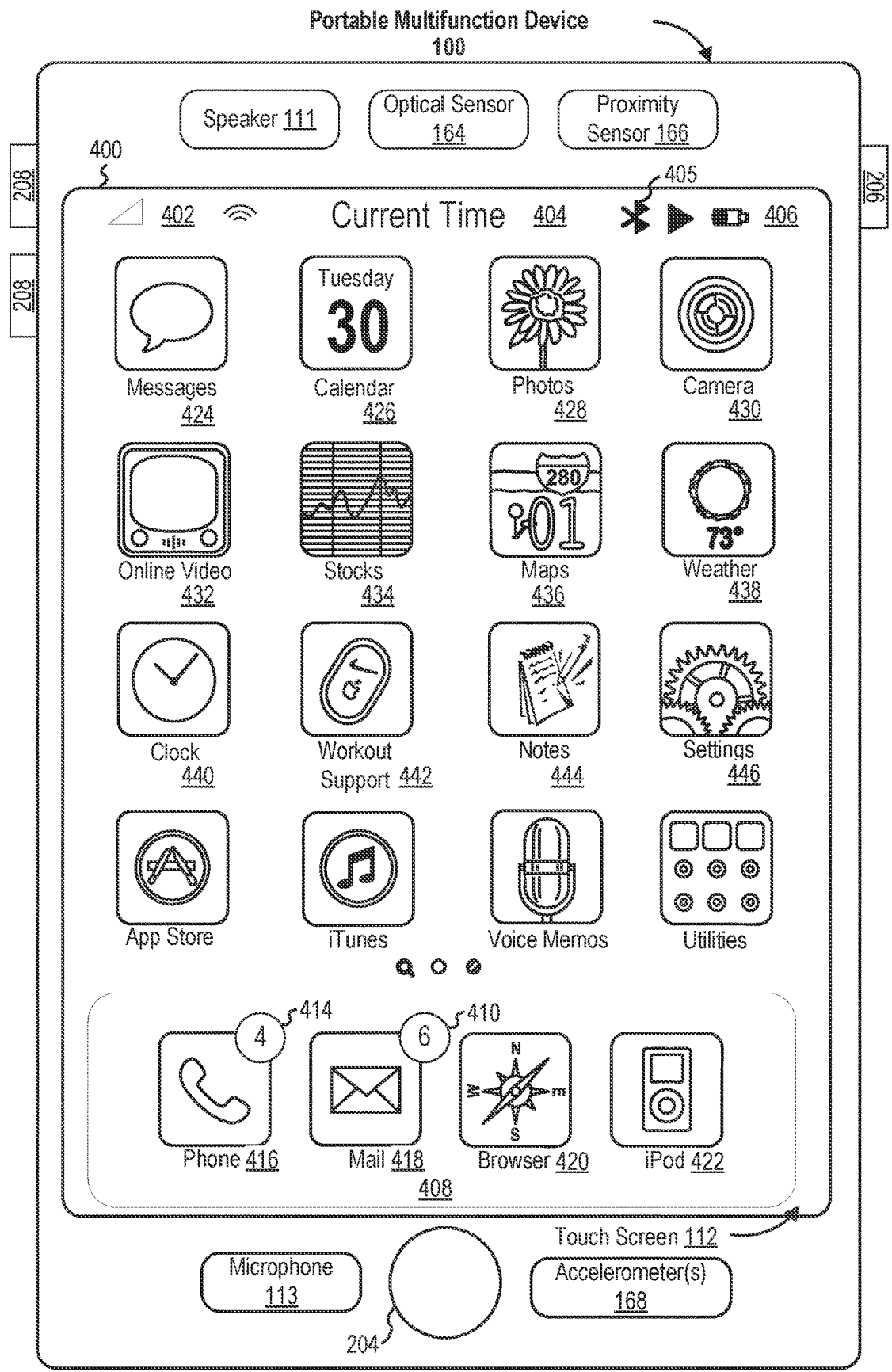
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
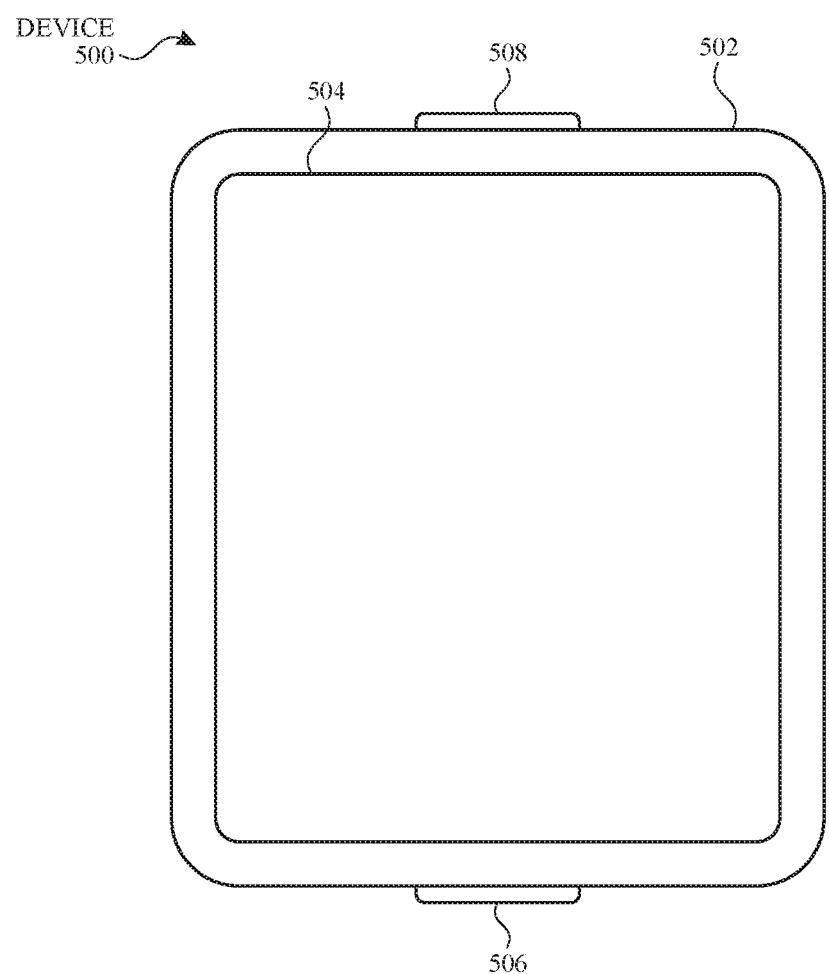
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
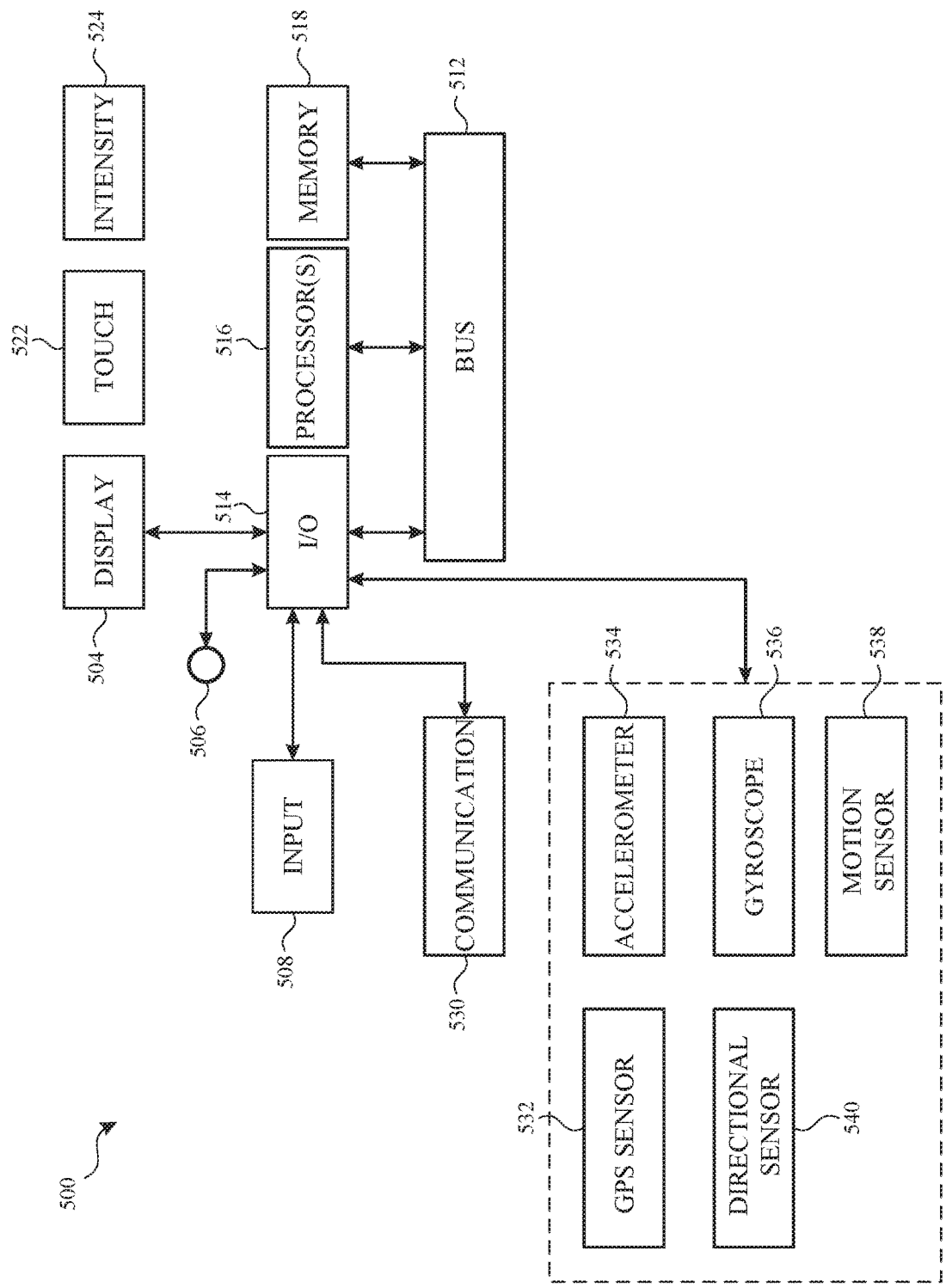
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700-900 (FIGS. 7A-7B, 8, and 9A-9B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
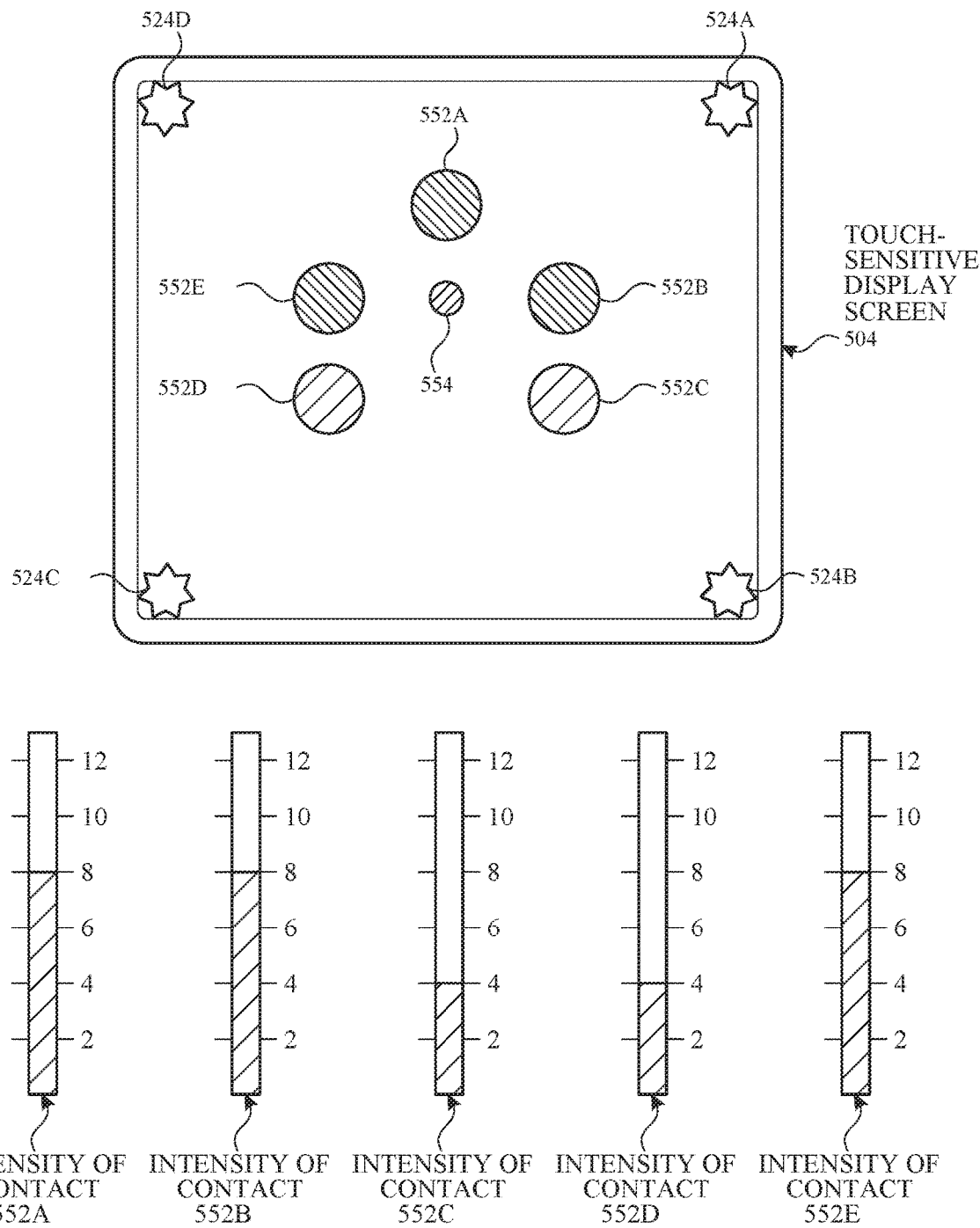

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "IT$_L$") in FIG. 5E, to an intensity above a deep press intensity threshold (e.g., "IT$_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "IT$_D$"). Contact 562 is maintained on touch-sensitive surface 560. In response to the detection of the gesture, and in accordance with contact 562 having an intensity that goes above the deep press intensity threshold (e.g., "IT$_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "IT$_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6AF illustrate exemplary user interfaces for managing a communication session, in accordance with some embodiments. The user interfaces in these figures are used to illustrate the processes described below, including the processes in FIGS. 7A-7B, 8, and 9A-9B.

FIG. 6A illustrates electronic devices 602 and 652. Each electronic device corresponds to a different user. For example, device 602 corresponds to a first user ("Freddy") and device 602 is logged into a first user account corresponding to the first user. For another example, device 652 corresponds to a second user ("Nick") and device 652 is logged into a second user account corresponding to the second user. Devices 602 and 652 are remote from each other.

The device 602 receives user input to activate a messaging application (e.g., a tap on an affordance corresponding to the messaging application). As illustrated in FIG. 6A, in response to receiving the user input, device 602 displays a user interface 604 for the messaging application. The user interface 604 for the messaging application includes affordances 604a for accessing a plurality of conversations and an affordance 604b for starting a new conversation. At FIG. 6A, device 603 receives tap input 606a on (e.g., at a location on a touch-sensitive surface corresponding to) affordance 604b. The display of device 652 is off in FIG. 6A.

At FIG. 6B, in response to receiving the tap input 606a, device 602 displays entry field 604c for receiving contact information of participants for the conversation entered by the user, keyboard 604d for entering information (such as the contact information), field 604f for receiving messages entered by the user (e.g., using keyboard 604d), and affordance 604e for adding participants to the conversation. The display of device 652 is off in FIG. 6B.

At FIG. 6C, device 602 receives tap input 606b on affordance 604e. Device 602 receives additional user inputs selecting contacts from an address book and adds the selected contacts to the conversation as participants, as illustrated in field 604c of FIG. 6D. Device 602 also receives user input, such as by voice input or keyboard entry using keyboard 604d, that, as illustrated in FIG. 6D, is displayed in field 604f in the form of a draft message (e.g., without transmitting the message to the participants of the conversation). In this example, the draft message includes a first portion that does not include a URL and a second portion that does include a URL. The URL is a link to a media file. The display of device 652 is off in FIGS. 6C-6D.

At FIG. 6E, device 602 receives tap input 606c on affordance 604g for sending the draft message. The display of device 652 is off in FIG. 6E.

In response to receiving tap input 606c on affordance 604g, device 602 transmits the contents of the draft message to the participants of the conversation and, as illustrated in FIG. 6F, displays the message 608a and 608b in the conversation log 608. Live affordance 610 provides an indication as to whether device 602 is currently transmitting a live media stream to the participants of the conversation. In this example, live affordance 610 is not bolded, thus indicating that device 602 is not transmitting a live media stream to the participants of the conversation. In some examples, the indication as to whether device 602 is transmitting includes one or more of: a color, a size, and an animation of live affordance 610. Device 602 concurrently displays a plurality of avatars 618a, 620a, and 622a for participants of the communication session other than the user of device 602. In this example, avatars 618a, 620a, and 622a are displayed above conversation log 608. Avatars 618a, 620a, and 622a are adjacent to live affordance 610, which is above conversation log 608. Device 602 also displays, directly below each avatar, the name of the respective participant represented by the avatar. Conversation log 608 separates avatars 618a, 620a, and 622a from keyboard 604d. As an example, avatar 618a is a 3D computer-generated image representing participant Nick who is participating in the conversation using device 652.

At FIG. 6F, device 652 receives the message from device 602 while in a locked state and displays, on lock screen 654, a notification 654a that includes at least a portion of the received message and, optionally, an indication of the sender (e.g., "Freddy").

At FIG. 6G, device 602 and device 652 both receive a new message from another participant of the conversation ("Lauren"). Device 602 displays the new message 608c in the conversation log 608. Device 652, while in the locked state, displays the new message 654b on lock screen 654.

At FIG. 6H, device 602 receives tap input 606d on live affordance 610. At FIG. 6I, in response to receiving tap input 606d on live affordance 610, device 602 displays a menu 612 that concurrently includes an audio affordance 612a for transmitting a live media stream that includes live audio and does not include live video, a video affordance 612b for transmitting a live media stream that includes live audio and live video, and a cancel affordance 612c for continuing to not transmit a live media stream. While concurrently displaying audio affordance 612a, video affordance 612b, and cancel affordance 612c, device 602 receives tap input 604h on audio affordance 612a.

As illustrated in FIGS. 6J-6M, in response to receiving tap input 604h on audio affordance 612a, device 602 provides the user with a countdown 614 to beginning transmission of the live media stream. In some examples, the countdown is provided through generating audio (e.g., a verbal countdown played using a speaker of device 602). In some examples, the countdown is provided through tactile feedback. In this example, the countdown is provided through visual display of countdown 614, as illustrated in FIGS. 6J-6M. Countdown 614 includes cancel affordance 614a which, when activated, cancels the countdown without beginning transmission of the live media stream. Note that device 602 is not transmitting a live media stream throughout FIGS. 6A-6I, as indicated by live affordance 610 not being bolded.

Figure 6M:
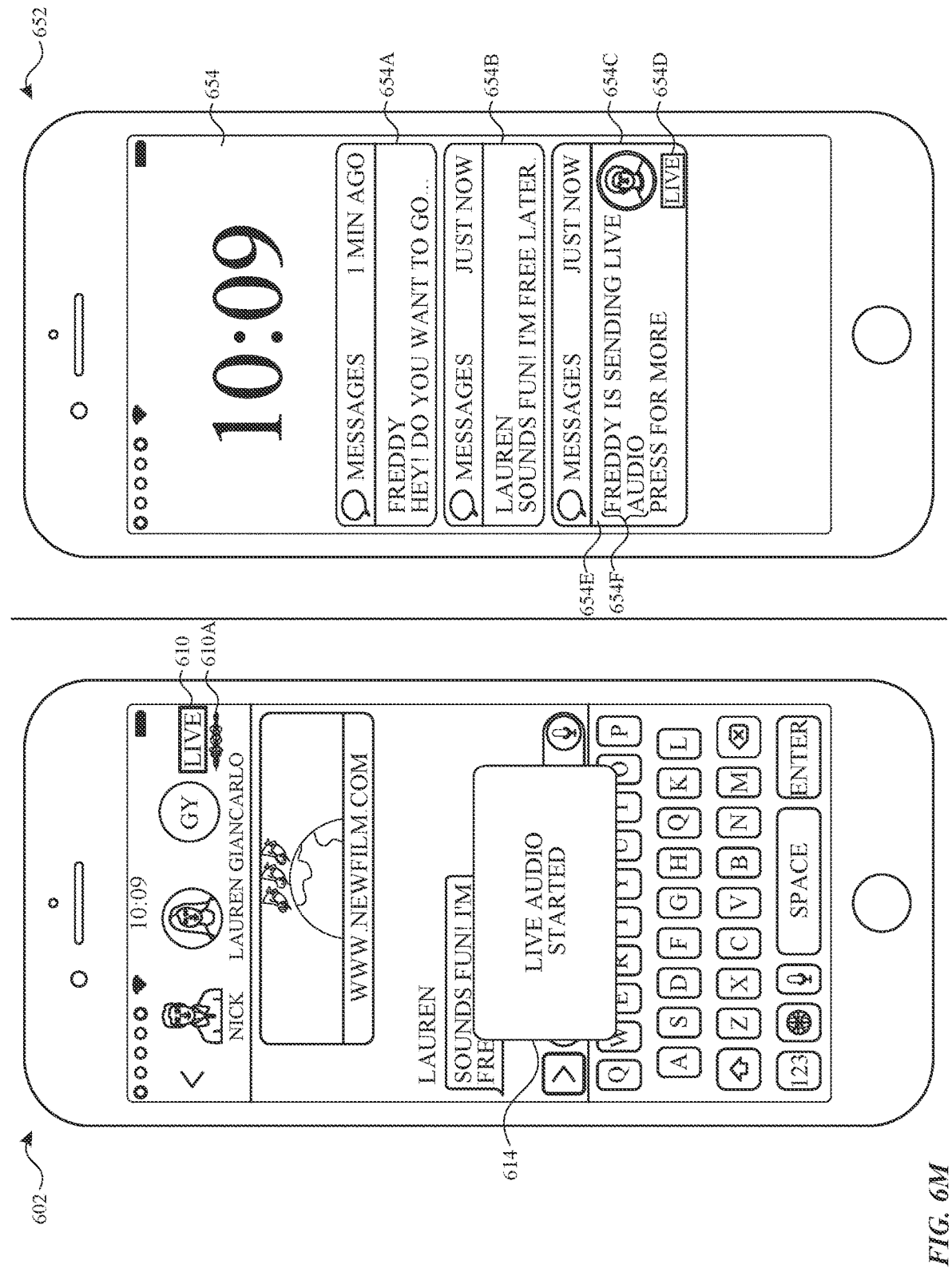
FIGS. 6A-6AF illustrate exemplary devices and user interfaces for managing a communication session.

At FIG. 6M, in response to receiving tap input 604h on audio affordance 612a and after the countdown has successfully completed, device 602 begins detecting audio using a microphone of device 602. In some examples, device 602 begins detecting audio before the countdown has completed but does not transmit that audio as part of the live media stream. In some examples, in response to receiving tap input 604h on audio affordance 612a, device 602 forgoes beginning to detect video using a camera sensor of device 602.

In response to receiving tap input 604h on audio affordance 612a and after the countdown has successfully completed, device 602 begins transmitting audio (without video) in a live media stream to the participants (other than to the user of device 602) of the conversation. Because device 602 received activation of audio affordance 612a, rather than video affordance 612b, the live media stream includes live audio and does not include live video. Had device 602 received activation of affordance 612b, the live media stream would include live audio and live video.

As illustrated in FIG. 6M, device 652 receives an indication that a participant of the conversation is streaming live media. While in the locked state, device 652 displays, on lock screen 654, notification 654c that Freddy is transmitting a live media stream. Notification 654c includes an indication of the sender 654e of the live media stream and an indication, such as indication 654d or indication 654f, that the notification is for a live media stream and, optionally, that the notification is for a live audio stream (rather than a live video stream).

At FIG. 6N, in response to device 602 beginning to transmit the live media stream to the participants of the conversation, device 602 displays a notification 608d in the conversation log 608 indicating that device 602 has begun transmitting a live media stream. Similarly, live affordance 610 provides an indication that device 602 is transmitting a live media stream to the participants of the conversation. In this example, live affordance 610 is bolded to indicate that device 602 is transmitting a live media stream. Further, live affordance 610 is updated to include an audio indicator 610a that varies (e.g., in shape, size, and/or color) in accordance with a volume (or frequency) of audio detected by device 602 using a microphone. Audio indicator 610a indicates the state of the live media stream to the user and confirms to the user that device 602 is properly detecting audio for use in the live media stream.

FIG. 6N also illustrates device 652 receiving input 656a on notification 654c on lock screen 654. In some examples, device 652 includes one or more intensity sensors and determines whether a characteristic intensity of input 656a exceeds an intensity threshold. In accordance with the characteristic intensity of input 656a exceeding the intensity threshold, device 652 provides a preview of the live media stream to the user without opening a corresponding messaging application (and, optionally, without indicating to other participants that the user has joined the conversation). In accordance with the characteristic intensity of input 656a not exceeding the intensity threshold, device 652 provides the live media stream to the user by opening the corresponding messaging application (and, optionally, indicates to other participants that the user has joined the conversation).

As illustrated in FIG. 6O, in response to device 652 detecting input 656a, device 652 displays a user interface for a messaging application, including conversation log 658. Conversation log 658 includes messages 658a-658c received from other participants in the conversation and a notification 658d indicating that a participant (the user of device 602) has begun transmitting a live media stream. Notification 658d includes join affordance 658e which, when activated, cause device 652 to join the live media stream (e.g., begin providing the live media stream to the user of device 652). In some examples, in response to device 652 detecting input 656a, device 652 provides the live media stream(s) being transmitted by participants of the conversation to the user (e.g., via a speaker)—in this case live audio being transmitted by device 602. In some examples, in response to device 652 detecting input 656a, device 652 does not provide, to the user (e.g., via a speaker), the live media stream(s) being transmitted by participants of the conversation until activation of join affordance 658e is received. Device 652 concurrently displays a plurality of avatars 668a, 670a, and 672a for participants of the communication session other than the user of device 652. In this example, avatars 668a, 670a, and 672a are displayed above conversation log 658. Avatars 668a, 670a, and 672a are adjacent to live affordance 660. In particular, avatar 668a represents participant Freddy who is participating in the conversation using device 602. Device 652 also displays, directly below each avatar, the name of the respective participant represented by the avatar.

At FIG. 6O, device 602 receives tap input 604i on live affordance 610. At FIG. 6P, in response to receiving tap input 604i on live affordance 610, device 602 displays a menu 616 that concurrently includes a video affordance 616a for transitioning from transmitting live audio to transmitting live video and live audio, an end-audio affordance 616b for ceasing to transmit the live media stream, and a cancel affordance 616c for continuing to transmit a live media stream including live audio and not including live video.

At FIG. 6P, device 652 receives tap input 656b on join affordance 658e. In response to detecting activation of join affordance 658e, as illustrated in FIG. 6Q, device 652 begins transmitting a live media stream that includes live audio (and does not include live video), in addition to providing the live media stream(s) to the user (e.g., via a speaker) being transmitted by participants of the conversation—in this case live audio being transmitted by device 602. Similarly, device 652 updates live affordance 660 to be bolded to indicate to the user that device 652 is transmitting a live media stream to participants of the conversation. At FIG. 6Q, device 652 displays notification 658f in the conversation log 658 indicating that participant Freddy has begun transmitting a live media stream including live audio using device 602. As a result, device 602 receives the live audio from device 652 and outputs the live audio received from device 652 on speakers of device 602. Further, device 602 provides an indication that participant Nick is providing a live media stream by displaying dot 618c under avatar 618a, the dot 618c being displayed next to the name of the participant ("Nick"). Device 652 further displays, in conversation log 658, notification 658g indicating that device 652 is transmitting live audio to participants of the conversation.

At FIG. 6Q, while device 602 is transmitting live audio to participants of the conversation, device 602 receives tap input 604j on video affordance 616a for transitioning from transmitting live audio to transmitting live video and live audio. In response to device 602 receiving tap input 604j on video affordance 616a, device 602 transitions from not transmitting live video to transmitting live video and live audio.

At FIG. 6R, in response to device 602 receiving tap input 604j on video affordance 616a, device 602 replaces display of conversation log 608 with avatars 618a, 620a, and 622a of one or more participants of the conversation. In some examples, device 602 displays an animation that transitions the avatars 618a, 620b, and 620c displayed above the conversation log to a grid that replaces the conversation log by enlarging the avatars, moving the avatars (e.g., down on the display), and changing the shapes (e.g., from round to rectangular) of the avatars. Device 602 also displays avatar 624a of the user of device 602. Avatar 618a of participant Nick is a 3D computer-generated image. Indication 618b indicates that participant Nick is transmitting live audio. Avatar 620a of participant Lauren is a static image accessed from an address book of device 602. Participant Lauren is not transmitting a live media stream (no live audio and no live video). Avatar 622a of participant Giancarlo is a set of initials for the participant. Thought bubble 622b indicates that participant Giancarlo is typing a draft message in the conversation. Avatar 624a of the user of device 602 (Freddy) is a live video captured using a camera of device 602, such as a forward facing camera, which is the same live video device 602 is transmitting in the live media stream. Full-screen affordance 624b, when activated, causes device 602 to enlarge avatar 624a and, optionally, to replace display of avatars 618a, 620a, and 622a. Camera affordance 624c, when activated, causes device 602 to change the source for the user's live video stream from a first camera sensor (e.g., the forward facing camera) to a second camera sensor (e.g., a rear facing camera). Affordance 624d, when activated, cause device 602 to transition between transmitting live audio without live video and live audio with live video.

At FIG. 6R, device 652 begins receiving live video corresponding to participant Freddy. In response to receiving live video corresponding to participant Freddy, device 652 updates avatar 668a of participant Freddy to include the live video corresponding to participant Freddy. As illustrated in FIG. 6R, device 652 displays a ring 668b around avatar 668a. In some examples, displaying ring 668b indicates that participant Freddy is transmitting a live media stream. In some examples, a characteristic (e.g., a color, a thickness, an animation) of ring 668b is indicative of whether participant Freddy is currently transmitting a live media stream to participants of the communication session. In some examples, the size (and/or color, and/or shape) of ring 668b varies in accordance with a volume (or frequency) of audio received from participant Freddy.

At FIG. 6S, participant Lauren has started transmitting live video and, as a result, device 602 updates avatar 620a of participant Lauren to include the live video being received from participant Lauren. Further, device 620a displays caption affordance 620b with avatar 620a based on receiving live audio from participant Lauren. Device 602 has received a textual message from participant Giancarlo and, as a result, device 602 displays the message in speech bubble 622c with avatar 622a of participant Giancarlo. As illustrated in FIG. 6S, device 602a receives tap input 604k on caption affordance 620b. In response to receiving tap input 604k on caption affordance 620b, device 602 begins to display, such as at FIG. 6U, captions 620c for audio transmitted by participant Lauren. The captions are optionally transcribed at device 602a or at a remote server.

At FIG. 6S, participant Lauren has started transmitting live video and, as a result, device 652 updates avatar 670a of participant Lauren to include the live video being received from participant Lauren.

As illustrated in FIGS. 6T-6X, device 652 receives downward swipe user input 656c starting at a location adjacent to the top of the display (e.g., adjacent to avatars 668a, 670a, and 672a, on a handle). Device 652 continues to receive the swipe user input 656c as it progresses toward the bottom of the display without detecting liftoff of the swipe user input 656c. As the swipe user input 656c progresses (with handle 662), device 652 transitions display of the avatars 668a, 670a, and 672a of the participants by concurrently gradually enlarging sizes of the avatars 668a, 670a, and 672a, changing the shapes of the displayed avatars (e.g., from circular in FIG. 6T to rectangular in FIG. 6W), and changing locations of the displayed avatars 668a, 670a, and 672a (e.g., from a 1-by-3 grid at the top of the display to a 2-by-2 grid).

Figure 6V:
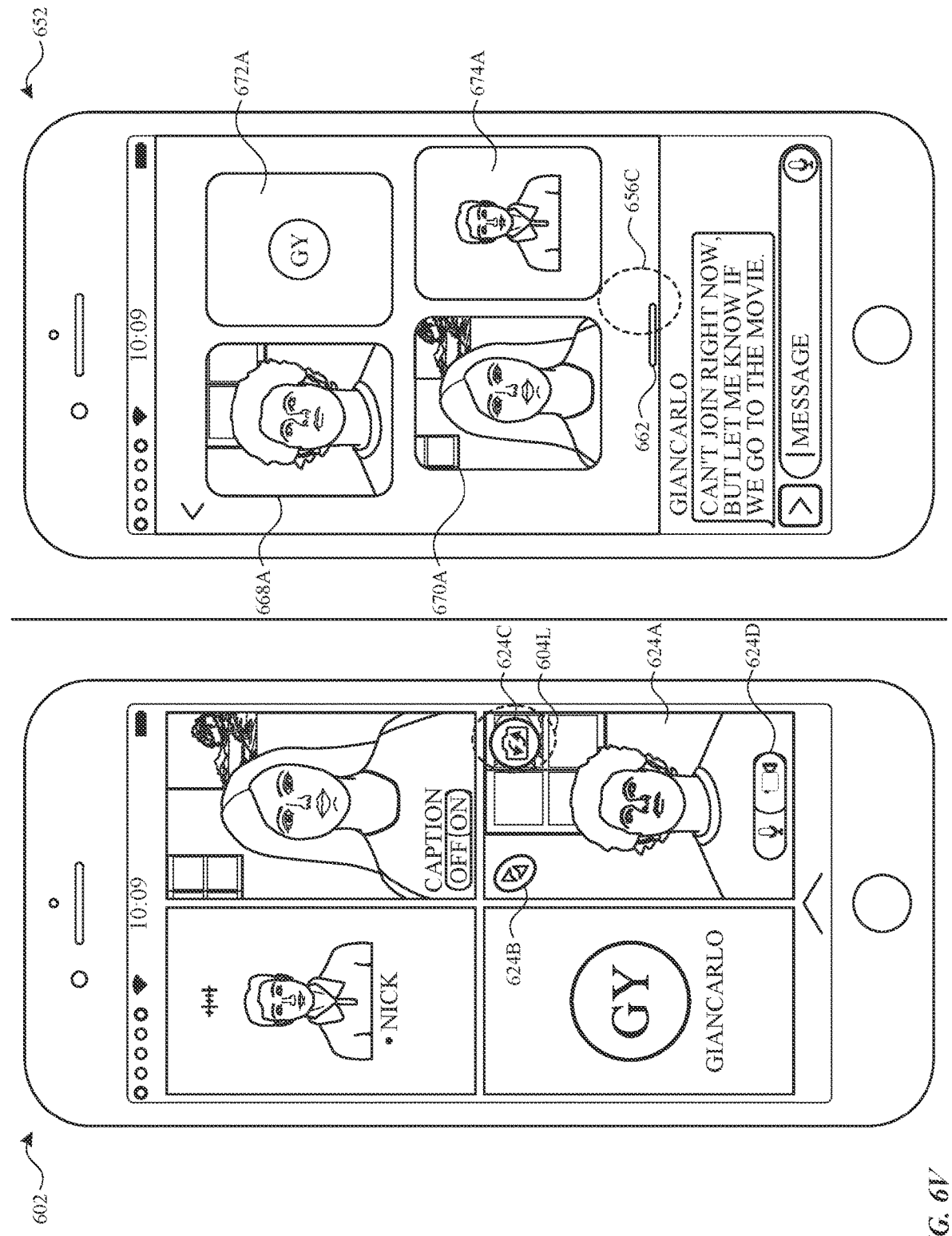
Figure 6W:
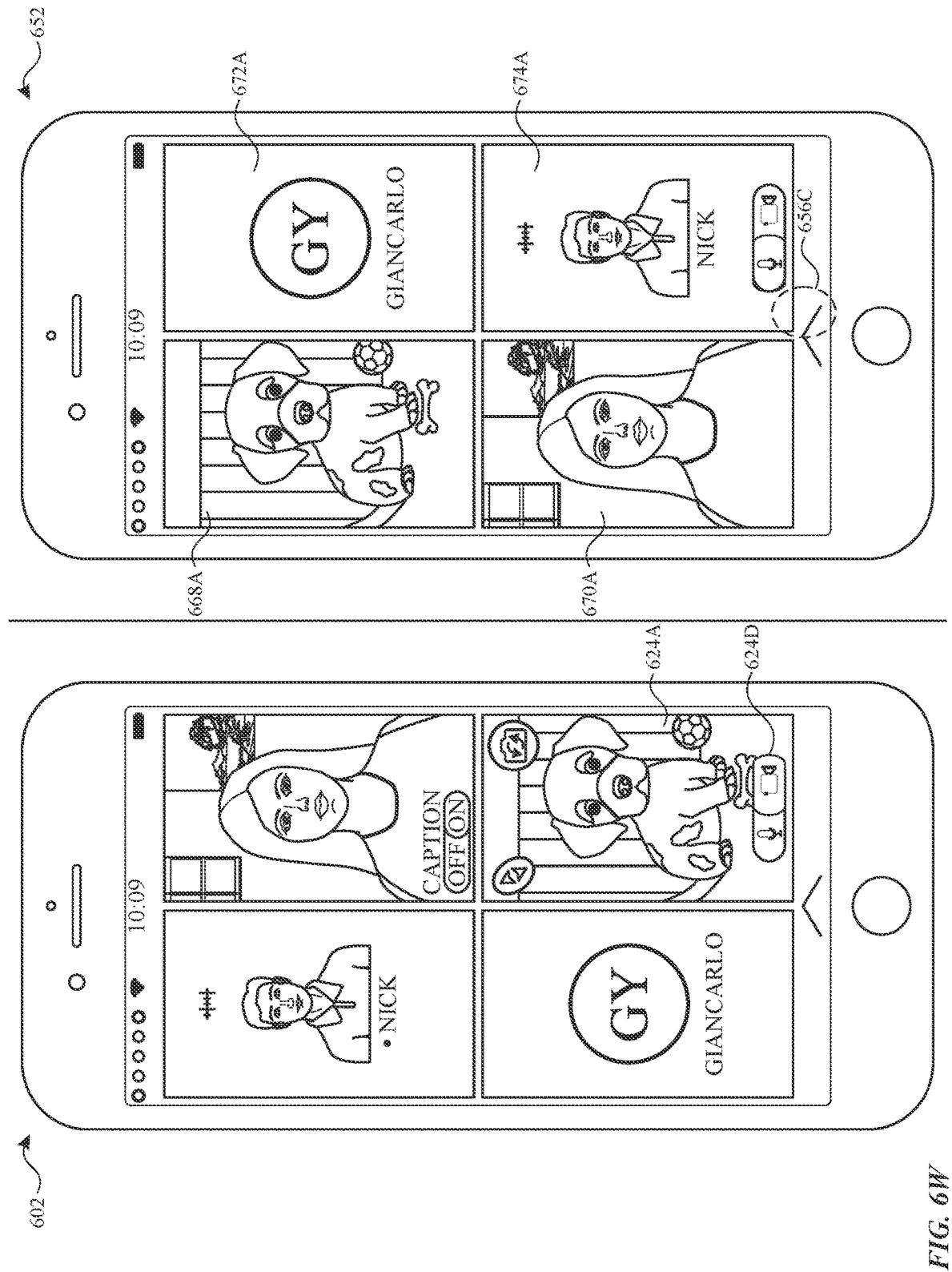
Figure 6A:
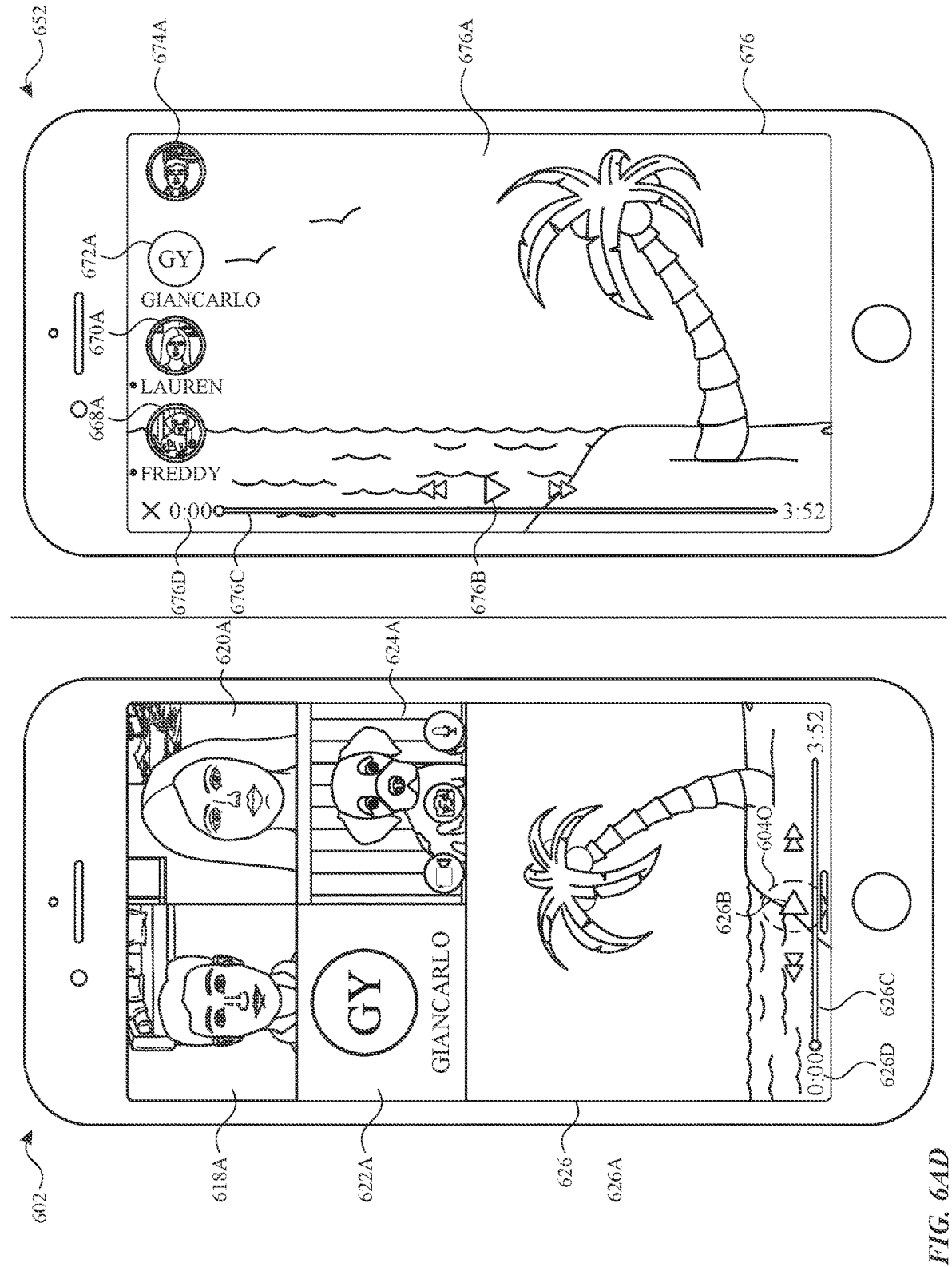

At FIG. 6V, device 602 receives tap input 604l on camera affordance 624c. As illustrated in FIGS. 6V and 6W, in response to receiving tap input 604l on camera affordance 624c, device 602 transitions the live video of avatar 624a from a first camera (e.g., a forward facing camera) to a second camera (e.g., a rear facing camera) of device 602.

At FIG. 6X, device 602 receives tap input 604m on full-screen affordance 624b. As illustrated in FIG. 6Y, in response to receiving tap input 604m on full-screen affordance 624b, device 602 enlarges the avatar 624a on display of device 602, such as by using a smooth animation. At FIG. 6Y, avatar 674a represents the participant Nick of device 652. Device 652 receives tap input 656d on affordance 674b. In response to receiving tap input 656d, device 652 transitions from transmitting live audio without live video to transmitting live audio with live video (e.g., by beginning to capture live video at device 652 using a front-facing camera sensor), as illustrated by avatar 674a including live video in FIG. 6Z.

At FIG. 6AA, device 602 has transitioned back to displaying message log 608, including notification 608e indicating that participant Nick of device 652 had previously started transmitting live video as part of a live media stream. In this example, device 602 continues to transmit live video in the live media stream, as indicated by bolded live affordance 610. Similarly, device 652 has transitioned back to displaying message log 658, including notification 658h indicating that device 652 had previously started transmitting live video as part of a live media stream.

At FIG. 6AB, the user of device 602 has provided a link to a media file, such as by entering a URL into field 604f. In some examples, the user enters the URL using the same (or similar) technique as described with relation to FIGS. 6D-6F. In this example, the media file is a video. In response, device 602 transmits the link to the media file to other participants of communication session (e.g., Freddy, Lauren, Giancarlo). As illustrated in FIG. 6AB, device 602 displays a message 608f, including affordance 608g for synchronized playback of the media file and affordance 608h for local (unsynchronized) playback of the media file. The visual appearance of affordance 608h is based on the content of the media (e.g., includes a frame from the corresponding video). Message 608f also includes an indication 608i of the source of the media file.

At FIG. 6AB, in response to receiving the media file transmitted by device 602, device 652 displays message 658i, including affordance 658l for synchronized playback of the media file and affordance 658j for local playback of the media file. The visual appearance of affordance 658j is based on the content of the media (e.g., includes a frame from the corresponding video). Message 658i also includes an indication 658k of the source of the media file.

Affordance 608h, when activated, causes device 602 to display a media playback user interface for playing the media file without synchronizing the playback with the other participants of the conversation. This allows the user of device 602 to, for example, watch a video without causing playback of the video to begin at the other participant's devices. Affordance 608g, when activated, causes device 602 to display the media playback user interface for playing the media file while synchronizing the playback with the other participants of the conversation. This allows the user of device 602 to, for example, watch a video with playback that is synchronized across one or more of the other participant's devices.

At FIG. AC, device 602 detects tap input 604n on affordance 608g. In response to detecting tap input 604n on affordance 608g, device 602 displays media playback user interface 626 and transmits instructions to the participants of the conversation to display respective media playback user interfaces (e.g., 676), as illustrated in FIG. 6AD. Media playback user interface 626 includes video 626a, time counter 626d showing the playback time of the media file, play affordance 626b for starting playback of the media file, other media controls (fast forward, rewind), and scrubbing bar 626c for scrubbing to different times in the media file. Media playback user interface 676 includes video 676a, time counter 676d showing the playback time of the media file, play affordance 676b for starting playback of the media file, other media controls, and scrubbing bar 676c for scrubbing to different times in the media file. Either device 602 and/or device 652 can display either media playback user interfaces 626 and 676 and the corresponding layout of avatars.

In some examples, synchronized playback of the media file begins (e.g., on device 602 and device 652) automatically in response to tap input 604n. In this example, synchronized playback begins in response to device 602 detecting activation of play affordance 626b or device 652 detecting activation of play affordance 676b. At FIG. 6AD, device 602 receives tap input 604o on play affordance 626b. In response to detecting tap input 604o on play affordance 626b, device 602 begins local playback of the media file and transmits instructions to control remote playback of the media file at devices of the other participants (e.g., on device 652) such that the local and remote playback is substantially synchronized, as illustrated in FIG. 6AE.

At FIG. 6AE, device 602 detects swipe input 604p on scrubbing bar 626c. In FIG. 6AF, in response to detecting swipe input 604p, device 602 updates display of video 626a to a time in the video corresponding to the updated scrubbing bar position and transmits an instruction to participants of the conversation such that respective media player user interfaces of the participants also update to the time in the video such that playback of the video is substantially synchronized among the devices. Similarly, inputs received at device 652 that control the playback back of video 676a (e.g., using scrubbing bar 676c) cause device 652 to update local display of the video at device 652 and transmit instructions to control playback of the video at devices of participants (e.g., at device 602) of the conversation such that playback of the video is substantially synchronized among the devices.

As further illustrated in FIG. 6AE, device 602 continues to receive live media streams, such as live video and live audio, from participants of the conversation during the synchronized playback of video 626a. As a result, the user of device 602 can view video 626a and simultaneously see and hear the reaction of the other participants as they also watch the same portions of the video.

In some examples, participants of the conversation can share (e.g., by transmitting) live views of the user interfaces of their respective devices, rather than live video captured using cameras. In some examples, the above techniques can be used to synchronize game play on respective devices, rather than or in addition to, video playback. For example, two remote users can share the same view and control the same character in a first-person game.

In some examples, while device 602 is transmitting a live media stream, device 602 receives user inputs and, in response, returns to displaying user interface 604 for the messaging application that includes affordances 604a for accessing a plurality of conversations while continuing to transmit the live media stream. In some examples, returning to user interface 604 causes device 602 to cease transmitting live video (but continue transmitting live audio) to participants of the conversation.

In some examples, device 602 modifies the audio from respective participants based on the location of display of the respective avatar for the participant on the display (e.g., using head-related transfer functions, audio corresponding to avatar at top of display sounds like it is coming from above, audio corresponding to avatar on right of display sounds like it is coming from the right). In some examples, a live media stream including live video can be redirected to a remote device for display on a television.

In some examples, the conversation is maintained even when the initiator of the conversation (e.g., user of device 602) leaves the conversation. In some examples, the conversation ends when last participant leaves the conversation. In some examples, the device transmitting a live media stream can save the live media stream into local memory, such as into a repository accessible by an image or video viewing application.

FIGS. 7A-7B are a flow diagram illustrating a method for transmitting live media (e.g., live audio and/or live video) using an electronic device in accordance with some embodiments. Method 700 is performed at a device (e.g., 100, 300, 500) with a display, one or more camera sensors, and one or microphones. Some operations in method 700 are, optionally, combined, the orders of some operations are, optionally, changed, and some operations are, optionally, omitted.

As described below, method 700 provides an intuitive way for transmitting live media (e.g., live audio and/or live video). The method reduces the cognitive burden on a user for transmitting live media, thereby creating a more efficient human-machine interface. For battery-operated computing devices, enabling a user to transmit live media faster and more efficiently conserves power and increases the time between battery charges.

In method 700, the electronic device receives (702) user input (e.g., 606b) identifying one or more contacts to include as one or more participants (e.g., other than the user of the electronic device) in a communication session. In some examples, the electronic device receives user input selecting the one or more contacts from among a plurality of contacts, such as from among contacts stored in an electronic address application.

In accordance with some embodiments, the electronic device receives (704) (e.g., subsequent to receiving the user input 606b identifying the one or more contacts) user input (e.g., 606d) for initiating a live streaming session (e.g., activation of a "live" affordance 610).

While in the communication session, the electronic device concurrently displays (706), on the display: a first (708) affordance (e.g., 612a) for transmitting a live media stream that includes live audio and does not include live video (or any video), and also a second (710) affordance (e.g., 612b) for transmitting a live media stream that includes live audio and live video (e.g., a single stream that includes both audio and video).

In accordance with some embodiments, the electronic device concurrently displaying the first (e.g., 612a) and second affordances (e.g., 612b) is in response to receiving the user input (e.g., 606d) for initiating the live streaming session.

The electronic device receives (712) user input (e.g., 604h) activating one of the first affordance and the second affordance.

In accordance with (714) receiving user input (e.g., 604h) activating the first affordance (e.g., 604a), the electronic device detects (716), using the one or more microphones, audio. In some examples, the electronic device does not detect using the one or more camera sensors, a plurality of images for a video.

Further in accordance with (714) receiving user input (e.g., 604h) activating the first affordance (e.g., 604a), the electronic device transmits (718) (e.g., concurrently with detecting the audio) live audio (without video, based on the detected audio) in a live media stream to the one or more participants (other than the user of the electronic device) of the communication session, wherein transmitting the live audio occurs without transmission of live video. Optionally, the electronic device does not detect, using the one or more camera sensors, images. Optionally, the electronic device does not transmit streaming video (e.g., captured based on images detected by the one or more camera sensors) for receipt by the participants of the communication session.

In accordance with (720) receiving user input activating the second affordance (e.g., 604b), the electronic device detects (722), using the one or more microphones, audio. Further in accordance with (720) receiving user input activating the second affordance (e.g., 604b), the electronic device detects (724) (e.g., concurrently with detecting the audio), using the one or more camera sensors, a plurality of images for a video. Further in accordance with (720) receiving user input activating the second affordance (e.g., 604b), the electronic device transmits (726) the live audio (e.g., based on the detected audio) and the live video (e.g., based on plurality of images for a video) in a live media stream to the one or more participants (e.g., other than the user of the electronic device) of the communication session. In some examples, alternatively (or in addition) to transmitting the audio or audio/video, the electronic device transmits invitations for receipt by the participants of the communication session to begin receiving the respective audio or audio/video.

In accordance with some embodiments, in accordance with receiving the user input (e.g., 604h) activating the first affordance (e.g., 612a), the electronic device displays, in a transcript area (e.g., 608) of the communication session, an indication (e.g., 608d) that live audio streaming has begun. In accordance with some embodiments, in accordance with receiving the user input activating the second affordance (e.g., 612b), the electronic device displays, in the transcript area of the communication session, an indication that live video streaming has begun. Providing an indication of the type of streaming that has begun provides the user with feedback about the type of information being collected and transmitted to other participants. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, in response to receiving the user input (e.g., 606*b*) identifying one or more contacts, the electronic device automatically transmits requests to the one or more contacts to join the communication session. Automatically transmitting the requests to the one or more contacts enables the user to share live audio and/or video with the contacts without requiring excessive user inputs. Reducing the number of inputs needed to perform an operation enhances the operability of the device and makes the user-device interface more efficient which, additionally, reduces power usage and improves battery life of the device by enabling the user to use the device more quickly and efficiently.

In accordance with some embodiments, the electronic device receives a request to transmit media (e.g., 604*h*, 604*j*) to participants of the communication session. In response to receiving the request to transmit media to participants of the communication session, in accordance with a determination that the communication session does not currently include transmitting a live media stream, the electronic device transmits a first type of notification to one or more of the first participants without transmitting a second type of notification to the one or more of the first participants. In response to receiving the request to transmit media to participants of the communication session, in accordance with a determination that the communication session does currently include transmitting a live media stream, the electronic device transmits the second type of notification to one or more of the first participants without transmitting the first type of notification to the one or more of the first participants. In some examples, the device transmits different type of data based on whether the current communication session does or does not include live streaming of audio and/or video.

In accordance with some embodiments, the electronic device displays one or more respective avatars (e.g., 618*a*, 620*a*, 622*a*, 668*a*, 670*a*, 672*a*) for one or more (e.g., all, some but not all) of the participants of the communication session. In some examples, in accordance with receiving a live media stream including live video from a participant, the respective avatar of the participant includes at least a portion of the received live video. In some examples, the electronic device arranges the one or more respective avatars in a grid-style arrangement. Displaying avatars for respective participants provides the user with visual feedback about who is a participant in the communication session independent of whether the participant is currently speaking. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the electronic device displays one or more respective status indicators (e.g., 610, 660, 668*b*) for one or more (e.g., all, some but not all) of the participants of the communication session. The respective status indicators include respective indications of whether the respective participant is currently transmitting a live media stream to participants of the communication session. Displaying status indicators for participants provides the user with visual feedback about the status of each participant in the communication session (e.g., streaming media, not streaming media, streaming only audio, streaming audio/video). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the electronic device displays respective avatars (e.g., 668*a*) of participants of the communication session. In some examples, in accordance with receiving a live media stream including live video from a participant, the respective avatar of the participant includes at least a portion of the received live video. The respective status indicators (e.g., 668*b*) for the participants of the communication sessions include a visual indicator (e.g., 668*b*, ring, circular image) around the respective avatars (e.g., 668*a*) of the participants of the communication session. A characteristic (e.g., a color, a thickness, an animation) of the visual indicator is indicative of whether the respective participant is currently transmitting a live media stream to participants of the communication session. In some examples, the ring (e.g., 668*b*) around the avatar (e.g., 668*a*) of a participant that is currently streaming live media (e.g., audio and/or video) is a first color (e.g., green). In some examples, the ring (e.g., 668*b*) around the avatar (e.g., 668*a*) of a participant that is not currently streaming live media (e.g., audio and/or video) is a second color (e.g., not green, red). In some examples, avatars of participants that are not currently streaming live media (e.g., audio and/or video) do not include the ring. In some examples, a green ring indicates the participant is currently streaming live audio. In some examples, a red ring indicates the participant is currently streaming live audio and video. Displaying varying types of indicators (e.g., shapes, colors) based on the status of the participant provides the user with visual feedback about the status of each participant in the communication session (e.g., streaming media, not streaming media, streaming only audio, streaming audio/video). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the characteristic of the visual indicator (e.g., 668*b*) is a size of the visual indicator. The visual indicator (e.g., 668*b*) of a respective participant (e.g., 668*a*) varies in accordance with a volume (or frequency) of audio received from the respective participant. In some embodiments, the characteristic of the ring (e.g., 668*b*) is a shape of the ring (e.g., 668*b*), a radius of the ring (e.g., 668*b*), a width of the ring (e.g., 668*b*), and/or a surface area of the ring (e.g., 668*b*), which varies in accordance with volume and/or frequency of audio received from the respective participant. Displaying changes in the visual indicator based on volume (or frequency) allows the user to visually see whether the participant is streaming live audio and a relative volume of the live audio, rather than requiring the user to turn on speakers or wear a headset. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, while in the communication session and not displaying a keyboard on the display, the electronic device detects a first gesture (e.g., a swipe-up gesture on a touch-sensitive surface of the device). In response to detecting the first gesture, the electronic device displays (e.g., by sliding into view from a bottom portion of the display) a keyboard (e.g., for entering text messages in the communication session).

In accordance with some embodiments, further in response to detecting the first gesture, the electronic device transitions display of one or more avatars of one or more participants of the communication session by concurrently: reducing sizes of the displayed one or more avatars of the one or more participants, changing shapes of the displayed avatars (e.g., from rectangular to circular) of the one or more participants, and changing locations (e.g., from a n-by-n grid (where n is not 1) to a 1-by-n grid (where n is not 1)) of the displayed avatars of the one or more participants. In some examples, one or more of the reducing of size, changing of shape, and changing of location effects occur while one or more of the effects do not occur, in response to detecting the first gesture. In some examples, in accordance with receiving a live media stream including live video from a participant, the respective avatar of the participant includes at least a portion of the received live video.

In accordance with some embodiments, subsequent to transitioning display of one or more avatars of one or more participants in response to the first gesture, the electronic device detects a second gesture (e.g., 656c, a swipe-down gesture on a touch-sensitive surface of the device, different from the first gesture). In response to detecting the second gesture (e.g., 656c), the electronic device transitions display of the one or more avatars (e.g., 668a, 670a, 672a) of the one or more participants by concurrently: enlarging sizes of the displayed one or more avatars of the one or more participants, changing shapes of the displayed avatars (e.g., from circular to rectangular) of the one or more participants, and changing locations (e.g., from a 1-by-n grid (where n is not 1) to an n-by-n grid (where n is not 1)) of the displayed avatars of the one or more participants. In some examples, one or more of the enlarging of size, changing of shape, and changing of location effects occur while one or more of the effects do not occur, in response to detecting the second gesture. In some examples, in accordance with receiving a live media stream including live video from a participant, the respective avatar of the participant includes at least a portion of the received live video. Automatically enlarging and rearranging the one or more avatars when space is available (e.g., when the keyboard is not displayed) provides the user with a better view of live video streams being received from other participants. Reducing the number of inputs needed to perform an operation enhances the operability of the device and makes the user-device interface more efficient which, additionally, reduces power usage and improves battery life of the device by enabling the user to use the device more quickly and efficiently.

In accordance with some embodiments, the electronic device detects a third gesture (e.g., 604m, a tap gesture) at a location corresponding to a displayed avatar of a participant of the communication session. In response to detecting the third gesture (e.g., 604m), the electronic device enlarges the respective avatar of the participant. In some examples, in accordance with receiving a live media stream including live video from a participant, the respective avatar of the participant includes at least a portion of the received live video. In some examples, the respective avatar of the participant is made full screen. In some examples, in response to detecting the third gesture, avatars of other participants cease to be displayed.

In accordance with some embodiments, the electronic device detects a user input (e.g., 604k) for enabling captions. In response to detecting the user input (e.g., 604k) for enabling captions, the electronic device displays captions (e.g., 620c) of audio feeds of one or more participants of the communication session. In some examples, the device detects a user input for disabling captions and, in response, ceases to display captions of audio feeds of participants of the communication session. In some examples, the audio feed of the participants are played concurrently with the display of the captions. In some examples, the audio feed is transcribed by the electronic device to produce the captions. In some examples, the captions are received by the electronic device for display. In some examples, other participants of the communication session can cause captions to be displayed (or cease to be displayed) on the electronic device during the communication session. For example, captions (e.g., 620c) are helpful to enable the user of the electronic device to participant in the communication session when the user is in a quiet environment, such as in a library. In some examples, the user input for enabling captions corresponds to a particular participant and the device enables captions for that participants without changing the captioning status of other participants.

In accordance with some embodiments, in response to receiving user input (e.g., 604h) activating one of the first affordance (e.g., 612a) and the second affordance (e.g., 612b), the electronic device initiates display of a countdown (e.g., 614) for initiating the live streaming session. Transmitting the audio or video in the live media stream to the one or more participants (other than the user of the electronic device) of the communication session occurs subsequent to (and in response to) completion of the displayed countdown (e.g., the countdown starting at 10 and the transmitting starting with the countdown starts at 0). Displaying a countdown before beginning to stream provides the user with feedback about when the live media streaming will begin and allows the user to prepare for live media streaming. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 700 (e.g., FIG. 7A-B) are also applicable in an analogous manner to the methods described below. For example, methods 800 and 900 optionally includes one or more of the characteristics of the various methods described above with reference to method 700. For example, methods 700, 800, and 900 describe an analogous communication session. For another example, methods 800, 800, and 900 describe analogous live media streams. For another example, the technique of method 700 can be used to start a live media session prior to performing the techniques of methods 800 and 900. For another example, methods 800 and 900 can be performed during a live media session started using the technique of method 700. For another example, the technique of method 800 can be used to change the type of media stream started using the technique of method 700. For brevity, these details are not repeated below.

FIG. 8 is a flow diagram illustrating method 800 for transitioning between streaming live audio and live video using an electronic device in accordance with some embodiments. Method 800 is performed at a device (e.g., 100, 300, 500) with a display. Some operations in method 800 are, optionally, combined, the orders of some operations are, optionally, changed, and some operations are, optionally, omitted.

As described below, method 800 provides an intuitive way for transitioning between streaming live audio and live video. The method reduces the cognitive burden on a user for transitioning between streaming live audio and live video, thereby creating a more efficient human-machine interface. For battery-operated computing devices, enabling a user to transition between streaming live audio and live video faster and more efficiently conserves power and increases the time between battery charges.

While transmitting (802) an outgoing live media stream of a first type (e.g., a live audio stream, a live audio+video stream) to one or more participants (other than the user of the electronic device) of a communication session, the electronic device outputs (804), at the electronic device, (e.g., displaying on the display, playing audio on speakers) at least one or more incoming live media streams (e.g., live video stream, live audio stream, of one or more participants).

While transmitting (802) an outgoing live media stream of a first type to one or more participants of a communication session, the electronic device receives (806) user input (e.g., 604*j*) to transition from transmitting the outgoing live media stream of the first type to transmitting an outgoing live media stream of a second type (e.g., a live audio stream, a live audio+video stream), wherein the first type is different from the second type.

In accordance with some embodiments, receiving (806) the user input to transition includes detecting (808) a tap user input (e.g., 656*d*) on an affordance (e.g., 674*b*), wherein the affordance (e.g., 674*b*) is displayed as part of an avatar (e.g., 674*a*) of the user of the electronic device.

In some examples, in accordance with currently transmitting, using a camera of the electronic device, a live media stream including live video of the user, the respective avatar of the user includes at least a portion of the live video. In some examples, the avatar of the user includes video captured by a camera of the electronic device.

In response to receiving the user input (e.g., 604*j*) to transition, the electronic device transitions (810) from transmitting the outgoing live media stream of the first type to transmitting an outgoing live media stream of a second type, including: in accordance with the first type of live media stream including live audio and not including live video, (initiating, starting) transmitting (812) live video (and optionally maintaining or restarting transmitting the live audio), and in accordance with the first type of live media stream including live audio and live video, ceasing (814) to transmit the live video (and optionally maintaining or restarting transmitting live audio).

In accordance with some embodiments, subsequent to transitioning from transmitting the outgoing live media stream of the first type to transmitting the outgoing live media stream of the second type, the electronic device receives user input to transition from transmitting the outgoing live media stream of the second type to transmitting outgoing live media stream of the first type. In response to receiving the user input to transition, the electronic device transitions from transmitting the outgoing live media stream of the second type to transmitting outgoing live media stream of the first type, including: in accordance with the second type of live media stream including live audio and not including live video, (initiating, starting) transmitting live video (and optionally maintaining or restarting transmitting the live audio), and in accordance with the second type of live media stream including live audio and live video, ceasing to transmit the live video (and optionally maintaining or restarting transmitting live audio).

In accordance with some embodiments, the electronic device further includes one or more camera sensors and one or more microphones. In accordance with some embodiments, transmitting the outgoing live media stream of the second type (e.g., audio+video) includes: transmitting images detected using the one or more camera sensors, and transmitting audio detected using the one or more microphones. Thus, live media streams include capturing live audio/video from the electronic device's environment and transmitting them to other participants.

In accordance with some embodiments, while transmitting live video, the electronic device displays, on the display, the live video (e.g., 624*a* in FIG. 6R). Thus, the electronic device concurrently displays the live video (that is being transmitted) on a display of the device. Displaying the live video that is being transmitted provides the user with feedback about the content of the video that is being transmitted. This enables the user to more easily adjust a camera that is being used to capture the live video. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the one or more cameras includes a plurality of cameras including a first camera and a second camera. While detecting, using the first camera and without using the second camera, first images and while transmitting the first images to one or more participants of the communication session (and while displaying the first images on the display), the electronic device displays an affordance (e.g., 624*c*) for switching cameras. Further while detecting and displaying the first images, the electronic device detects activation (e.g., 604*l*) of the affordance (e.g., 624*c*) for switching cameras. In response to detecting activation (e.g., 604*l*) of the affordance (e.g., 624*c*) for switching cameras, the electronic device detects, using the second camera and without using the first camera, second images. Further in response to detecting activation (e.g., 604*l*) of the affordance (e.g., 624*c*) for switching cameras, the electronic device transmits the second images to one or more participants of the communication session (and optionally displays the second images on the display without transmitting the first images or displaying the first images on the display). Thus, the electronic device displays an affordance for switching cameras. When activated, the electronic device changes the source of video transmitted to participants of the communication session and changes the source of video displayed on the display. A single input that changes both the source of video transmitted and the source of video displayed reduces the number of inputs needed to provide the operations. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, in response to receiving the user input to transition and further in accordance with the first type of live media stream including live audio and live video, the electronic device replaces, on the display, display of live video captured by the one or more cameras of the device with a static avatar image. In some examples, the static avatar image replaces the live video. Transitioning display of the user's avatar from live video to a static image indicates to the user the state of the device (not transmitting live video to participants).

In accordance with some embodiments, in response to receiving the user input to transition and further in accordance with the first type of live media stream including live audio and live video, the electronic device replaces, on the display, display of live video captured by the one or more cameras of the device with a text display region. Replacing display of the live video with a text display region provides the user with improved visual feedback that enables the user to determine the source of text being received and displayed (e.g., based on the location on the display, based on replacement of prior video being displayed). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, in response to receiving the user input to transition and further in accordance with the first type of live media stream including live audio and live video, the electronic device transitions (e.g., via animation) display of one or more avatars of one or more participants of the communication session by concurrently: reducing sizes of the displayed one or more avatars of the one or more participants, changing shapes of the displayed avatars (e.g., from rectangular to circular) of the one or more participants, and changing locations (e.g., from a n-by-n grid (where n is not 1) to a 1-by-n grid (where n is not 1)) of the displayed avatars of the one or more participants. In some examples, one or more of the reducing of size, changing of shape, and changing of location effects occur while one or more of the effects do not occur, in response to detecting the first gesture. In some examples, in accordance with receiving a live media stream including live video from a participant, the respective avatar of the participant includes at least a portion of the received live video. In some examples, in response to receiving the user input to transition and further in accordance with the first type of live media stream including live audio and live video, the electronic device further concurrently displays a transcript of the communication session and a keyboard.

In accordance with some examples, the electronic device detects user input requesting to end transmitting an outgoing live media stream. In response to detecting user input request to end transmitting the outgoing live media stream, the electronic device ceases to transmit the outgoing live media stream (e.g., if audio-only, stop transmitting audio to the participants; if audio+video, stop transmitting audio+video to the participants). Further in response to detecting user input request to end transmitting the outgoing live media stream, the electronic device ceases to receive (and ceases to display) live media streams from participants of the communication session.

Note that details of the processes described above with respect to method 800 (e.g., FIG. 8) are also applicable in an analogous manner to the methods described below and above. For example, methods 700 and 900 optionally includes one or more of the characteristics of the various methods described above with reference to method 800. For example, methods 700, 800, and 900 describe an analogous communication session. For another example, methods 800, 800, and 900 describe analogous live media streams. For another example, the technique of method 700 can be used to start a live media session prior to performing the techniques of methods 800 and 900. For another example, methods 800 and 900 can be performed during a live media session started using the technique of method 700. For another example, the technique of method 800 can be used to change the type of media stream started using the technique of method 700. For brevity, these details are not repeated below.

FIGS. 9A-9B are a flow diagram illustrating method 900 for synchronizing media playback during a live stream using an electronic device in accordance with some embodiments. Method 900 is performed at a device (e.g., 100, 300, 500) with a display. Some operations in method 900 are, optionally, combined, the orders of some operations are, optionally, changed, and some operations are, optionally, omitted.

As described below, method 900 provides an intuitive way for synchronizing media playback during a live stream. The method reduces the cognitive burden on a user for transitioning between streaming live audio and live video, thereby creating a more efficient human-machine interface. For battery-operated computing devices, enabling a user to synchronize media playback during a live stream faster and more efficiently conserves power and increases the time between battery charges.

While participating (902) in a communication session with one or more participants (other than the user of the electronic device, one or more remote participants), the electronic device transmits (904), to one or more participants of the communication session, a link to media (e.g., link (such as a URL) to audio, video, audio+video, media that is time-based).

The electronic device displays (906), on the display, a representation of the media (e.g., 608*f*), including (908) an affordance (e.g., 608*g*, a "live" affordance), while participating (902) in the communication session.

In accordance with some embodiments, the representation of the media (e.g., 608*f*) further includes (910) an image (e.g., 608*h*) based on the content of the media. In some examples, the media is a video and the image is a frame of the video. In some examples, the media is a song of an album and the image is an album cover of the album. In some examples, the image based on the content of the media is discrete from the affordance (e.g., the live affordance). In some examples, the image based on the content of the media is retrieved from a remote server.

The electronic device detects (912) a user input (e.g., 608*n*) while participating (902) in the communication session.

In response to detecting the user input (e.g., 608*n*) and while participating (902) in the communication session, the electronic device displays (916) a media playback user interface (e.g., 626, video playback UI, audio playback UI)

corresponding to the media (and, optionally, ceasing to display the affordance and/or the image based on the content of the media).

In accordance with some embodiments, further in response to detecting the user input and while participating (902) in the communication session, in accordance with the user input being activation of the affordance (e.g., 608g, a "live" affordance of the media), the electronic device synchronizes (918) playback of the media on devices of the one or more participants of the communication session with playback of the media on the electronic device. User input that automatically synchronizes playback across multiple devices enables the participants to share in a media experience without the need to repeatedly manually coordinate various controls (playback, pause, rewind, etc.) of the media. Performing an operation automatically enhances the operability of the device and makes the user-device interface more efficient which, additionally, reduces power usage and improves battery life of the device by enabling the user to use the device more quickly and efficiently. Automatic synchronization also reduces the need for the user to provide multiple inputs to synchronize the playback with other devices. Reducing the number of inputs required to perform a task also enhances the operability of the device and makes the user-device interface more efficient. In some examples, participants performing a media playback control user input at their respective device, causes a corresponding control of the media playback on the electronic device. Further in response to detecting the user input and in accordance with the user input not being activation of the affordance, the electronic device forgoes synchronizing playback of the media on devices of the one or more participants of the communication session with playback of the media on the electronic device.

While displaying the media playback user interface and participating (902) in the communication session, the electronic device detects (920) (e.g., via a touch-sensitive surface, at the electronic device, by the user) a media playback control user input (e.g., 604o, 604p, input to scrub to a particular time in the media, input to play or pause media).

In response (924) to receiving the media playback control user input, the electronic device controls (926) playback of the media in the media playback user interface at the electronic device in accordance with the received media playback control user input.

Further in response (924) to receiving the media playback control user input, in accordance with (928) the user input being an activation of the affordance (e.g., a "live" affordance of the media), the electronic device transmits (930) instructions to control playback of the media at devices of the one or more participants in accordance with the received media playback control user input, such that playback of the media at devices of the one or more participants of the communication session remains substantially synchronized.

In accordance with some embodiments, further in response (924) to receiving the media playback control user input, in accordance with (932) the user input being an activation of the image (e.g., 608h) that is based on the content of the media, the electronic device forgoes (934) transmitting instructions to control playback of the media at devices of the one or more participants in accordance with the received media playback control user input. In accordance with some embodiments, in accordance with the user input being an activation of the image (e.g., 608h) that is based on the content of the media, playback of the media on devices of the one or more participants of the communication session is not synchronized with playback of the media on the electronic device.

In accordance with some embodiments, each participant of the communication session has equal control of the media file and can start/stop/rewind/fast forward the video. The electronic device receives control instructions from participants and modifies playback accordingly. In accordance with some embodiments, while displaying the media playback user interface, the electronic device receives one or more media playback control instructions from a remote device of a participant of the communication session. In response to receiving the one or more media playback control instructions from the remote device, the electronic device modifies playback of the media at the electronic device in accordance with the received one or more media playback control instructions.

In accordance with some embodiments, in accordance with the user input being an activation of the affordance (e.g., 608g, a "live" affordance of the media), the electronic device concurrently outputs (e.g., displaying on the display, playing audio using speakers), with display of the media playback user interface (e.g., 626, video playback UI, audio playback UI) corresponding to the media, one or more live media streams (e.g., 618a, 620a, 622a, 624a of FIG. 6AD, live audio stream, live video stream) received from one or more participants of the communication session. The one or more live media streams are captured (e.g., using one or more cameras, using one or more microphones) at remote devices of the one or more participants during playback of the media at the remote devices. In some examples, in accordance with the user input being an activation of the affordance, the electronic device concurrently plays audio of the playback of the media in the media playback user interface with one or more live audio feeds received from one or more participants of the communication session, wherein the one or more live audio feeds are captured at remote devices of the one or more participants during playback of the media at the remote devices.

Note that details of the processes described above with respect to method 900 (e.g., FIGS. 9A-9B) are also applicable in an analogous manner to the methods described above. For example, methods 700 and 800 optionally includes one or more of the characteristics of the various methods described above with reference to method 900. For example, methods 700, 800, and 900 describe an analogous communication session. For another example, methods 800, 800, and 900 describe analogous live media streams. For another example, the technique of method 700 can be used to start a live media session prior to performing the techniques of methods 800 and 900. For another example, methods 800 and 900 can be performed during a live media session started using the technique of method 700. For another example, the technique of method 800 can be used to change the type of media stream started using the technique of method 700. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, or any other identifying or personal information.

The present disclosure recognizes that the use of such personal information data, in the present technology, can be used to the benefit of users. For example, the personal information data can be used to connect users for video calls. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of video conference services, the present technology can be configured to allow users to select to "opt in" or "opt out" of participation in the collection of personal information data during registration for services or anytime thereafter. In another example, users can select not to provide location information for services. In yet another example, users can select to not provide precise location information, but permit the transfer of location zone information.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. An electronic device, comprising:
   a display;
   one or more processors; and
   memory storing one or more programs configured to be executed by the one or more processors, the one or more programs including instructions for:
     while participating in a live communication session with one or more participants, displaying a media playback user interface that includes a representation of video media being played, wherein playback of the video media at the electronic device is synchronized with playing of the video media on one or more other devices of the one or more participants;
     while displaying the representation of the video media being played, receiving data that corresponds to a reaction from a first participant of the one or more participants; and
     in response to receiving the data that corresponds to the reaction from the first participant of the one or more participants and while the video media is being played on both the electronic device and the one or more other devices of the one or more participants, concurrently playing both the video media and the reaction from the first participant of the one or more participants, wherein changes in the reaction over time are played while the video media is concurrently playing;
     while concurrently playing both the video media and the reaction from the first participant of the one or more participants, receiving data that corresponds to a reaction from a second participant of the one or more participants; and in response to receiving the data that corresponds to the reaction from the second participant of the one or more participants, concurrently playing the video media, the reaction from the first participant, and the reaction from the second participant, wherein:

playing the reaction from the first participant includes displaying a representation of the reaction from the first participant in a first region of the display; and playing the reaction from the second participant includes displaying a representation of the reaction from the second participant in a second region of the display that is different from the first region of the display.

2. The electronic device of claim 1, wherein the one or more programs further include instructions for:

before displaying the representation of the video media being played back, detecting an input for initiating playback of the video media; and in response to detecting the input for initiating playback of the video media:
playing back the video media; and
causing one or more instructions to be transmitted to the other one or more devices to control playback of the video media at each respective device of the one or more other devices.

3. The electronic device of claim 1, wherein playing the reaction from the first participant includes outputting one or more of audio and video.

4. The electronic device of claim 1, wherein:
the data that corresponds to the reaction from the first participant was captured by a device of the first participant; and
the device of the first participant is different from the electronic device.

5. The electronic device of claim 1, wherein:
playing the reaction from the first participant includes outputting a first type of media; and
playing the reaction from the second participant includes outputting a second type of media that is different from the first type of media.

6. The electronic device of claim 1, wherein:
the representation of the reaction from the first participant is a same size as the representation of the reaction from the second participant.

7. The electronic device of claim 1, wherein the one or more programs further include instructions for:
while concurrently playing both the video media and the reaction from the first participant of the one or more participants:
playing a reaction from a user of the electronic device, wherein the user of the electronic device is different from the first participant; and
transmitting data that corresponds the reaction from the user of the electronic device to the other one or more devices.

8. The electronic device of claim 7, wherein the data that corresponds the reaction from the user of the electronic device includes live video data and live audio data, and wherein the one or more programs further include instructions for:
while playing the reaction from the user of the electronic device and transmitting the data that corresponds the reaction from the user of the electronic device to the other one or more devices, receiving one or more user inputs; and
in response to receiving one or more inputs, displaying a user interface that is different from the media playback user interface; and
while displaying the user interface that is different from the media playback user interface:
ceasing to transmit the live video data to the other one or more devices; and
continuing to transmit the live audio data to the one or more participants.

9. A non-transitory computer-readable storage medium storing one or more programs configured to be executed by one or more processors of an electronic device with a display, the one or more programs including instructions for:
while participating in a live communication session with one or more participants, displaying a media playback user interface that includes a representation of video media being played, wherein playback of the video media at the electronic device is synchronized with playing of the video media on one or more other devices of the one or more participants;
while displaying the representation of the video media being played, receiving data that corresponds to a reaction from a first participant of the one or more participants; and
in response to receiving the data that corresponds to the reaction from the first participant of the one or more participants and while the video media is being played on both the electronic device and the one or more other devices of the one or more participants, concurrently playing both the video media and the reaction from the first participant of the one or more participants, wherein changes in the reaction over time are played while the video media is concurrently playing;
while concurrently playing both the video media and the reaction from the first participant of the one or more participants, receiving data that corresponds to a reaction from a second participant of the one or more participants; and
in response to receiving the data that corresponds to the reaction from the second participant of the one or more participants, concurrently playing the video media, the reaction from the first participant, and the reaction from the second participant, wherein:
playing the reaction from the first participant includes displaying a representation of the reaction from the first participant in a first region of the display; and
playing the reaction from the second participant includes displaying a representation of the reaction from the second participant in a second region of the display that is different from the first region of the display.

10. The non-transitory computer-readable storage medium of claim 9, wherein the one or more programs further include instructions for:
before displaying the representation of the video media being played back, detecting an input for initiating playback of the video media; and
in response to detecting the input for initiating playback of the video media:
playing back the video media; and
causing one or more instructions to be transmitted to the other one or more devices to control playback of the video media at each respective device of the one or more other devices.

11. The non-transitory computer-readable storage medium of claim 9, wherein playing the reaction from the first participant includes outputting one or more of audio and video.

12. The non-transitory computer-readable storage medium of claim 9, wherein:
the data that corresponds to the reaction from the first participant was captured by a device of the first participant; and
the device of the first participant is different from the electronic device.

13. The non-transitory computer-readable storage medium of claim 9, wherein:
playing the reaction from the first participant includes outputting a first type of media; and
playing the reaction from the second participant includes outputting a second type of media that is different from the first type of media.

14. The non-transitory computer-readable storage medium of claim 9, wherein:
the representation of the reaction from the first participant is a same size as the representation of the reaction from the second participant.

15. The non-transitory computer-readable storage medium of claim 9, wherein the one or more programs further include instructions for:
while concurrently playing both the video media and the reaction from the first participant of the one or more participants:
playing a reaction from a user of the electronic device, wherein the user of the electronic device is different from the first participant; and
transmitting data that corresponds the reaction from the user of the electronic device to the other one or more devices.

16. The non-transitory computer-readable storage medium of claim 15, wherein the data that corresponds the reaction from the user of the electronic device includes live video data and live audio data, and wherein the one or more programs further include instructions for:
while playing the reaction from the user of the electronic device and transmitting the data that corresponds the reaction from the user of the electronic device to the other one or more devices, receiving one or more user inputs; and
in response to receiving one or more inputs, displaying a user interface that is different from the media playback user interface; and
while displaying the user interface that is different from the media playback user interface:
ceasing to transmit the live video data to the other one or more devices; and
continuing to transmit the live audio data to the one or more participants.

17. A method, comprising:
at an electronic device with a display:
while participating in a live communication session with one or more participants, displaying a media playback user interface that includes a representation of video media being played, wherein playback of the video media at the electronic device is synchronized with playing of the video media on one or more other devices of the one or more participants;
while displaying the representation of the video media being played, receiving data that corresponds to a reaction from a first participant of the one or more participants; and
in response to receiving the data that corresponds to the reaction from the first participant of the one or more participants and while the video media is being played on both the electronic device and the one or more other devices of the one or more participants, concurrently playing both the video media and the reaction from the first participant of the one or more participants, wherein changes in the reaction over time are played while the video media is concurrently playing;
while concurrently playing both the video media and the reaction from the first participant of the one or more participants, receiving data that corresponds to a reaction from a second participant of the one or more participants; and
in response to receiving the data that corresponds to the reaction from the second participant of the one or more participants, concurrently playing the video media, the reaction from the first participant, and the reaction from the second participant, wherein:
playing the reaction from the first participant includes displaying a representation of the reaction from the first participant in a first region of the display; and
playing the reaction from the second participant includes displaying a representation of the reaction from the second participant in a second region of the display that is different from the first region of the display.

18. The method of claim 17, further comprising:
before displaying the representation of the video media being played back, detecting an input for initiating playback of the video media; and
in response to detecting the input for initiating playback of the video media:
playing back the video media; and
causing one or more instructions to be transmitted to the other one or more devices to control playback of the video media at each respective device of the one or more other devices.

19. The method of claim 17, wherein playing the reaction from the first participant includes outputting one or more of audio and video.

20. The method of claim 17, wherein:
the data that corresponds to the reaction from the first participant was captured by a device of the first participant; and
the device of the first participant is different from the electronic device.

21. The method of claim 17, wherein:
playing the reaction from the first participant includes outputting a first type of media; and
playing the reaction from the second participant includes outputting a second type of media that is different from the first type of media.

22. The method of claim 17, wherein:
the representation of the reaction from the first participant is a same size as the representation of the reaction from the second participant.

23. The method of claim 17, further comprising:
while concurrently playing both the video media and the reaction from the first participant of the one or more participants:
playing a reaction from a user of the electronic device, wherein the user of the electronic device is different from the first participant; and transmitting data that corresponds the reaction from the user of the electronic device to the other one or more devices.

24. The method of claim 23, wherein the data that corresponds the reaction from the user of the electronic device includes live video data and live audio data, the method further comprising:
while playing the reaction from the user of the electronic device and transmitting the data that corresponds the reaction from the user of the electronic device to the other one or more devices, receiving one or more user inputs; and
in response to receiving one or more inputs, displaying a user interface that is different from the media playback user interface; and
while displaying the user interface that is different from the media playback user interface:
ceasing to transmit the live video data to the other one or more devices; and
continuing to transmit the live audio data to the one or more participants.

\* \* \* \* \*